(12) United States Patent
Deogun et al.

(10) Patent No.: US 11,470,654 B2
(45) Date of Patent: Oct. 11, 2022

(54) METHOD AND SYSTEM FOR HANDLING RANDOM ACCESS RESPONSE IN WIRELESS COMMUNICATION SYSTEM

(71) Applicant: Samsung Electronics Co., Ltd., Suwon-si (KR)

(72) Inventors: Pravjyot Singh Deogun, Bangalore (IN); Anil Agiwal, Bangalore (IN); Abhishek Kumar Singh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/973,006

(22) PCT Filed: Jun. 7, 2019

(86) PCT No.: PCT/KR2019/006914
§ 371 (c)(1),
(2) Date: Dec. 7, 2020

(87) PCT Pub. No.: WO2019/235897
PCT Pub. Date: Dec. 12, 2019

(65) Prior Publication Data
US 2021/0259027 A1 Aug. 19, 2021

(30) Foreign Application Priority Data

Jun. 6, 2018 (IN) .............................. 201841021102
Jun. 5, 2019 (IN) .............................. 201841021102

(51) Int. Cl.
*H04W 74/08* (2009.01)
*H04W 76/11* (2018.01)
(Continued)

(52) U.S. Cl.
CPC ....... *H04W 74/0841* (2013.01); *H04W 24/08* (2013.01); *H04W 72/0446* (2013.01);
(Continued)

(58) Field of Classification Search
CPC ............. H04W 24/08; H04W 72/0446; H04W 72/0453; H04W 72/1257; H04W 72/1289;
(Continued)

(56) References Cited

U.S. PATENT DOCUMENTS

2017/0041904 A1* 2/2017 Suzuki ................. H04L 5/0053
2017/0094688 A1* 3/2017 Lee ....................... H04W 48/12
(Continued)

OTHER PUBLICATIONS

ZTE, "Analysis on preamble transmission related issues in NB-IoT", 3GPP TSG-RAN WG2 Meeting #93, Feb. 15-19, 2016, R2-161391, 6 pages.
(Continued)

*Primary Examiner* — Kashif Siddiqui

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Accordingly the embodiments herein provides a method for handling a RAR in a wireless communication system (300).

14 Claims, 29 Drawing Sheets

(51) Int. Cl.
  *H04W 24/08* (2009.01)
  *H04W 72/04* (2009.01)
  *H04W 72/12* (2009.01)
  *H04W 72/14* (2009.01)
  *H04W 74/00* (2009.01)

(52) U.S. Cl.
  CPC ... *H04W 72/0453* (2013.01); *H04W 72/1257* (2013.01); *H04W 72/1289* (2013.01); *H04W 72/14* (2013.01); *H04W 74/008* (2013.01); *H04W 74/0816* (2013.01); *H04W 76/11* (2018.02)

(58) Field of Classification Search
  CPC .............. H04W 72/14; H04W 74/008; H04W 74/0816; H04W 74/0833; H04W 74/0841; H04W 76/11
  See application file for complete search history.

(56) References Cited

U.S. PATENT DOCUMENTS

| | | | | |
|---|---|---|---|---|
| 2017/0290016 | A1* | 10/2017 | Yi | H04L 5/0053 |
| 2017/0311355 | A1 | 10/2017 | Yi et al. | |
| 2018/0368181 | A1* | 12/2018 | Lee | H04W 24/08 |
| 2020/0077432 | A1* | 3/2020 | Xiong | H04L 1/1812 |
| 2020/0107373 | A1* | 4/2020 | Roy | H04L 5/001 |

OTHER PUBLICATIONS

Samsung, "Random Access in NR: RAR MAC Subheader Design", 3GPP TSG-RAN WG2 #99bis, Oct. 9-13, 2017, R2-1710080, 5 pages.
"3rd Generation Partnership Project; Technical Specification Group Radio Access Network; NR; Physical layer procedures for control (Release 15)", 3GPP TS 38.213 V15.1.0 (Mar. 2018), 77 pages.
International Search Report dated Sep. 10, 2019 in connection with International Patent Application No. PCT/KR2019/006914, 3 pages.
Written Opinion of the International Searching Authority dated Sep. 10, 2019 in connection with International Patent Application No. PCT/KR2019/006914, 5 pages.

* cited by examiner

METHOD AND SYSTEM FOR HANDLING RANDOM ACCESS RESPONSE IN WIRELESS COMMUNICATION SYSTEM

CROSS-REFERENCE TO RELATED APPLICATIONS

This application is a 371 of International Application No. PCT/KR2019/006914 filed on Jun. 7, 2019, which claims priority to India Patent Application No. 201841021102 filed on Jun. 6, 2018 and India Patent Application No. 201841021102 filed on Jun. 5, 2019, the disclosures of which are herein incorporated by reference in their entirety.

BACKGROUND

1. Field

The present disclosure relates to a random access response reception by a User Equipment (UE) in a wireless communication system, and more particularly to a method and system for handling the random access response reception for an extended Random Access Response (RAR) timer or window in the wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the recent years, several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. In order to mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of the fifth generation wireless communication system. In addition, the fifth generation wireless communication system is expected to address different use cases having quite different requirements in terms of data rate, latency, reliability, mobility etc. However, it is expected that the design of an air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the 5th generation (also referred as NR or New Radio) wireless communication system, the random access (RA) procedure is used to achieve uplink time synchronization. The RA procedure is used during initial access, handover, RRC connection re-establishment procedure, scheduling request transmission, beam failure recovery, SCG addition/modification and data or control information transmission in uplink by non-synchronized UE in RRC CONNECTED state. During the 4 step contention based RA procedure, the UE first transmits random access preamble (also referred as Msg1) and then waits for random access response (RAR) or Msg2 in the RAR window. In the RAR window, the UE monitors for PDCCH addressed to a random access radio network temporary identifier (RA-RNTI). The PDCCH search space for monitoring RAR is configured by GNB. The PDCCH addressed to RA-RNTI schedules DL TB (over PDSCH) which includes a RAR MAC PDU. Several RARs for various Random Access Preambles detected by the gNB can be multiplexed in the same RAR MAC PDU by gNB. An RAR in MAC PDU corresponds to UE's Random Access Preamble transmission if it includes RAPID of Random Access Preamble transmitted by it. If the RAR corresponding to its Random Access Preamble transmission is not received during the RAR window and the UE has not yet transmitted the Random Access Preamble for a configurable (configured by gNB in RACH configuration) number of times then, the UE retransmits the Random Access Preamble. If the RAR corresponding to its Random Access Preamble transmission is received, the UE transmits Msg3 in UL grant received in RAR. The Msg3 includes message such as RRC Connection Request, RRC Connection Re-establishment request, RRC handover confirm, scheduling request, RRC resume, SI request etc. It also includes the UE identity (i.e. C-RNTI or S-TMSI or a random number). After transmitting the Msg3, the UE starts a contention resolution timer. While the contention resolution timer is running, if the UE receives a PDCCH addressed to C-RNTI included in Msg3, contention resolution is considered successful, contention resolution timer is stopped and RA procedure is completed. While the contention resolution timer is running, if the UE receives contention resolution MAC CE including the UE's Contention Resolution Identity (first X bits of CCCH SDU transmitted in Msg3), contention resolution is considered successful, contention resolution timer is stopped and RA procedure is completed. If the contention resolution timer expires and the UE has not yet transmitted the Random Access Preamble for a configurable number of times, the UE retransmits the Random Access Preamble.

In the 5th generation (also referred as NR or New Radio) wireless communication system, 2 step contention-free RA (CFRA) procedure is also supported. The contention free RA procedure is used for scenarios such as handover where low latency is required, timing advance establishment for Scell, etc. the GNB assigns to UE non-contention RA preamble in dedicated signaling. The UE transmits the assigned non-contention RA preamble. The UE then waits for Random Access Response (RAR) or Msg2 in the RAR window. In the RAR window UE monitors for PDCCH addressed to RA-RNTI. PDCCH addressed to RA-RNTI schedules DL TB which includes RAR MAC PDU. Contention free RA procedure terminates after receiving the RAR corresponding to the transmitted RA preamble.

In order to reduce the latency of 4 step CBRA procedure, a 2 step CB RA procedure is also supported in NR. The 2 step RACH refers to the procedure which can complete RACH procedure in two steps and wherein PUSCH payload is also transmitted in addition to RA preamble in first step. It comprises of 2 messages i.e. msgA and msgB. The channel structure of msgA includes PRACH Preamble and PUSCH carrying payload. PRACH Preamble and PUSCH in the msgA is TDMed. In the 2 step CBRA procedure, UE sends additional information i.e. UE ID along with PRACH preamble in first step (i.e. MsgA). The UE ID can be one of Random ID, S-TMSI, C-RNTI, Resume ID, IMSI, idle mode ID, Inactive Mode ID, I-RNTI etc. The UE ID can be different in different scenarios in which UE performs the 2 step RA procedure. When the UE performs 2 step RA procedure after power on (before it is attached/registered to the network) then the UE ID is the random ID. When the UE perform 2 step RA procedure in IDLE state after it is attached/registered to the network, the UE ID is S-TMSI. If UE has an assigned C-RNTI (e.g. in connected state) the UE ID is C-RNTI. In case UE is in INACTIVE state, the UE ID is resume ID. In case MsgA includes dedicated RACH preamble, the UE ID can be skipped (i.e. not included) in Msg1. In this case gNB can identify the UE based on a dedicated preamble.

In 2 step CBRA procedure, after transmitting MsgA, UE monitors for MsgB in response window (similar to RAR-window). The PDCCH for MsgB is also addressed to RA-RNTI. Upon receiving the MsgB including the UE ID which UE has transmitted in MsgA, random access procedure is successfully completed.

In the RA procedure, RA-RNTI identifies the time-frequency resource (also referred as PRACH Occasion or PRACH TX Occasion or RACH Occasion) in which Random Access Preamble was detected by gNB. The maximum size of RAR Window is one radio frame i.e. 10 ms. The RA-RNTI is calculated as follows: RA-RNTI=1+s_id+ 14*t_id+14*80*f_id+14*80*8*ul_carrier_id, where I. s_id is the index of the first OFDM symbol of the PRACH occasion where UE has transmitted Msg1 i.e. RA preamble; 0≤s_id≤14. OFDM symbols in a slot are sequentially numbered from zero.

II. t_id is the index of the first slot of the PRACH occasion (0≤t_id≤80). Slots in a radio frame are sequentially numbered from zero.

f_id is the index of the PRACH occasion within the slot in the frequency domain (0≤f_id≤8)

ul_carrier_id is the UL carrier used for Msg1 transmission (0 for NUL (normal uplink carrier) and 1 for SUL (supplementary carrier).

For a case of unlicensed operation gNB needs to check whether channel is free or not and it can transmit RAR and/or MsgB only if channel is free. As a result time for which the UE monitors for the RAR and/or MsgB can extend beyond 10 ms (i.e. 1 system frame or radio frame) period, in which case it is possible that multiple UEs monitor PDCCH scrambled with same RA-RNTI value at the same time even if their PRACH transmission occasions are different. This happens because even if two different UEs perform the PRACH transmission over different system frames, but if there PRACH occasion within a system frame is same (i.e. have s_id, t_id and f_id) than a computed RA-RNTI is common for both of the given UEs. Such a phenomenon can lead to an increased contention for the random access procedure thereby reducing an overall random access performance. In licensed operation also time for which the UE monitors for the RAR and/or MsgB can extend beyond 10 ms (i.e. 1 system frame or radio frame) period to provide enough processing time to gNB to prepare and transmit RAR and/or MsgB.

Thus, it is desired to address the above mentioned disadvantages or other shortcomings or at least provide a useful alternative.

The principal object of the embodiments herein is to provide a method and system for performing a random access response reception for an extended RAR timer or window in a wireless communication system.

SUMMARY

Accordingly, the embodiments herein provides a method for handling a RAR in a wireless communication system. The method includes transmitting, by a User Equipment (UE), a Physical Random Access Channel (PRACH) preamble. Further, the method includes determining, by the UE, a frame index value for the transmitted PRACH preamble based on at least one of a system frame number, a Channel Occupancy Time (COT) number, a subframe number and a time duration number. Further, the method includes monitoring, by the UE, the RAR in a RAR window based on the determined frame index value.

In an embodiment, monitoring, by the UE, the RAR in the RAR window based on the determined frame index value includes determining a Random Access Radio Network Temporary Identifier (RA-RNTI) based on the frame index value, monitoring a PDCCH addressed to the determined RA-RNTI, receiving the RAR corresponding to a RAPID of the PRACH preamble transmitted by the UE, wherein a transport block comprising the RAR is scheduled by the PDCCH addressed to the determined RA-RNTI, and declaring a successful reception of the RAR upon receiving the RAR corresponding to the RAPID of the PRACH preamble transmitted by the UE.

In an embodiment, monitoring, by the UE, the RAR in the RAR window based on the determined frame index value includes monitoring a PDCCH addressed to a RA-RNTI, receiving the PDCCH addressed to the RA-RNTI, wherein a DCI includes the determined frame index value, receiving the RAR corresponding to the RAPID of the PRACH transmitted by the UE, where a transport block including the RAR is scheduled by the received PDCCH, and declaring successful reception of the RAR upon receiving the RAR corresponding to the RAPID of the PRACH transmitted by the UE.

In an embodiment, monitoring, by the UE, the RAR in the RAR window based on the determined frame index value includes monitoring a PDCCH addressed to a RA-RNTI, receiving the PDCCH addressed to the RA-RNTI, receiving the RAR including a RAPID of the PRACH transmitted by the UE and the determined frame index, wherein a transport block including the RAR is scheduled by the received PDCCH, and declaring successful reception of the RAR upon receiving the RAR including the RAPID of the PRACH transmitted by the UE and the determined frame index value. The determined frame index value is present in one of a RAR MAC sub-header and a RAR payload.

In an embodiment, monitoring, by the UE, the RAR in the RAR window based on the determined frame index includes monitoring a PDCCH addressed to a RA-RNTI, wherein monitoring is performed in a DL radio resource corresponding to determined frame index value, receiving the PDCCH addressed to the RA-RNTI, receiving the RAR including a Random Access Preamble Identifier (RAPID) of the PRACH transmitted by the UE wherein a transport block including the RAR is scheduled by the received PDCCH, and declaring successful reception of the RAR upon receiving the RAR including the RAPID of the PRACH transmitted by the UE.

In an embodiment, further, the method includes initiating, by the UE, a RAR timer. Further, the method includes monitoring, by the UE, a PDCCH transmission addressed to a RA-RNTI value. Further, the method includes determining, by the UE, that the RAR is not received at an end of an ongoing PRACH period. Further, the method includes determining, by the UE, that an occurrence of a RACH failure in response to determining that the RAR is not received at the end of the PRACH period. Further, the method includes determining, by the UE, that a RAR monitoring period is greater than the PRACH period. Further, the method includes stopping, by the UE, a downlink RAR monitoring procedure. Further, the method includes performing, by the UE, actions applicable on the RACH failure in response to determining that the RAR monitoring period is exceeds the ongoing PRACH period and the RAR is not received at the end of the PRACH period.

In an embodiment, monitoring, by the UE, the RAR in the RAR window based on the determined frame index value includes monitoring a PDCCH addressed to a RA-RNTI, receiving the PDCCH addressed to the RA-RNTI, receiving and decoding TB scheduled by the PDCCH addressed to the RA-RNTI, determining that the RAR contains a backoff indicator, processing the backoff indicator based on the determination, determining that the RAR comprises a RAPID transmitted by the UE, determining whether the RAR includes the RAPID only, and performing one of: declaring successful reception of the RAR based on the successful determination, and processing a timing advance and received uplink grant within the RAR based on unsuccessful determination.

In an embodiment, further, the method includes starting, by the UE, a RAR timer. Further, the method includes monitoring, by the UE, a PDCCH transmission addressed to a RA-RNTI. Further, the method includes determining, by the UE, that the PDCCH transmission addressed to the RA-RNTI is received and a RAR is decoded. Further, the method includes processing, by the UE, a backoff-indicator included within the RAR based on the determination. Further, the method includes stopping, by the UE, the RAR timer. Further, the method includes determining, by the UE, that the RAR comprises the RAPID transmitted by the UE. Further, the method includes determining, by the UE, whether the RAR includes only RAPID. Further, the method includes performing, by the UE one of: in response to determining that the RAR includes the only RAPID, stopping a random access procedure and stopping the RAR timer (140), and in response to determining that the RAR does not include the only RAPID, determining that an uplink radio resource of an uplink grant included within the RAR is associated with the frame index value corresponding to the PRACH determined by the UE processing a timing advance within the RAR, processing an uplink grant, and stopping the RAR timer.

In an embodiment, the UE continuous to monitor the PDCCH transmission addressed to the RA-RNTI, if the uplink radio resource of the uplink grant included within the RAR is not associated with the frame index value corresponding to the PRACH determined by the UE In an embodiment, the monitoring is performed in the DL radio resource corresponding to the determined frame index value by initiating, by the UE a RAR timer, determining, by the UE, whether a random access preamble is not selected by a medium access control (MAC) entity of the UE, performing, by the UE, one of: in response to determining that the random access preamble is not selected by the MAC entity of the UE determining that a downlink radio resource which is common to all frame index values, and in response to determining that the random access preamble is selected by the MAC entity of the UE determining that the downlink radio resource is associated with the frame index value.

In an embodiment, the RA-RNTI is obtained based on a first parameter and a second parameter, wherein the first parameter comprises a symbol index within a slot, a slot index within a system frame, a frequency index, an uplink carrier of the PRACH transmission, and wherein the second parameter comprises at least one of a function of the system frame number and the COT number, a system frame number period, a system frame number, a RAR window length, and a COT duration.

In an embodiment, the downlink radio resource comprises at least one of a CORESET, a PDCCH search space, a time domain radio resource, a frequency domain radio resource, and a bandwidth part.

In an embodiment, the uplink radio resource comprises at least one of a CORESET, a PDCCH search space, a time domain radio resource, a frequency domain radio resource, and a bandwidth part.

Accordingly, the embodiments herein provides a method for handling a RAR reception in a wireless communication system. The method includes determining, by a base station, at least one of an RA-RNTI value and a frame index value for a random access response message based on at least one of a system frame number, a Channel Occupancy Time (COT) number, a subframe number and a time duration number. Further, the method includes sending, by the base station, one or more of downlink transmissions associated to the random access response message based on at least one of the RA-RNTI value and the frame index value to a UE.

In an embodiment, the frame index value is included in one of a downlink Control Information (DCI) identified by a RA-RNTI which schedules RAR message, a RAR MAC sub-header of the random access response and a RAR payload of the random access response.

Accordingly, the embodiments herein provides a UE for handling a RAR in a wireless communication system. The UE includes a processor coupled with a memory. The processor is configured to transmit a PRACH preamble and determine a frame index value for the transmitted PRACH preamble based on at least one of a system frame number, a COT number, a subframe number and a time duration number. Further, the processor is configured to monitor the RAR in a RAR window based on the determined frame index value.

Accordingly, the embodiments herein provides a base station for handling a RAR reception in a wireless communication system. The base station includes a processor coupled with a memory. The processor is configured to determine at least one of an RA-RNTI value and a frame index value for a random access response message based on at least one of a system frame number, a COT number, a subframe number and a time duration number. The processor is configured to send one or more of downlink transmissions associated with the random access response message based on at least one of the RA-RNTI value and the frame index value to a UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

According to aspects of the present disclosure, a method and system for performing a random access response reception for an extended RAR timer or window in a wireless communication system are provided.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
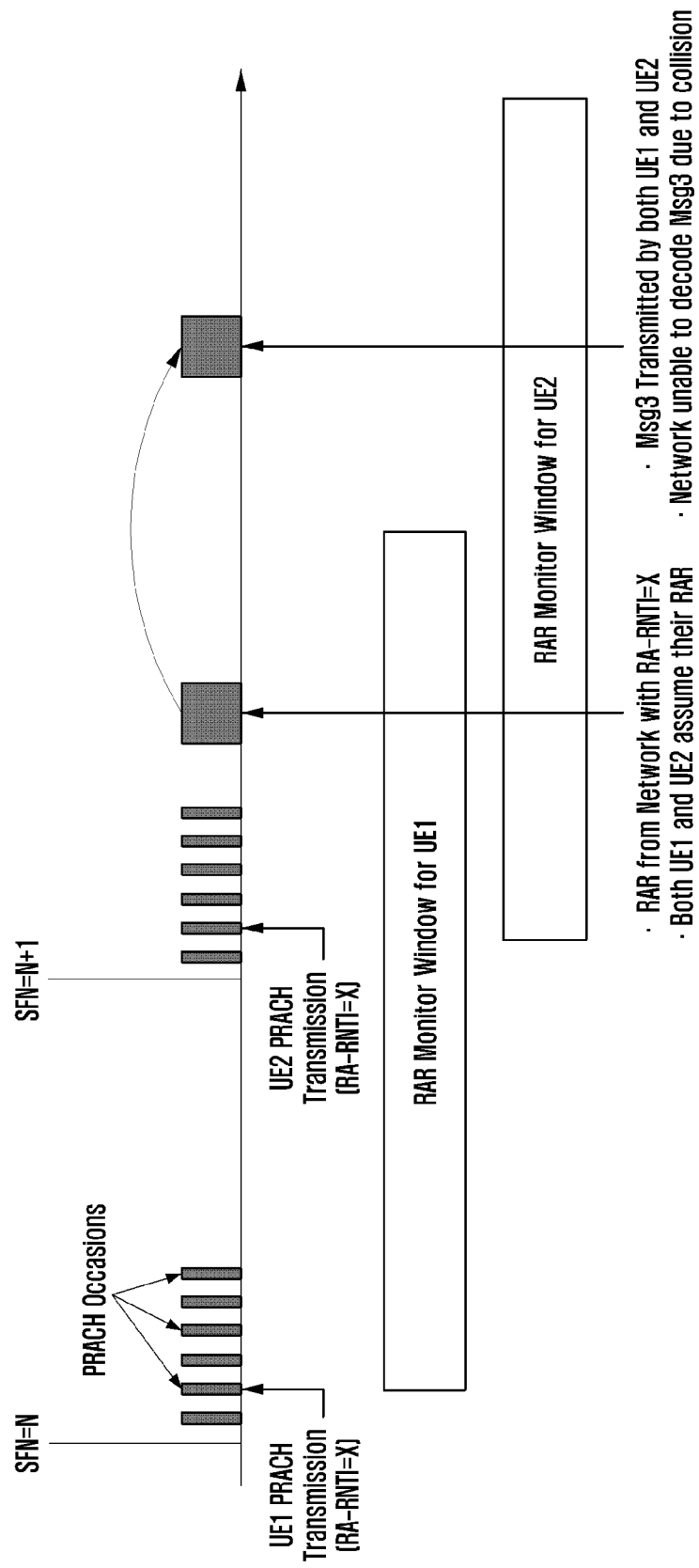
FIG. 1 is a schematic diagram illustrating a Msg-3 collision due to transmitting PRACH in different time occasions have a same RA-RNTI value by multiple UEs, according to prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein achieve a method for handling a RAR in a wireless communication system. The method includes transmitting, by a UE, a PRACH preamble. Further, the method includes determining, by the UE, a frame index value for the transmitted PRACH preamble based on at least one of a system frame number, a COT number, a subframe number and a time duration number. Further, the method includes monitoring, by the UE, the RAR in a RAR window based on the determined frame index value.

The below terminologies are used in the patent disclosure:
NR: New Radio. This term is synonymous to 5G,
RAR: Random Access Response,
DCI: Downlink Control Information,
PRACH: Physical Random Access Channel,
PDCCH: Physical Downlink Control Channel,
RRC: Radio Resource Control,
LBT: Listen Before Talk,
CORESET: Control Resource Set,
SI: System Information, and
COT: Channel Occupancy Time. It the amount of time that a UE or NB can reserve the unlicensed channel for continuous data or control transmission. After UE/NB acquires the unlicensed channel using LBT operation. It can perform transmission over the unlicensed-channel for the time indicated by Channel Occupancy Time. This transmission duration can also be referred to as transmission burst.

A random access procedure consists of multiple message transmissions as given below.

(1) Msg-1 (or Message-1): Transmission of Physical Random Access Channel (PRACH) message from the UE to the base station. Msg-1 is characterized by a preamble id and radio resource (e.g., time, frequency, carrier) over which the PRACH is transmitted.

(2) Msg-2 (or Message-2): After transmission of Msg-1, the UE monitors downlink channel for the base station response in form of PDCCH where in the CRC of PDCCH is scrambled or identified by the RA-RNTI. The UE monitors downlink channel for a period of time which is determined by the RAR timer (or window) indicated in a RRC configuration (e.g. system information). RA-RNTI value is determined by "RA-RNTI=1+s_id+14×t_id+14×80×f_id+14×80×8×ul_carrier_id", where s_id, t_id, f_id and ul_carrier_id are given by symbol index within slot, slot index within system frame, frequency index and uplink carrier of PRACH transmission respectively. After reception of PDCCH identified by RA-RNTI, the UE tries to decode and receive RAR which is scheduled using the decoded PDCCH. If RAR is decoded and preamble id (RAPID) included within RAR matches the preamble id for PRACH transmission, then the UE can initiate transmission of Msg-3 using the uplink grant indicated within the RAR.

(3) Msg-3 (or Message-3): It is an uplink transmission from the UE to the base station based on the uplink grant indicated within the RAR. The contents of the message may differ based on the reason for initiating random access procedure. Msg-3 may contain a UE identity (e.g. C-RNTI or TMSI), it may also contain additional RRC message (e.g. for connection establishment).

(4) Msg-4 (or Message-4): It is a downlink transmission which contains response for Msg-3 and may also contain additional information (such as contention resolution identity) for contention resolution.

The proposed method relates to reception of RAR by the UE. In unlicensed operation, it is expected that downlink channel monitoring time for the UE to receive the RAR needs to be extended beyond one system frame period (i.e. 10 ms) to increase the number of LBT opportunities by the base station to transmit RAR and/or MsgB. In the licensed operation, the RAR timer/window can also be extended beyond 10 ms to enable extended processing time for Msg1 or MsgA. However, due to this monitoring period extension, it is possible that multiple UEs transmitting PRACH in different time occasions (e.g., same symbol, slot index but different system frames) have the same value of RA-RNTI. In this case, if the UEs have transmitted random access preamble with same RAPID, then it is not possible for UEs to determine which RAR corresponding to same RAPID and RA-RNTI received from the base station is applicable for which UE, this can subsequently result in all the UEs receiving and processing the same RAR to transmit in the same Msg-3 resource and resulting in message collision. This phenomenon is described in the FIG. 1. Note that in this case there is no collision between Msg1 transmitted by both UEs.

Following solutions are proposed to address the issue of RAR confusion due to extended RAR timer.

In an embodiment, Including frame index of the PRACH transmission within the RA-RNTI calculation. In this embodiment, the RA-RNTI calculation also takes into account the system frame number or COT number or subframe number or time duration number over which the UE performs PRACH transmission such that UEs transmitting PRACH over different system frames or COTs or subframes or time durations, but overlapping RAR monitoring window, would always result in monitoring different RA-RNTI values. Since, the RA-RNTI value is unique based on the radio resource used for PRACH transmission by the UE, the chances for Msg-3 collision are reduced.

In another embodiment, Including frame index value within Msg-2 transmission. In this embodiment, during RAR transmission, the network/base station indicates the frame index of PRACH transmission for which this RAR is applicable for. The frame index value is a function of system frame number or COT number or subframe number or time duration number corresponding to the PRACH transmission for which this RAR is applicable for. The frame index value can be included within a Downlink Control Information (DCI) of PDCCH identified by RA-RNTI which schedules RAR message or frame index can be included within a RAR MAC subheader, or the frame index can be included within a RAR payload in a RAR MAC PDU.

In another embodiment, the UE assumes RACH failure at the end of PRACH period if the RAR is not received. In this embodiment, if the RAR monitoring period is greater than the PRACH period (i.e. number of system frames after which PRACH occasions repeat), then the UE stops performing downlink RAR monitoring and performs actions applicable on RACH failure if time elapsed since PRACH transmission becomes equal to or greater than PRACH period.

In another embodiment, Downlink radio resource determination for RAR monitoring based on frame index of PRACH transmission. In this embodiment, the UE can be configured (via system information or dedicated RRC signaling with multiple downlink radio resources (e.g. CORE-SETs or search spaces or time occasions or frequency resources or bandwidth parts) where RAR can be received. The downlink radio resources are assumed to be mutually orthogonal or non-overlapping with each other. Each downlink radio resource is associated with a set of one or more frame index values. The frame index value is a function of system frame number or COT number or subframe number or time duration number corresponding to the PRACH transmission for which this RAR is applicable for. After transmission of PRACH, the UE determines the downlink radio resource for RAR reception based on the frame index of PRACH transmission.

In another embodiment, Uplink radio resource differentiation based on frame index of PRACH transmission. In this embodiment, the UE can be configured (via system information or dedicated RRC signaling) with multiple uplink radio resources (e.g. time occasions or frequency resources or bandwidth parts) where the Msg-3 can be transmitted. Each radio resource configuration is associated with a set of one or more frame index values. The frame index value is a function of system frame number or COT number or subframe number or time duration number. The uplink radio resources are assumed to be mutually orthogonal or non-overlapping with each other. After a UE receives RAR, if frame index corresponding to radio resource of uplink grant included within RAR matches with the frame index of PRACH transmission, then the UE assumes that RAR is addressed to the same UE, otherwise UE keeps monitoring downlink channel to receive RAR from the network/base station.

Unlike conventional methods, the proposed method can be used for receiving a RAR by the UE in wireless communication system where an extended UE monitoring is required for the RAR. The method can be used to resolve a RAR confusion issue. In an embodiment, a RA-RNTI calculation also takes into account the system frame number or COT number or subframe number or time duration number over which the UE performs a PRACH transmission such that the UEs transmitting PRACH over different system frames or COTs or subframes or time durations, but overlapping a RAR monitoring window, would always result in different RA-RNTI values. Since, the RA-RNTI value is unique based on a radio resource used for the PRACH transmission by the UE, the chances for Msg-3 collision are reduced.

Referring now to the drawings, and more particularly to FIGS. 2 through 20, where similar reference characters denote corresponding features consistently throughout the figures, there are shown preferred embodiments.

FIG. 1 is a schematic diagram illustrating an Msg-3 collision due to transmitting PRACH in different time occasions have a same RA-RNTI value by multiple UEs, according to the embodiments as disclosed herein.

As shown in the FIG. 1, in an unlicensed operation, it is expected that downlink channel monitoring time for a UE to receive the RAR needs to be extended beyond one system frame period (i.e. 10 ms) to increase the number of LBT opportunities by the network/base station to transmit RAR and/or MsgB. In the licensed operation, the RAR timer/window can also be extended beyond 10 ms to enable extended processing time for Msg1 or MsgA. However, due to this monitoring period extension, it is possible that multiple UEs transmitting PRACH in different time occasions (e.g., same symbol, slot index but different system frames) have the same value of RA-RNTI. In this case, if the UEs have transmitted random access preamble with same RAPID, then it is not possible for UEs to determine which RAR corresponding to same RAPID and RA-RNTI received from the network/base station is applicable for which UE, this can subsequently result in all the UEs receiving and processing the same RAR to transmit in the same Msg-3 resource and resulting in message collision. This phenomenon is described in the FIG. 1. Note that in this case there is no collision between Msg1 transmitted by both UEs.

Figure 2A:
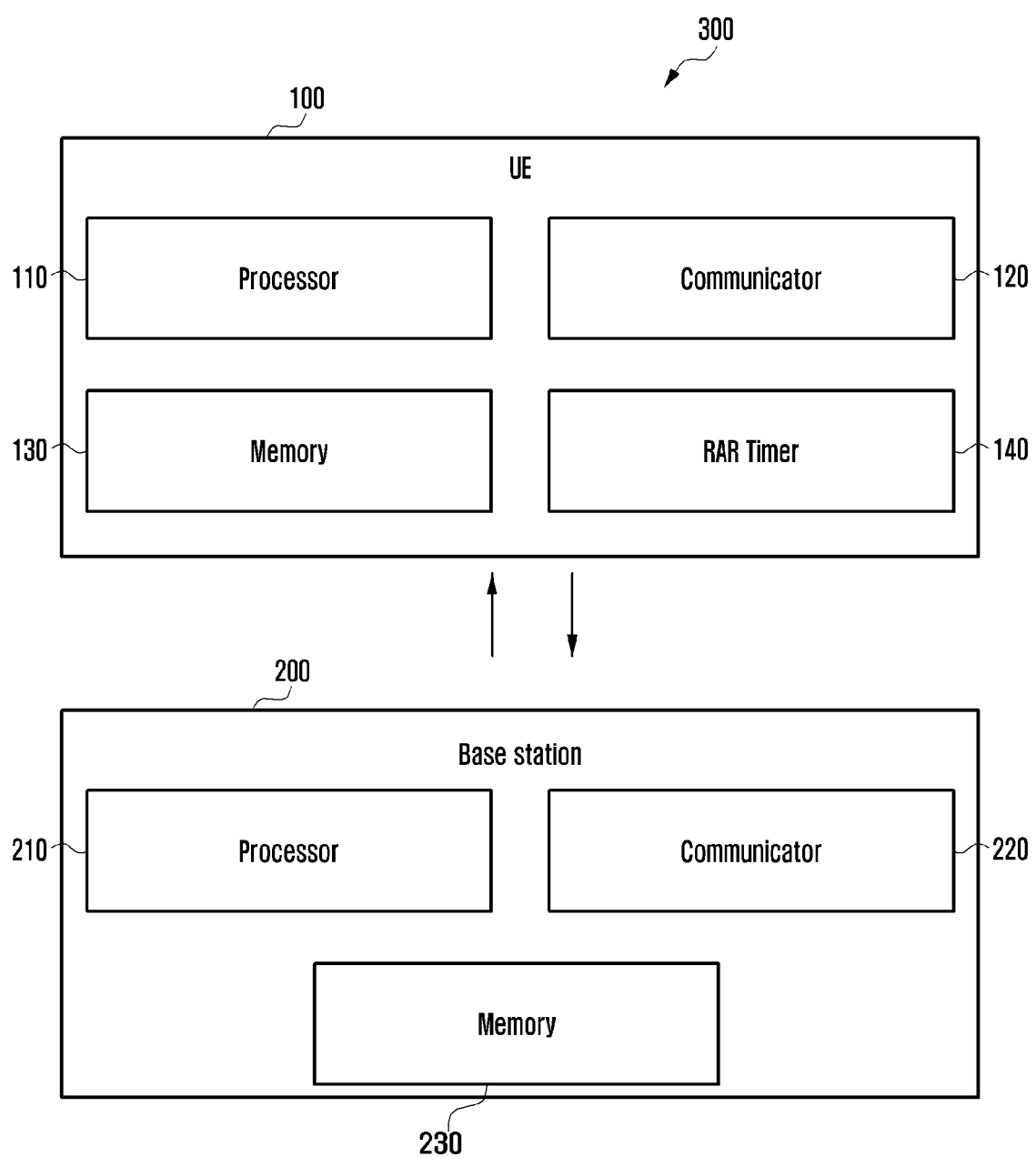
FIG. 2a illustrates an overview of a wireless communication system for handling a RAR reception, according to the embodiments as disclosed herein.

FIG. 2a illustrates an overview of a wireless communication system (300) for handling a RAR reception, according to the embodiments as disclosed herein. In an embodiment, the wireless communication system (300) includes a UE (100) and a base station (200). The UE (100) can be, for example but not limited to a cellular phone, a tablet, a smart phone, a laptop, a Personal Digital Assistant (PDA), a global positioning system, a multimedia device, a video device, an internet of things (IoT) device, a smart watch, a game console, an Unmanned Aerial Vehicle (UAV), an airplane, or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station (200) may also be referred to as a base transceiver station, a radio base station, a radio transceiver, a transceiver function, a basic service set (BSS), an extended service set (ESS), an eNB, a gNB or the like.

In an embodiment, the UE (100) includes a processor (110), a communicator (120), a memory (130) and a RAR timer (140). The processor (110) is coupled with the communicator (120), the memory (130) and the RAR timer (140).

In an embodiment, the processor (110) is configured to transmit the PRACH preamble and determine a frame index value for the transmitted PRACH preamble based on at least one of a system frame number, a COT number, a subframe number and a time duration number. Further, the processor (110) is configured to monitor the RAR in a RAR window based on the determined frame index value.

In an embodiment, the processor (110) is configured to initiate a RAR timer (140). Further, the processor (110) is configured to initiate the RAR timer (140). Further, the processor (110) is configured to monitor the PDCCH transmission addressed to the RA-RNTI value. Further, the processor (110) is configured to determine that the PDCCH addressed to the RA-RNTI is received and the RAR is decoded. Further, the processor (110) is configured to processes a backoff indicator included within the RAR in response to determining that that the PDCCH addressed to the RA-RNTI is received and the RAR is decoded. Further, the processor (110) is configured to determine that the RAR comprises a RAPID transmitted by the UE (100). Further, the processor (110) is configured to determine that the RAR includes the RAPID in response to the RAR comprises the RAPID transmitted by the UE (100). Further, the processor (110) is configured to stop the random access procedure.

In an embodiment, the processor (110) is configured to initiate the RAR timer (140). Further, the processor (110) is configured to monitor the PDCCH transmission addressed to the RA-RNTI value. Further, the processor (110) is configured to determine that the RAR is not received at an end of the PRACH period. Further, the processor (110) is configured to determine that the occurrence of a RACH failure in response to determining that the RAR is not received at the end of the PRACH period. Further, the processor (110) is configured to determine that a RAR monitoring period is greater than the PRACH period. Further, the processor (110) is configured to stop the downlink RAR monitoring procedure. Further, the processor (110) is configured to perform actions applicable on the RACH failure in response to determining that the RAR monitoring period is greater than the PRACH period. The actions are already defined in the 3GPP standard. Based on the 3GPP standard, the processor (110) performs the standard actions.

In an embodiment, the processor (110) is configured to start the RAR timer (140). Further, the processor (110) is configured to monitor the PDCCH transmission addressed to the RA-RNTI value. Further, the processor (110) is configured to determine that the PDCCH transmission addressed to the RA-RNTI value is received. Further, the processor (110) is configured to determine that the frame index value within a DCI and a random access preamble is not selected by a MAC entity of the UE (100). Further, the processor (110) is configured to decode the RAR reception.

In an embodiment, the processor (110) is configured to initiate the RAR timer (140). Further, the processor (110) is configured to monitor the PDCCH transmission addressed to the RA-RNTI. Further, the processor (110) is configured to determine that the PDCCH transmission addressed to the RA-RNTI is received and the RAR is decoded. Further, the processor (110) is configured to process a backoff-indicator included within the RAR based on the determination.

In an embodiment, the processor (110) is configured to determine that the RAR comprises the RAPID transmitted by the UE (100) and the RAR comprises a frame index value corresponding to the frame index value determined by the UE (100). Further, the processor (110) is configured to stop the RAR timer (140). Further, the processor (110) is configured to determine whether the RAR includes the RAPID. Further, the processor (110) is configured to perform one of: stop a random access procedure in response to determine that the RAR only includes RAPID, and process a timing advance within the RAR and a received uplink grant in response to determine that the RAR does not include the RAPID.

In an embodiment, the processor (110) is configured to determine that the RAR comprises the RAPID transmitted by the UE (100). Further, the processor (110) is configured to determine whether the RAR includes the RAPID. Further, the processor (110) is configured to perform one of stop a random access procedure and the RAR timer (140) in response to determine that the RAR includes the RAPID, and determine that the frame index value corresponding to the frame index value determined by the UE (100), process the timing advance within the RAR and the uplink grant, and stop the RAR timer (140) in response to determine that the RAR does not include the RAPID.

In an embodiment, the processor (110) is configured to start the RAR timer (140). Further, the processor (110) is configured to monitor the PDCCH transmission addressed to the RA-RNTI. Further, the processor (110) is configured to determine that the PDCCH transmission addressed to the RA-RNTI is received and the RAR is decoded. Further, the processor (110) is configured to process the backoff-indicator included within the RAR based on the determination. Further, the processor (110) is configured to stop the RAR timer (140). Further, the processor (110) is configured to determine that the RAR comprises the RAPID transmitted by the UE (100). Further, the processor (110) is configured to determine whether the RAR includes RAPID. Further, the processor (110) is configured to perform one of: stop a random access procedure and the RAR timer (140) in response to determine that the RAR includes the RAPID, and determine that an uplink radio resource of an uplink grant included within the RAR is associated with the frame index value corresponding to the PRACH determined by the UE (100), process a timing advance within the RAR and an uplink grant, and stop the RAR timer, in response to determine that the RAR does not include the RAPID.

In an embodiment, the backoff-indicator included within the RAR is processed when at least one of frame index value is included within a MAC sub-header containing the backoff indicator and the frame index value is determined by the UE (100), and the frame index value is not included within the MAC sub-header comprising the backoff indicator.

In an embodiment, the processor (110) is configured to initiate the RAR timer (140). Further, the processor (110) is configured to determine that the downlink radio resource is associated with the frame index value. Further, the processor (110) is configured to monitor the PDCCH transmission addressed to the frame index value within the downlink radio resource. Further, the processor (110) is configured to determine that the PDCCH transmission addressed to the frame index value is received and the RAR is decoded. Further, the processor (110) is configured to process a backoff-indicator included within the RAR based on the determination. Further, the processor (110) is configured to determine that the RAR comprises the RAPID transmitted by the UE (100). Further, the processor (110) is configured to stop the RAR timer (140). Further, the processor (110) is configured to determine whether the RAR includes the RAPID. Further, the processor (110) is configured to perform one of: stop a random access procedure in response to determine that the RAR includes RAPID, and process a timing advance within the RAR and the uplink grant in response to determine that the RAR does not include the RAPID.

In an embodiment, the processor (110) is configured to initiate a RAR timer (140). Further, the processor (110) is configured to determine whether the random access preamble is not selected by the MAC entity of the UE (100). Further, the processor (110) is configured to perform one of: determine that a downlink radio resource which is common to all frame index values in response to determine that the random access preamble is not selected by the MAC entity of the UE (100), and determine that a downlink radio resource is associated with the frame index value in response to determine that the random access preamble is selected by the MAC entity of the UE (100).

In an embodiment, the processor (110) is configured to monitor the PDCCH transmission addressed to the frame index value within the downlink radio resource. Further, the processor (110) is configured to determine that the PDCCH transmission addressed to the frame index value is received and RAR is decoded. Further, the processor (110) is configured to process the backoff-indicator included within the RAR based on the determination. Further, the processor (110) is configured to determine that the RAR comprises the RAPID transmitted by the UE (100). Further, the processor (110) is configured to stop the RAR timer (140). Further, the processor (110) is configured to determine whether the RAR includes the RAPID. Further, the processor (110) is configured to perform one of: stop a random access procedure in response to determine that the RAR includes the RAPID, and process the timing advance within the RAR and the uplink grant, in response to determine that the RAR does not include the RAPID. Further, the processor (110) is configured to determine that at least one of a frame index value within DCI corresponds to the frame index value and a random access preamble is not selected by the MAC entity of the UE (100). Further, the processor (110) is configured to decode the RAR reception.

In an embodiment, the downlink radio resource includes at least one of a CORESET, a PDCCH search space, a time domain radio resource, a frequency domain radio resource, and a bandwidth part.

In an embodiment, the uplink radio resource includes at least one of a CORESET, a PDCCH search space, a time domain radio resource, a frequency domain radio resource, and a bandwidth part.

The processor (110) is configured to execute instructions stored in the memory (130) and to perform various processes. The communicator (120) is configured for communicating internally between internal hardware components and with external devices via one or more networks.

The memory (130) stores instructions to be executed by the processor 140. The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Further, the base station (200) includes a processor (210), a communicator (220), and a memory (230). The processor (210) is coupled with the communicator (220) and the memory (230).

The processor (210) is configured to determine one of the RA-RNTI value and the frame index value for a random access response message based on at least one of the system frame number, the COT number, the subframe number and the time duration number. Further, the processor (210) is configured to send the random access response message comprising one of the RA-RNTI value and the frame index value to the UE (100). In an embodiment, the frame index value is included in one of a DCI identified by a RA-RNTI which schedules RAR message, a RAR MAC sub-header of the random access response message and a RAR payload of the random access response message.

The processor (210) is configured to execute instructions stored in the memory (230) and to perform various processes. The communicator (220) is configured for communicating internally between internal hardware components and with external devices via one or more networks.

The memory (230) stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In some examples, the memory (230) can be configured to store larger amounts of information than the memory. In certain examples, a non-transitory storage medium may store data that can, over time, change (e.g., in Random Access Memory (RAM) or cache).

Although the FIG. 2a shows various hardware components of the wireless communication system (300) but it is to be understood that other embodiments are not limited thereon. In other embodiments, the wireless communication system (300) may include less or more number of components. Further, the labels or names of the components are used only for illustrative purpose and does not limit the scope of the invention. One or more components can be combined together to perform same or substantially similar function to handle the random access response (RAR) reception.

Figure 2B:
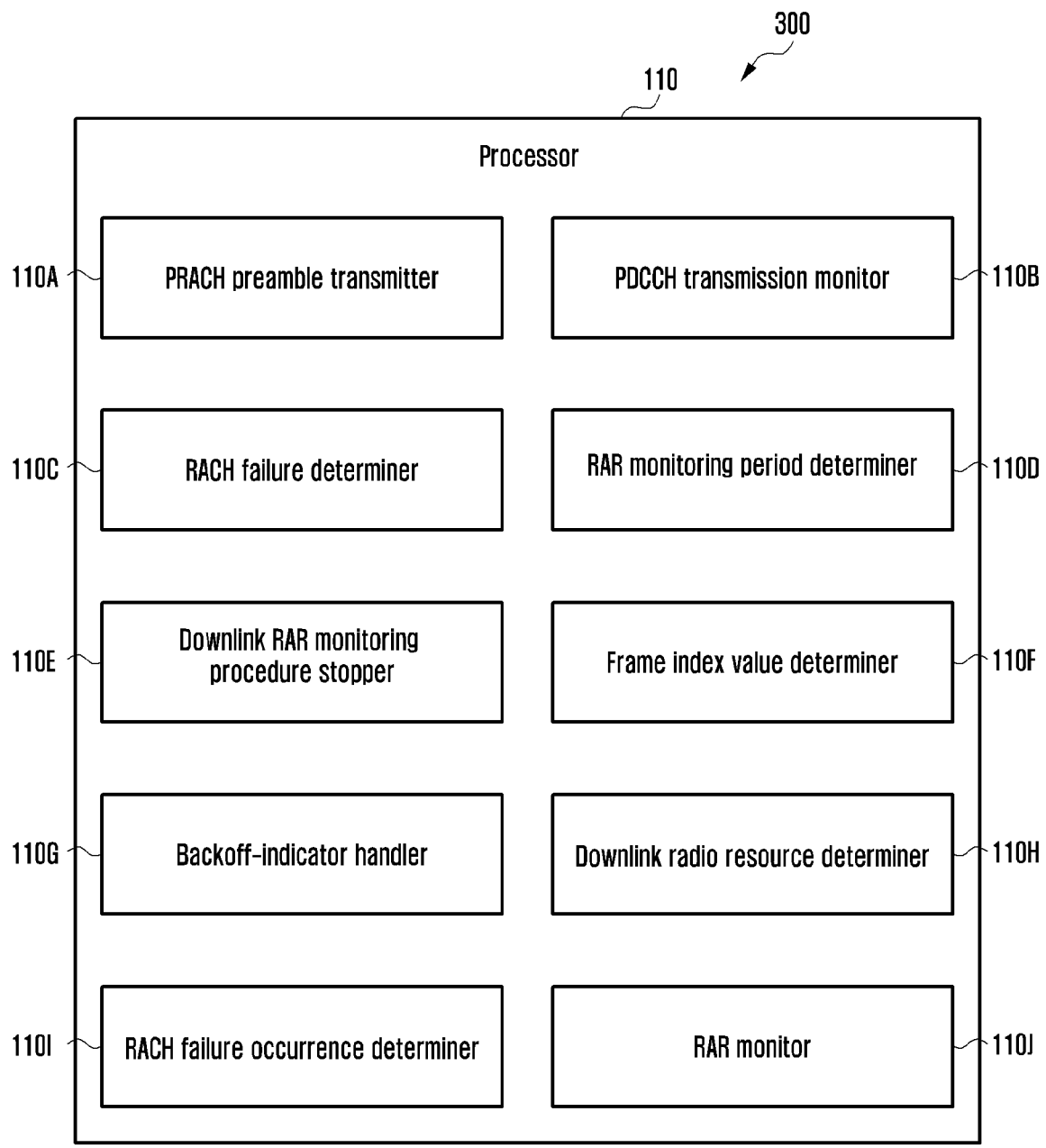
FIG. 2b is a block diagram of a processor included in a UE, according to the embodiments as disclosed herein.

FIG. 2b is a block diagram of the processor (110) included in the UE (100), according to the embodiments as disclosed herein. In an embodiment, the processor 110 includes a PRACH preamble transmitter 110a, a PDCCH transmission monitor 110b, a RACH failure determiner 110c, a RAR monitoring period determiner 110d, a downlink RAR monitoring procedure stopper 110e, a frame index determiner 110f, a backoff-indicator handler 110g, a downlink radio resource determiner 110h, a RACH failure occurrence determiner (110i) and a RAR monitor (110j).

In an embodiment, the PRACH preamble transmitter (110a) is configured to transmit the PRACH preamble. After transmitting the PRACH preamble, the frame index value determiner (110f) is configured to determine the frame index value for the transmitted PRACH preamble based on at least one of the system frame number, the COT number, the subframe number and the time duration number. Based on the determined frame index value, the RAR monitor (110j) is configured to monitor the RAR in the RAR window.

In an embodiment, the processor (110) is configured to initiate the RAR timer (140). Further, the PDCCH transmission monitor (110b) is configured to monitor the PDCCH transmission addressed to the RA-RNTI value. Further, the backoff-indicator handler (110g) is configured to determine that the PDCCH addressed to the RA-RNTI is received and the RAR is decoded. Further, the backoff-indicator handler (110g) is configured to processes the backoff indicator included within the RAR in response to determining that that the PDCCH addressed to the RA-RNTI is received and the RAR is decoded. Further, the processor (110) is configured to determine that the RAR comprises the RAPID transmitted by the UE (100). Further, the processor (110) is configured to determine that the RAR includes the RAPID in response to the RAR comprises the RAPID transmitted by the UE (100). Further, the processor (110) is configured to stop the random access procedure.

In an embodiment, the processor (110) is configured to initiate the RAR timer (140). Further, the PDCCH transmission monitor (110b) is configured to monitor the PDCCH transmission addressed to the RA-RNTI value. Further, the RACH failure occurrence determiner (110i) is configured to determine that the RAR is not received at the end of the PRACH period. Further, the RACH failure occurrence determiner (110i) is configured to determine that the occurrence of the RACH failure in response to determining that the RAR is not received at the end of the PRACH period. Further, the RACH failure occurrence determiner (110i) is configured to determine that the RAR monitoring period is greater than the PRACH period. Further, the RACH failure occurrence determiner (110i) is configured to stop the downlink RAR monitoring procedure. Further, the RACH failure occurrence determiner (110i) is configured to perform actions applicable on the RACH failure in response to determining that the RAR monitoring period is greater than the PRACH period.

In an embodiment, the processor (110) is configured to start the RAR timer (140). Further, the PDCCH transmission monitor (110b) is configured to monitor the PDCCH transmission addressed to the RA-RNTI value. Further, the frame index determiner (110f) is configured to determine that the PDCCH transmission addressed to the RA-RNTI value is received. Further, the frame index determiner (110f) is configured to determine that the frame index value within the DCI and a random access preamble is not selected by a MAC entity of the UE (100). Further, the RAR reception monitor (110j) is configured to decode the RAR reception.

In an embodiment, the processor (110) is configured to initiate the RAR timer (140). Further, the PDCCH transmission monitor (110b) is configured to monitor the PDCCH transmission addressed to the RA-RNTI. Further, the backoff-indicator handler (110g) is configured to determine that the PDCCH transmission addressed to the RA-RNTI is received and the RAR is decoded. Further, the backoff-indicator handler (110g) is configured to process the backoff-indicator included within the RAR based on the determination.

In an embodiment, the processor (110) is configured to initiate the RAR timer (140). Further, the downlink radio resource determiner (110h) is configured to determine that the downlink radio resource is associated with the frame index value. Further, the downlink radio resource determiner (110h) is configured to monitor the PDCCH transmission addressed to the frame index value within the downlink radio resource. Further, the downlink radio resource determiner (110h) is configured to determine that the PDCCH transmission addressed to the frame index value is received and the RAR is decoded. Further, the backoff-indicator handler (110g) is configured to process the backoff-indicator included within the RAR based on the determination. Further, the processor (110) is configured to determine that the RAR comprises the RAPID transmitted by the UE (100). Further, the processor (110) is configured to stop the RAR timer (140). Further, the processor (110) is configured to determine whether the RAR includes the RAPID. Further, the processor (110) is configured to perform one of: stop a random access procedure in response to determine that the RAR includes RAPID, and process a timing advance within the RAR and the uplink grant in response to determine that the RAR does not include the RAPID.

In an embodiment, the processor (110) is configured to initiate the RAR timer (140). Further, the downlink radio resource determiner (110h) is configured to determine whether the random access preamble is not selected by the MAC entity of the UE (100). Further, the downlink radio resource determiner (110h) is configured to perform one of: determine that a downlink radio resource which is common to all frame index values in response to determine that the random access preamble is not selected by the MAC entity of the UE (100), and determine that the downlink radio resource is associated with the frame index value in response to determine that the random access preamble is selected by the MAC entity of the UE (100).

Although the FIG. 2b shows various hardware components of the processor (110) but it is to be understood that other embodiments are not limited thereon. In other embodiments, the processor (110) may include less or more number of components. Further, the labels or names of the components are used only for illustrative purpose and does not limit the scope of the invention. One or more components can be combined together to perform same or substantially similar function to handle the RAR reception.

Figure 2C:
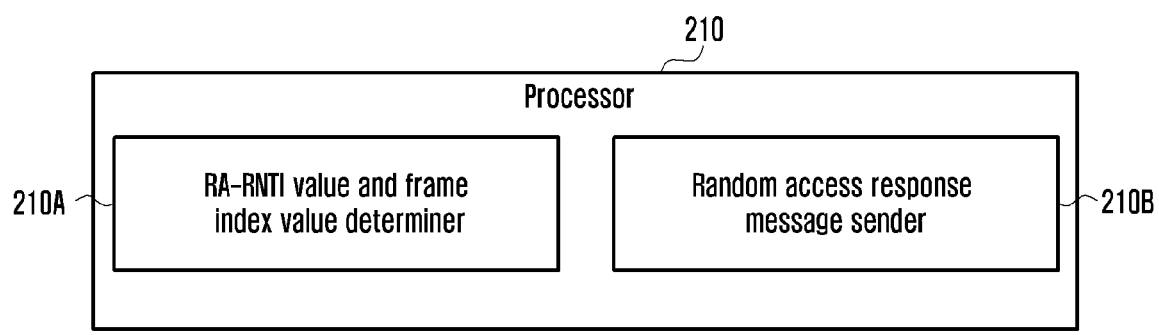
FIG. 2c is a block diagram of a processor included in a base station, according to the embodiments as disclosed herein.

FIG. 2c is a block diagram of the processor (210) included in the base station (200), according to the embodiments as disclosed herein.

In an embodiment, the processor (210) includes a RA-RNTI value and frame index value determiner 210a and a random access response message sender 210b. The RA-RNTI value and frame index value determiner 210a is configured to determine one of the RA-RNTI value and the frame index value for the random access response message based on at least one of the system frame number, the COT number, the subframe number and the time duration number. Further, the Random access response message sender 210b is configured to send the random access response message comprising one of the RA-RNTI value and the frame index value to the UE (100). In an embodiment, the frame index value is included in one of a DCI identified by a RA-RNTI which schedules RAR message, a RAR MAC sub-header of the random access response message and a RAR payload of the random access response message.

Although the FIG. 2c shows various hardware components of the processor (210) but it is to be understood that other embodiments are not limited thereon. In other embodiments, the processor (210) may include less or more number of components. Further, the labels or names of the components are used only for illustrative purpose and does not limit the scope of the invention. One or more components can be combined together to perform same or substantially similar function to handle the RAR reception.

Figure 3:
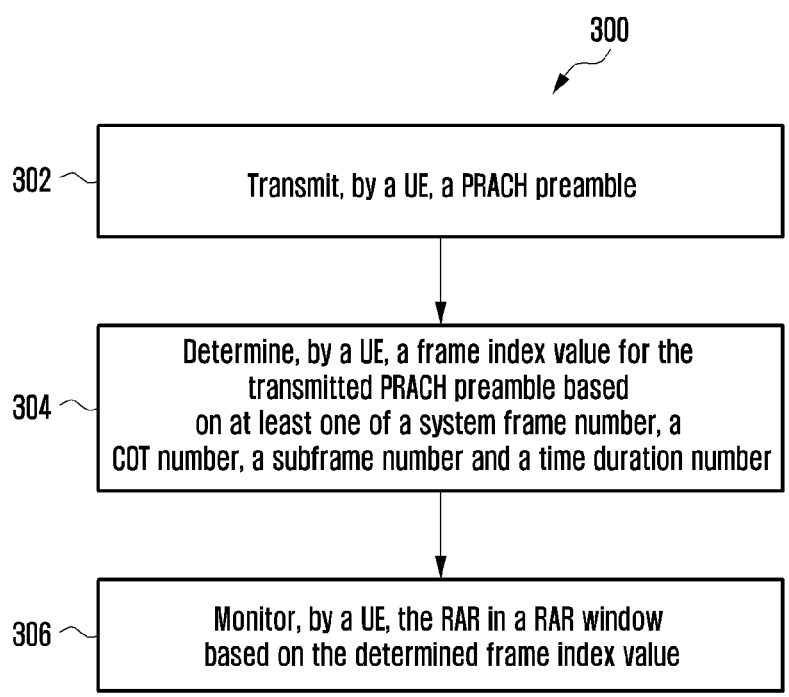
FIG. 3 is a flow chart illustrating a method, implemented by the UE, for handling the RAR reception in the wireless communication system, according to the embodiments as disclosed herein.

FIG. 3 is a flow diagram (300) illustrating a method, implemented by the UE (100), for handling the RAR reception in the wireless communication system (300), according to the embodiments as disclosed herein. The operations (302-306) are performed by the processor (110). At 302, the method includes transmitting the PRACH preamble. At 304, the method includes determining the frame index value for the transmitted PRACH preamble based on at least one of the system frame number, the COT number, the subframe number and the time duration number. At 306, the method includes monitoring the RAR in the RAR window based on the determined frame index value.

Figure 4:
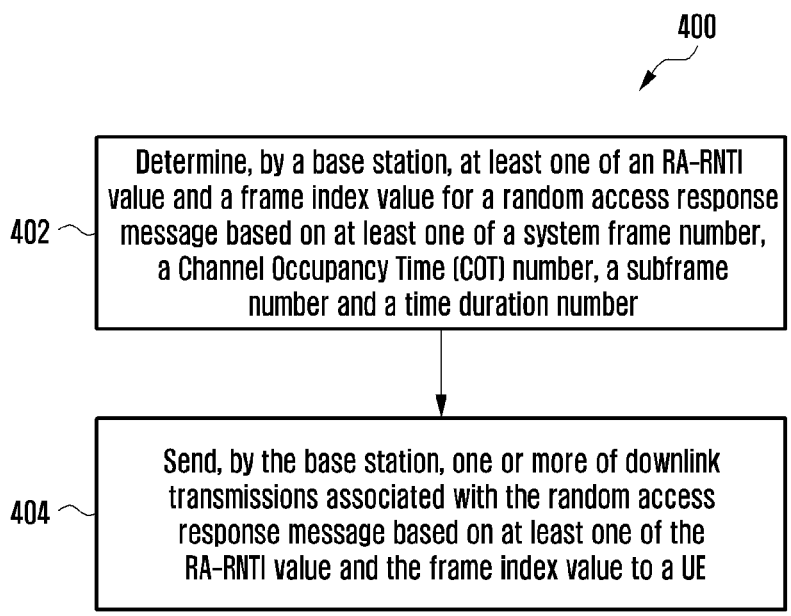
FIG. 4 is a flow chart illustrating a method, implemented by the base station, for handling the RAR reception in the wireless communication system, according to the embodiments as disclosed herein.

FIG. 4 is a flow diagram (400) illustrating a method, implemented by the base station (200), for handling the RAR reception in the wireless communication system (300), according to the embodiments as disclosed herein. The operations (402 and 404) are performed by the processor (210). At 402, the method includes determining at least one of the RA-RNTI value and the frame index value for the random access response message based on at least one of the system frame number, the COT number, the subframe number and the time duration number. At 404, the method includes sending one or more of downlink transmissions associated with the random access response message based on at least one of the RA-RNTI value and the frame index value to the UE (100).

Figure 5:
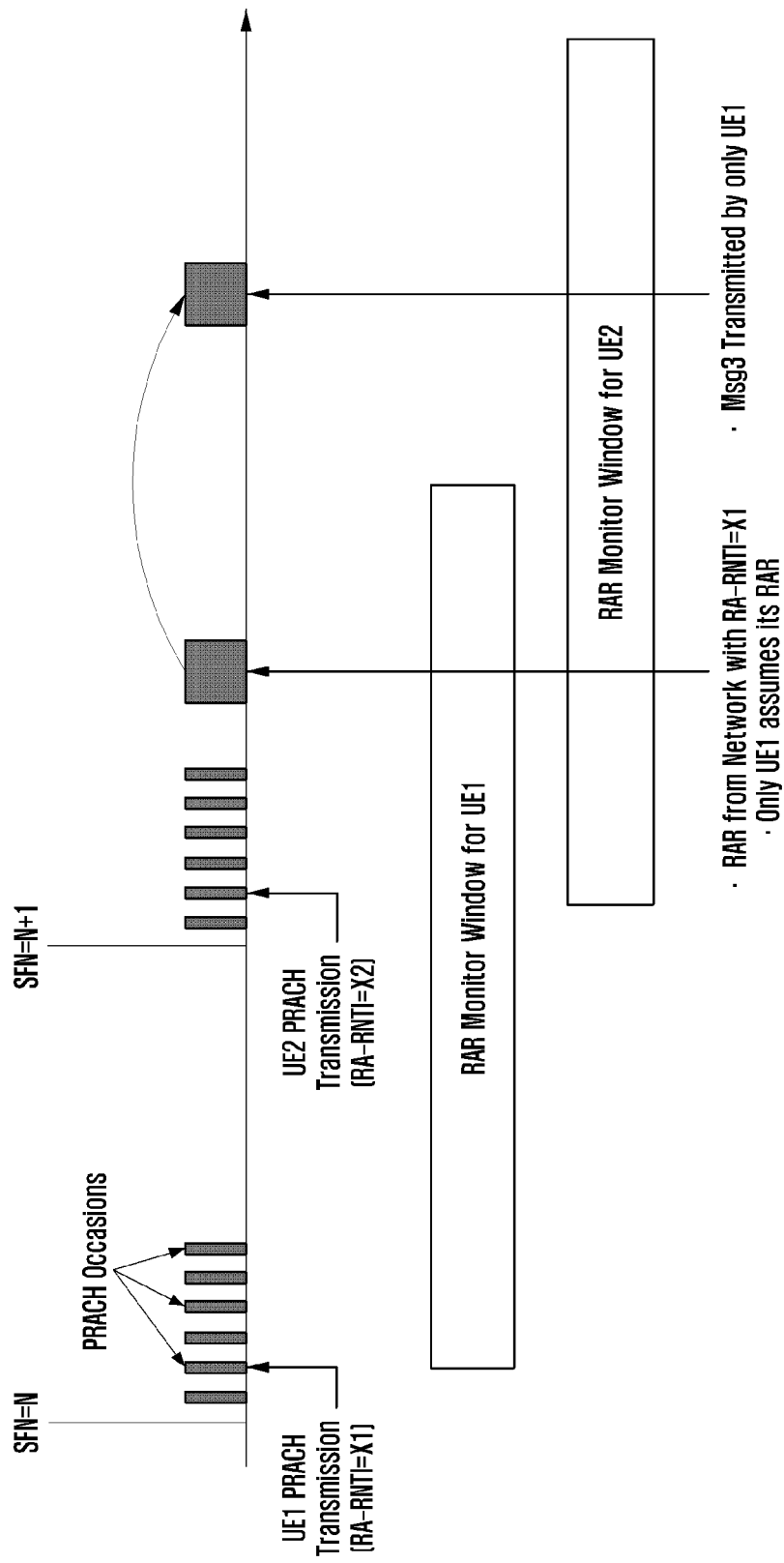
FIG. 5 is another schematic diagram illustrating the RAR reception, according to the embodiments as disclosed herein.

FIG. 5 is a schematic diagram illustrating a random access response reception, according to the embodiments as disclosed herein.

As shown in the FIG. 5, the RA-RNTI calculation is a function of the system frame number where the UE (100) performs PRACH transmission such that the UEs transmitting PRACH over different system frames or COTs or subframes or time periods, but overlapping RAR monitoring window, would always result in different RA-RNTI values. After transmitting PRACH, the UE (100) monitors for the PDCCH identified with the calculated RA-RNTI value corresponding to the transmitted PRACH. There can be different ways by which RA-RNTI can be computed as a function of the system frame number or the COT number or the subframe number or the time duration number where PRACH is transmitted. The various options proposed to compute RA-RNTI are given below.

Option-1: The UE (100) calculates the value of RA-RNTI as the function of the system frame number or the COT number or the subframe number or the time duration number corresponding to the PRACH occasion where the UE (100) performs PRACH transmission as follows:

(a): RA-RNTI is a function of (Frame Index=SFN_id/SFN_period mod SFN_max) where some forms of RA-RNTI calculations can be:

(i): RA-RNTI=1+s_id+14×t_id+14×80×f_id+14×80×8×ul_carrier_id+14×80×8×2×(Frame Index), (ii): RA-RNTI=1+s_id+14×t_id+14×80×f_id+14×80×8×[(Frame Index)]+14×80×8×SFN_max*ul_carrier_id, and (iii): RA-RNTI=1+s_id+14×t_id+14×80×(Frame Index)+14×80×SFN_max×f_id+14×80×SFN_max×8×ul_carrier_id.

(b): Here, SFN_id is a function of the system frame number and/or the COT number (i.e. each network COT is identified by a COT number value which can be broadcasted using DCI or System Information within the COT by the base station (200) or can be determined by the UE (100) e.g. using system frame number and/or subframe number and/or slot number) and/or subframe number and/or a time duration number (e.g. UE (100) can be configured with time windows such that each time window is identified by a time duration number value. The time window can be characterized by a time offset value for start of time window, time window periodicity value and time window duration value). For instance, SFN_id can be same value as system frame number or SFN_id can be same value as the COT number corresponding to the PRACH occasion in which the UE (100) transmits PRACH preamble. SFN_id can be same value as system frame number or SFN_id can be same value as the COT number of the system frame or COT in which PRACH occasion corresponding to UE's transmitted PRACH preamble starts.

(c): SFN_max can be defined as one or more of the following:

(i): SFN_max can be a pre-defined value (e.g. value of SFN_max is fixed in specification), (ii): Configured by the base station (200) (e.g. using system information), (iii): Determined by the UE (100), for instance value of SFN_max can be defined as RAR_window_length/PRACH_period. Here RAR_window_length is the time UE (100) monitors for random access response from the base station (200) and PRACH_period is the time periodicity after which PRACH occasions are repeated. The unit of RAR_window_length and PRACH_period can be same as time unit of SFN_id, (iv) Determined by the UE (100), for instance value of SFN_max can be defined as RAR_window_length. Here RAR_window_length is the time the UE (100) monitors for random access response from the base station (200), and (v) Determined by the UE (100), for instance value of SFN_max can be defined as RAR_window_length/COT_duration. Here RAR_window_length is the time UE (100) monitors for random access response from the base station (200). The unit of RAR_window_length and COT_duration can be same as time unit of SFN_id.

(d): SFN_period can be defined as one or more of the following:

(i): SFN_period can be a pre-defined value (e.g. value of SFN_max is fixed in specification), (ii): Configured by the base station (200) (e.g. using system information), (iii): Determined by UE (100), for instance value of SFN_period can be equal to the time periodicity after which PRACH occasions are repeated, (iv): SFN_period can be equal to one (i.e. one radio frame or system frame), and (v) Determined by UE (100), for instance value of SFN_period can be equal to the COT_duration.

(2) Option-2: The UE (100) calculates the value of the RA-RNTI as the function system frame number or the MCOT number or the subframe number or the time duration number where the UE (100) performs PRACH transmission and random access response window length (i.e. amount of time UE monitors downlink channel for random access response)

(a): RA-RNTI is a function of (Frame Index=SFN_id mod SFN_max) where some forms of RA-RNTI calculations can be:

(i): RA-RNTI=1+s_id+14×t_id+14×80×f_id+14×80×8× ul_carrier_id+14×80×8×2×(Frame Index), (ii): RA-RNTI=1+s_id+14×t_id+14×80×f_id+14×80×8× [(Frame Index)+14×80×8×SFN_max*ul_carrier_id, and (iii): RA-RNTI=1+s_id+14×t_id+14×80×(Frame Index)+ 14×80×SFN_max×f_id+14×80×SFN_max×8×ul_carrier_id.

(b): Here, SFN_id is a function of the system frame number and/or the COT number (i.e. each network COT is identified by the COT number value which can be broadcasted using the DCI or the System Information within the COT by the base station (200) or can be determined by the UE (100) e.g. using system frame number and/or subframe number and/or slot number) and/or subframe number and/or a time duration number (e.g. UE (100) can be configured with time windows such that each time window is identified by a time duration number value. The time window can be characterized by a time offset value for start of time window, time window periodicity value and time window duration value). For instance, SFN_id can be same value as the system frame number or the SFN_id can be same value as COT number corresponding to the PRACH occasion in which the UE (100) transmits PRACH preamble SFN_id can be same value as system frame number or SFN_id can be same value as COT number of the system frame or COT respectively in which PRACH occasion corresponding to UE's transmitted PRACH preamble starts.

(c): SFN_max can be defined as one or more of the following:

(i): SFN_max can be a pre-defined value (e.g. value of SFN_max is fixed in specification), (ii): Configured by the base station (200) (e.g. using system information), (iii): Determined by the UE (100), for instance value of SFN_max can be defined as a function of RAR_window_length. Here RAR_window_length is the time UE (100) monitors for random access response from the base station (200). For instance, SFN_max can be equal to RAR_window_length (in units of radio frames or system frames) configured by gNB for monitoring RAR. Alternately, SFN_max can be equal to maximum possible RAR_window_length (in units of radio frames or system frames) supported in system for monitoring RAR, and (iv) Determined by UE (100), for instance value of SFN_max can be defined as a function of RAR_window_length/ COT_duration. Here RAR_window_length is the time UE (100) monitors for random access response from the base station (200). RAR_window_length and COT_duration are in units of radio frames. This can be used when SFN_id is the COT number.

Further, in an embodiment, the UE (100) calculates RA-RNTI as the function of Frame Index wherein the Frame index is the system frame number or the COT number or the subframe number or the time duration number over which the PRACH is transmitted if one or more of the following conditions are true:

(1): The UE (100) is capable of supporting NR/5G unlicensed operation (i.e., the UE (100) also indicates this capability to the base station (200) using a capability transfer), (2): The UE (100) performs PRACH transmission on an unlicensed carrier/cell, (3): The UE (100) monitors downlink channel for RAR reception on an unlicensed carrier/cell, (4): If SFN_max and/or SFN_period are explicitly configured to the UE (100) using either dedicated configuration or system information, (5): Value of SFN_max determined by the UE (100) or configured by the base station (200) has a value greater than 1, (6): If random access response window length is greater than 10 ms, and (7): If random access preamble is selected by the MAC entity (i.e. PRACH transmission is not performed on contention free resources and PRACH transmission is not for Msg-1 based SI request).

In an embodiment, if none of the above conditions are true then the UE (100) perform RA-RNTI calculation without taking into account system frame number or COT or subframe or time period over which PRACH was transmitted.

Figure 6:
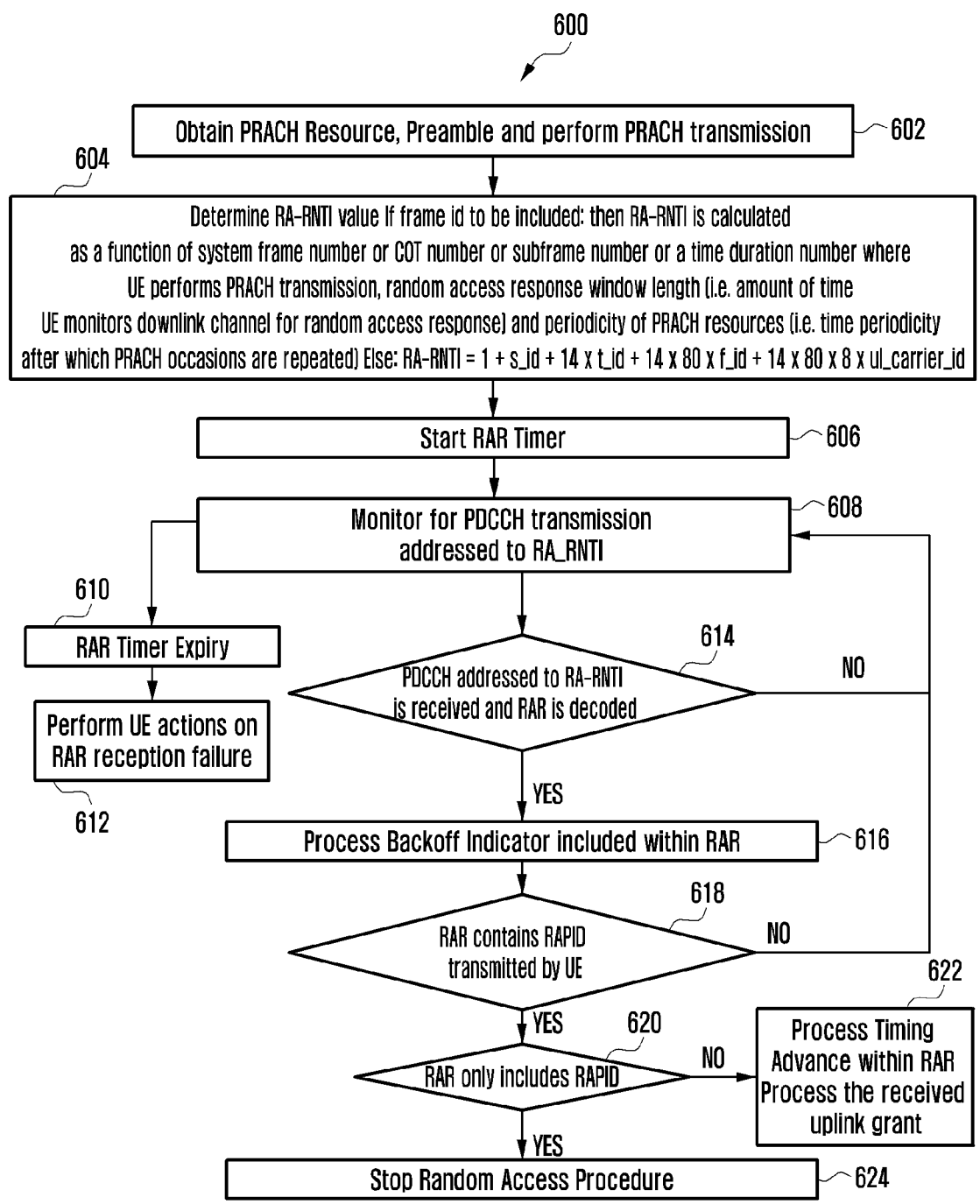
FIG. 6 is another flow diagram illustrating a UE procedure for the RAR reception, according to the embodiments as disclosed herein.

FIG. 6 is a flow diagram (600) illustrating the UE procedure for the random access response reception, according to the embodiments as disclosed herein.

At 602, the method includes obtaining the PRACH Resource, preamble and performing the PRACH transmission. At 604, the method includes determining the RA-RNTI value If frame ID to be included: then RA-RNTI is calculated as a function of system frame number or COT number or subframe number or a time duration number where the UE (100) performs the PRACH transmission, random access response window length (i.e. amount of time UE (100) monitors downlink channel for random access response) and periodicity of PRACH resources (i.e. time periodicity after which PRACH occasions are repeated) Else: RA-RNTI=1+ s_id+14×t_id+14×80×f_id+14×80×8×ul_carrier_id.

At 606, the method includes starting the RAR Timer (140). At 608, the method includes monitoring for PDCCH transmission addressed to RA RNTI. At 610, the method includes expiring the RAR Timer (140).

At 612, the method includes performing the UE actions on RAR reception failure.

At 614, the method includes determining whether the PDCCH addressed to RA-RNTI is received and RAR is decoded. If the PDCCH addressed to RA-RNTI is received and RAR is decoded then, at 616, the method includes processing the Backoff Indicator included within the RAR. If the PDCCH addressed to RA-RNTI is not received and the RAR is not decoded then, the method performs the operation of 608.

At 618, the method includes determining whether the RAR comprises the RAPID transmitted by the UE (100). If the RAR comprises the RAPID transmitted by the UE (100) then, at 620, the method includes determining whether the RAR only includes RAPID. If the RAR does not comprise the RAPID transmitted by the UE (100) then, the method performs the operation of 608. If the RAR does not only include RAPID then, at 622, the method includes processing the timing advance within RAR Process the received uplink grant. If the RAR only includes the RAPID then, at 624, the method includes stopping the random access procedure.

Figure 7:
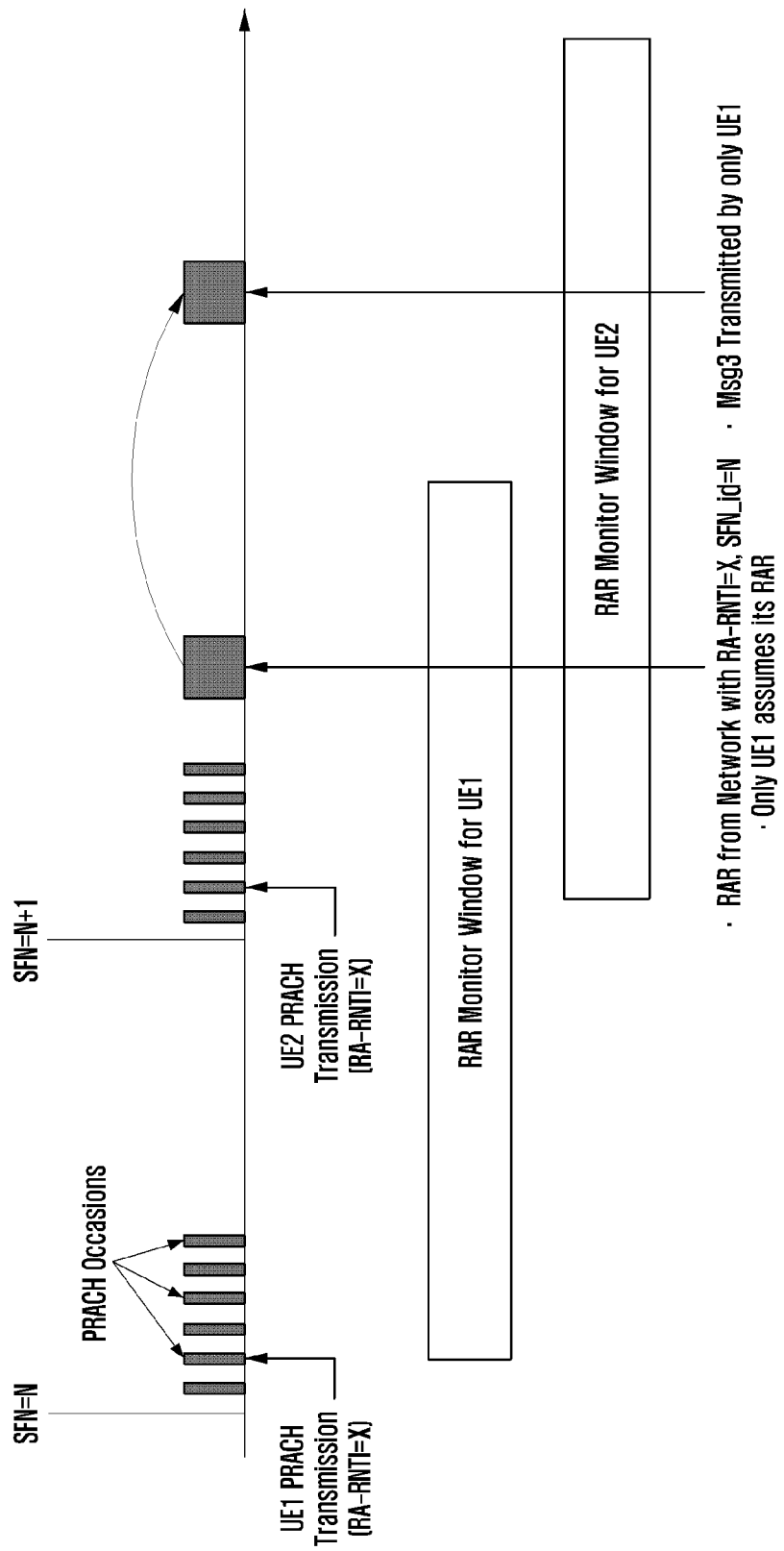
FIG. 7 is another schematic diagram illustrating the RAR reception, according to the embodiments as disclosed herein.

FIG. 7 is another schematic diagram illustrating the random access response reception, according to the embodiments as disclosed herein.

As shown in the FIG. 7, during RAR transmission, the base station (200) may indicate the frame index of the PRACH transmission for which this RAR is applicable for. The frame index value can be included within the DCI of PDCCH identified by the RA-RNTI which schedules RAR message or the frame index can be included within RAR MAC subheader, or frame index can be included within the RAR payload. The frame index value included within DCI/RAR MAC subheader/RAR payload can be one of the following:

(1) Option-1: Frame Index=(SFN_id/SFN_period) mod SFN_max. Here:

(a): SFN_id is a function of the system frame number and/or the COT number (i.e. each network COT is identified by the COT number value which can be broadcasted using the DCI or the System Information within the COT by the base station (200) or can be determined by the UE (100) e.g. using system frame number and/or subframe number and/or slot number) and/or subframe number and/or a time duration number (e.g. the UE (100) can be configured with time windows such that each time window is identified by the time duration number value. The time window can be characterized by the time offset value for start of time window, time window periodicity value and time window duration value). For instance, SFN_id can be same value as system frame number or SFN_id can be same value as the COT number corresponding to the PRACH occasion in which the UE (100) transmits PRACH preamble SFN_id can be same value as system frame number or SFN_id can be same value as COT number of the system frame or COT in which PRACH occasion corresponding to UE's transmitted PRACH preamble starts.

(b): SFN_max can be defined as one or more of the following:

(i): SFN_max can be a pre-defined value (e.g. value of SFN_max is fixed in specification), (ii): Configured by the base station (200) (e.g. using system information)

(iii): Determined by the UE (100), for instance value of SFN_max can be defined as RAR_window_length/PRACH_period. Here RAR_window_length is the time UE (100) monitors for random access response from the base station (200) and PRACH period is the time periodicity after which PRACH occasions are repeated. The unit of RAR_window_length and PRACH period can be same as time unit of SFN_id, (iv) Determined by the UE (100), for instance value of SFN_max can be defined as RAR_window_length. Here RAR_window_length is the time the UE (100) monitors for random access response from the base station (200), and (v) Determined by the UE (100), for instance value of SFN_max can be defined as RAR_window_length/COT_duration. Here RAR_window_length is the time the UE (100) monitors for random access response from the base station (200). The unit of RAR_window_length and COT_duration can be same as time unit of SFN_id.

(c): SFN_period can be defined as one or more of the following:

(i): SFN_period can be a pre-defined value (e.g. value of SFN_max is fixed in specification), (ii): Configured by the base station (200) (e.g. using system information), (iii): Determined by the UE (100), for instance value of SFN_period can be equal to the time periodicity after which PRACH occasions are repeated, (iv): SFN_period can be equal to one (i.e. one radio frame or system frame), and (v) Determined by the UE (100), for instance value of SFN_period can be equal to the COT_duration.

(2) Option-2: Frame Index=SFN_id mod SFN_max. In other words, Frame index is equal to decimal value of 'X' least significant bits of SFN_id where X=$\log_{b\ 2}$(SFN_max). Here:

(a): SFN_id is a function of the system frame number and/or COT number (i.e. each network COT is identified by the COT number value which can be broadcasted using the DCI or the System Information within the COT by the base station (200) or can be determined by the UE (100) e.g. using system frame number and/or subframe number and/or slot number) and/or subframe number and/or a time duration number (e.g. the UE (100) can be configured with time windows such that each time window is identified by the time duration number value. The time window can be characterized by the time offset value for start of time window, time window periodicity value and time window duration value). For instance, SFN_id can be same value as system frame number or SFN_id can be same value as COT number corresponding to the PRACH occasion in which the UE (100) transmits PRACH preamble SFN_id can be same value as system frame number or SFN_id can be same value as COT number of the system frame or COT in which PRACH occasion corresponding to UE's transmitted PRACH preamble starts.

(b): SFN_max can be defined as one or more of the following:

(i): SFN_max can be a pre-defined value (e.g. value of SFN_max is fixed in specification), (ii): Configured by the base station (200) (e.g. using system information), (iii): Determined by the UE (100), for instance value of SFN_max can be defined as the function of RAR_window_length. Here RAR_window_length is the time the UE (100) monitors for random access response from the base station (200). For instance, SFN_max can be equal to RAR_window_length in units of radio frames or system frames) configured by the gNB for monitoring RAR. Alternately, SFN_max can be equal to maximum possible RAR_window_length (in units of radio frames or system frames) supported in system for monitoring RAR, and (iv) Determined by the UE (100), for instance value of SFN_max can be defined as the function of RAR_window_length/COT_duration. Here RAR_window_length is the time the UE (100) monitors for random access response from the base station (200). RAR_window_length and COT_duration are in units of radio frames. This can be used when SFN_id is the COT number.

(3) Option-3: Frame index is a function of the system frame number and/or COT number (i.e. each network COT is identified by the COT number value which can be broadcasted using the DCI or the system information within the COT by the base station (200) or can be determined by the UE (100) e.g. using system frame number and/or subframe number and/or slot number) and/or subframe number and/or a time duration number (e.g. UE (100) can be configured with time windows such that each time window is identified by the time duration number value. The time window can be characterized by the time offset value for start of time window, time window periodicity value and time window duration value). For instance, frame index can be same value as system frame number or frame index can be same value as the COT number.

After transmitting PRACH, the UE (100) monitors for PDCCH identified with the calculated RA-RNTI value corresponding to the transmitted PRACH. Different variants are defined for reception of RAR by the UE (100).

Figure 8A:
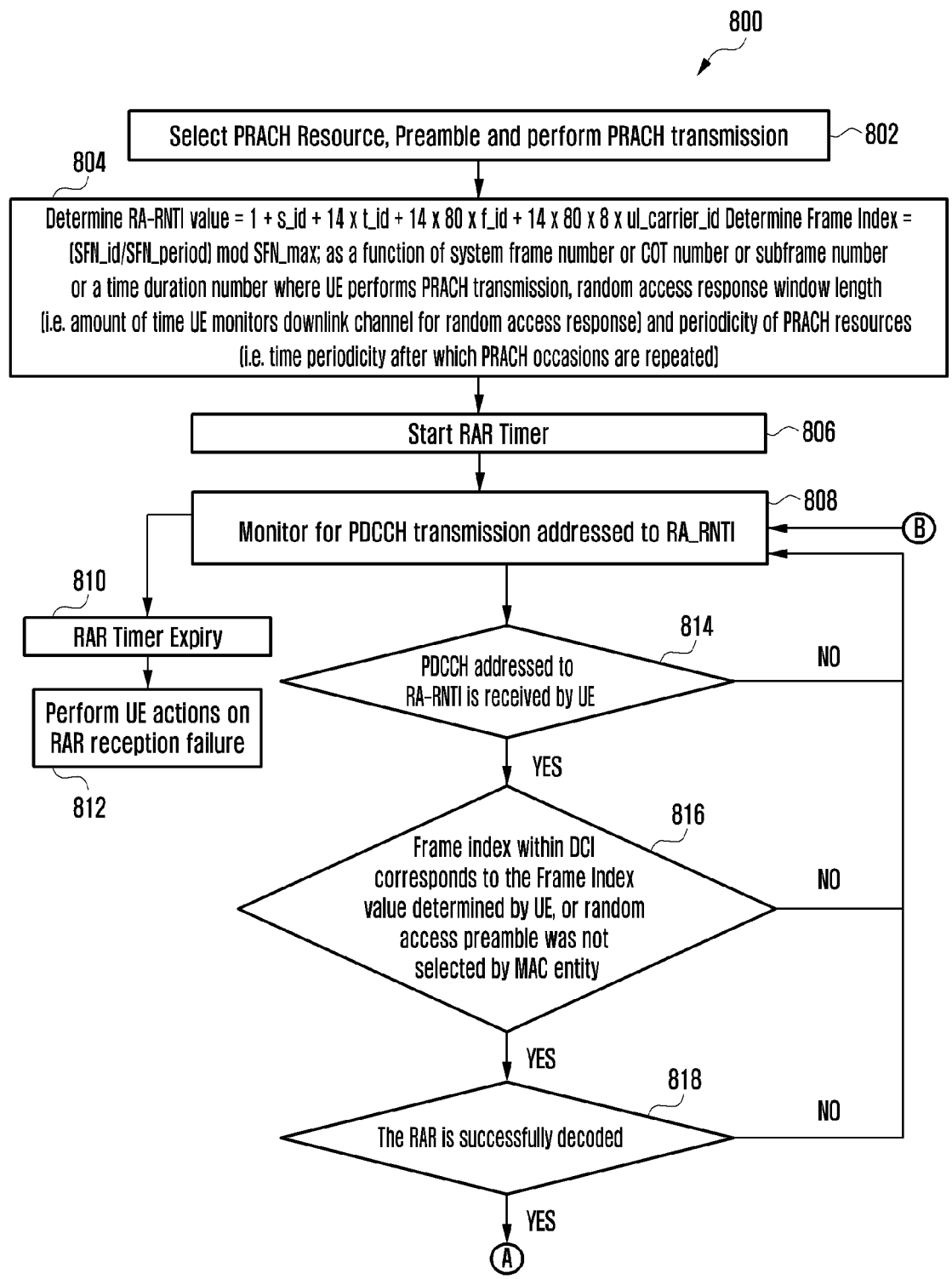
FIG. 8a and FIG. 8b are a flow diagram illustrating a UE procedure for the RAR reception where a frame index is included within a DCI, according to the embodiments as disclosed herein.
Figure 8B:
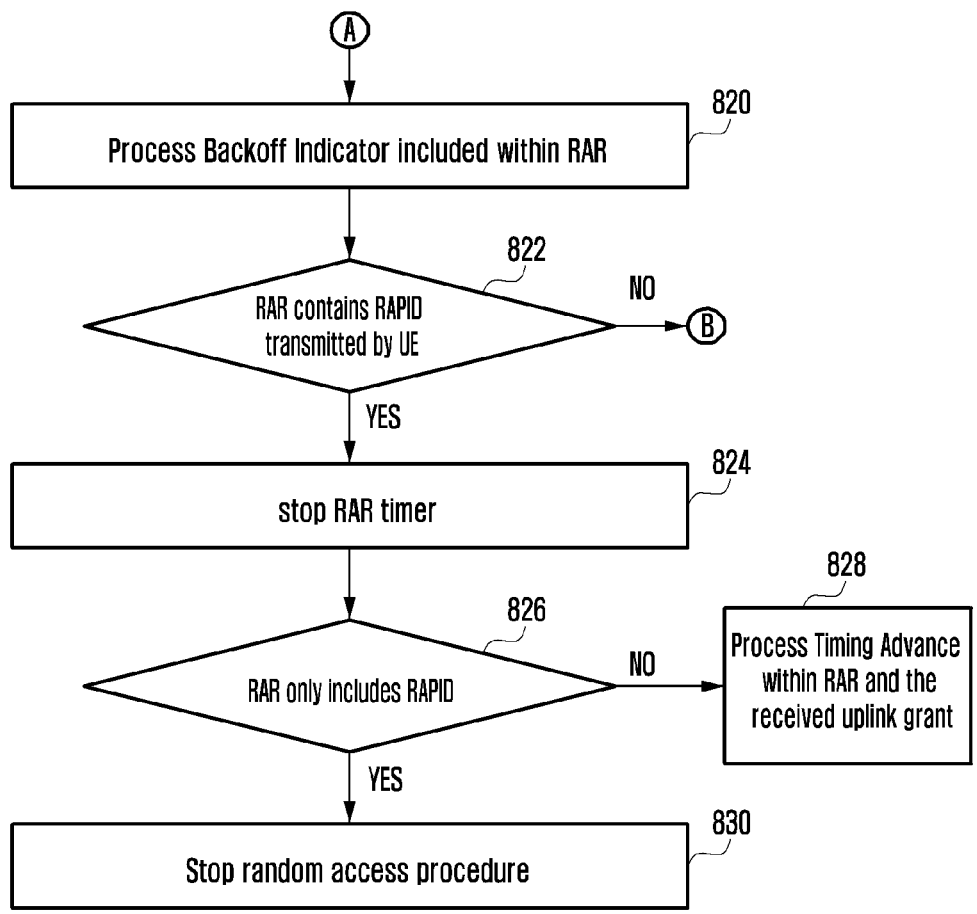

FIG. 8 comprises FIG. 8*a* and FIG. 8*b*. FIG. 8 is a flow diagram (800) illustrating the UE procedure for the RAR reception where the frame index is included within the DCI, according to the embodiments as disclosed herein.

As shown in the FIG. 8, at 802, the method includes selecting the PRACH Resource and preamble and performing the PRACH transmission. At 804, the method includes determining the RA-RNTI value (i.e., RA-RNTI value=1+ s_id+14×t_id+14×80×f_id+14×80×8×ul_carrier_id and determining the Frame Index (i.e., Frame Index=(SFN_id/ SFN_period) mod SFN_max; as a function of system frame number or COT number or subframe number or a time duration number where UE (100) performs PRACH transmission, random access response window length (i.e. amount of time UE (100) monitors downlink channel for random access response) and periodicity of PRACH resources (i.e. time periodicity after which PRACH occasions are repeated).

At 806, the method includes starting the RAR timer (140). At 808, the method includes monitoring the PDCCH transmission addressed to the RA_RNTI. At 810, the method includes expiring the RAR timer (140). At 812, the method includes performing the UE actions on the RAR reception failure.

At 814, the method includes determining whether the PDCCH addressed to RA-RNTI is received by UE (100). If the PDCCH addressed to RA-RNTI is not received by the UE (100) then, the method performs the operation of the 808. If the PDCCH addressed to RA-RNTI is received by the UE (100) then, at 816, the method includes determining whether the frame index within the DCI corresponds to the frame index value determined by the UE (100), or the random access preamble was not selected by the MAC entity of the UE (100). If the frame index within the DCI does not corresponds to the frame index value determined by the UE (100), or the random access preamble was selected by the MAC entity of the UE (100) then the method performs the operation of the 808. If the frame index within the DCI corresponds to the frame index value determined by the UE (100), or the random access preamble was not selected by the MAC entity of the UE (100) then, at 819, the method includes determining whether the RAR is successfully decoded. If the RAR is not successfully decoded then, the method performs the operation of the 808. If the RAR is successfully decoded then, at 820, the method includes processing the Backoff Indicator included within the RAR.

At 822, the method includes determining whether the RAR contains the RAPID transmitted by the UE (100). If the RAR does not contain the RAPID transmitted by the UE (100) then, the method performs the operation of the 808. If the RAR contains the RAPID transmitted by the UE (100) then, at 824, the method includes stopping the RAR timer (140).

At 826, the method includes determining whether the RAR only includes RAPID. If the RAR does not only include the RAPID then, at 828, the method includes processing the timing advance within the RAR and the received uplink grant. If the RAR only includes RAPID then, at 830, the method includes stopping the random access procedure.

Including Frame Index Value within DCI: In an embodiment, as shown in FIG. 5, the frame index value can be included within the DCI identified by RA-RNTI which schedules the RAR message. Two separate DCI formats can be defined, DCI native which schedules RAR but does not include frame index value and DCI_fid which schedules RAR and includes frame index value. The UE (100) can be configured to monitor for DCI native and/or DCI_fid based on one or more of the following:

(1): The UE (100) monitors DCI_fid if the UE (100) is capable of supporting NR/5G unlicensed operation (i.e., the UE (100) also indicates this capability to the base station (200) using capability transfer) or the UE (100) supports RAR window larger than 10 ms.

(2): Same PDCCH search space is used for DCI_native and DCI_fid. In this case, RRC configuration (e.g. PDCCH search space configuration) can also indicate the DCI format to be monitored by the UE (100), i.e. monitoring either DCI_native or DCI_fid or both DCI_native and DCI_fid. If no such information is present then the UE (100) monitors both DCI_fid and DCI_native.

(3): Different PDCCH search spaces are used for the DCI_native and DCI_fid. In this case, the UE (100) monitors the DCI format if corresponding search space is configured or not (for e.g. the UE (100) monitors DCI_fid if search corresponding to DCI_fid is configured).

(4): Different control resource sets are used for DCI_native and DCI_fid (e.g. different RRC IEs are defined for the control resource sets corresponding to DCI_native and DCI_fid or control resource set configuration indicates whether the configuration is applicable for DCI_native or DCI_fid). In this case, the UE (100) monitors for the DCI format if control resource set corresponding to the given DCI format is configured by the base station (200).

(5): The UE (100) only monitors for DCI_fid (i.e. DCI_native is not monitored) if one or more of the given conditions are true: 1) the UE (100) performs PRACH transmission on an unlicensed carrier, 2) the UE (100) is monitoring RAR on an unlicensed carrier, 3) Random access response window length is greater than 10 ms duration, 4) If SFN_max and/or SFN_period are explicitly configured to the UE (100) using either dedicated configuration or system information, 5) Value of SFN_max determined by the UE (100) or configured by the base station (200) has a value greater than 1. Otherwise, the UE (100) monitors DCI_native.

(6): The UE (100) only monitors DCI_native if random access preamble is not selected by the MAC entity (i.e. PRACH transmission is on contention free resources or PRACH transmission is for Msg-1 based SI request).

On receiving the DCI identified by RA-RNTI which has format DCI_fid, the UE (100) proceeds to decoding of MAC RAR PDU if one or more of the following conditions are true:

(1): If the random access preamble was is not selected by the MAC entity (i.e. PRACH transmission is on contention free resources or PRACH transmission is for Msg-1 based SI request), then the UE (100) tries to decode MAC RAR Packet Data Unit (PDU) irrespective of the value frame index value included within the DCI.

(2): If frame index value included within the DCI is equal to the frame index value determined by the UE (100)

corresponding to PRACH occasion over which the UE (100) performed PRACH transmission.

Including Frame Index Value within RAR: RAR Format: In an embodiment, the frame index value can be included within the MAC subheader for RAR or RAR payload. Following fields are present within MAC subheader containing backoff indicator for the RAR:

(1) Option-1: Frame index is present or not is indicated by an explicit flag or bit within the MAC sub-header.

(a) E: The Extension field is a flag indicating if the MAC subPDU including this MAC subheader is the last MAC subPDU or not in the MAC PDU.

(b) T: The Type field is a flag indicating whether the MAC subheader contains a Random Access Preamble ID or a Backoff Indicator.

(c) F: The Frame field indicates whether the MAC subheader contains a Frame Index field or not. The F field is set to "1" to indicate the presence of Frame Index field in the subheader (FI). F field always precedes the FI field.

(d) BI: The Backoff Indicator field identifies the overload condition in the cell.

(e) FI: The Frame Index field indicates the frame index value corresponding to the system frame where the UE (100) has performed PRACH transmission. This field is not required to be included by the base station (200) and/or decoded by the UE (100) if 'F' field indicates absence of FI field.

(2) Option-2: Frame index is present or not is indicated by Type field (e.g. 2 bit value) within the MAC sub-header.

(a) E: The Extension field is a flag indicating if the MAC subPDU including this MAC subheader is the last MAC subPDU or not in the MAC PDU.

(b) T: The Type field is a 2 bit value indicating whether the MAC subheader contains the Random Access Preamble ID or the Backoff Indicator. This field also indicates whether the MAC subheader contains a Frame Index field or not. For e.g. Type field is set to "00" to indicate the presence of Backoff indicator (BI) only, "01" can indicate the presence of Backoff indicator (BI) along with Frame Index (FI), "10" can indicate the presence of RAPID without FI field and "11" can indicate the presence of RAPID with FI field. Any other interpretation of Type field is not precluded.

(c) BI: The Backoff Indicator field identifies the overload condition in the cell.

(d) FI: The Frame Index field indicates the frame index value corresponding to the system frame where the UE (100) has performed PRACH transmission. This field is not required to be included by the base station (200) and/or decoded by the UE (100) if 'F' field indicates absence of FI field.

(3) Option-3: Frame index is mandatorily present within the MAC subheader.

(a) E: The Extension field is a flag indicating if the MAC subPDU including this MAC subheader is the last MAC subPDU or not in the MAC PDU.

(b) T: The Type field is a flag indicating whether the MAC subheader contains a Random Access Preamble ID or a Backoff Indicator.

(c) BI: The Backoff Indicator field identifies the overload condition in the cell.

(d) FI: The Frame Index field indicates the frame index value corresponding to the system frame where the UE (100) has performed PRACH transmission. This field is not required to be included by the base station (200) and/or decoded by the UE (100) if 'T' field indicates absence of FI field.

Following fields are present within MAC subheader containing random access preamble identity for RAR:

(1) Option-1: Frame index is present or not is indicated by an explicit flag or bit within the MAC sub-header.

(a) E: The Extension field is a flag indicating if the MAC subPDU including this MAC subheader is the last MAC subPDU or not in the MAC PDU.

(b) T: The Type field is a flag indicating whether the MAC subheader contains a Random Access Preamble ID or a Backoff Indicator.

(c) F: The Frame field indicates whether the MAC subheader contains a Frame Index field or not. The F field is set to "1" to indicate the presence of Frame Index field in the subheader (FI). F field always precedes the FI field.

(d) RAPID: The Random Access Preamble Identifier field identifies the transmitted Random Access Preamble.

(e) FI: The Frame Index field indicates the frame index value corresponding to the system frame where the UE (100) has performed PRACH transmission. This field is not required to be included by the cellular base station (200) and/or decoded by the UE (100) if 'F' field indicates absence of FI field.

(2) Option-2: Frame index is present or not is indicated by Type field (e.g. 2 bit value) within the MAC sub-header.

(a) E: The Extension field is a flag indicating if the MAC subPDU including this MAC subheader is the last MAC subPDU or not in the MAC PDU.

(b) T: The Type field is a 2 bit value indicating whether the MAC subheader contains a Random Access Preamble ID or a Backoff Indicator. This field also indicates whether the MAC subheader contains a Frame Index field or not. For e.g. Type field is set to "00" to indicate the presence of Backoff indicator (BI) only, "01" can indicate the presence of Backoff indicator (BI) along with Frame Index (FI), "10" can indicate the presence of RAPID without FI field and "11" can indicate the presence of RAPID with FI field. Any other interpretation of Type field is not precluded.

(c) RAPID: The Random Access Preamble IDentifier field identifies the transmitted Random Access Preamble.

(d) FI: The Frame Index field indicates the frame index value corresponding to the system frame where the UE (100) has performed PRACH transmission. This field is not required to be included by the cellular base station (200) and/or decoded by UE (100) if 'T' field indicates absence of FI field.

(3) Option-3: Frame index is mandatorily present within the MAC subheader.

(a) E: The Extension field is a flag indicating if the MAC subPDU including this MAC subheader is the last MAC subPDU or not in the MAC PDU.

(b) T: The Type field is a flag indicating whether the MAC subheader contains a Random Access Preamble ID or a Backoff Indicator.

(c) RAPID: The Random Access Preamble IDentifier field identifies the transmitted Random Access Preamble.

(d) FI: The Frame Index field indicates the frame index value corresponding to the system frame where the UE (100) has performed PRACH transmission. This field is not required to be included by the cellular base station (200) and/or decoded by the UE (100) if 'F' field indicates absence of FI field.

Following fields are present within MAC RAR payload:

(1) Option-1: Frame index is present or not is indicated by an explicit flag or bit within the MAC RAR payload.

(a) Timing Advance Command: The Timing Advance Command field indicates the index value Timing Advance (TA) used to control the amount of timing adjustment that the MAC entity has to apply.

(b) Uplink (UL) Grant: The Uplink Grant field indicates the resources to be used on the uplink.

(c) Temporary C-RNTI: The Temporary C-RNTI field indicates the temporary identity that is used by the MAC entity during Random Access.

(d) F: The Frame field indicates whether the MAC subheader contains a Frame Index field or not. The F field is set to "1" to indicate the presence of Frame Index field in the subheader (FI). F field always precedes the FI field.

(e) FI: The Frame Index field indicates the frame index value corresponding to the system frame where the UE (100) has performed PRACH transmission. This field is not required to be included by the cellular base station (200) and/or decoded by the UE (100) if 'F' field indicates absence of FI field.

(2) Option-2: Frame index is mandatorily present within the MAC RAR payload.

(a) Timing Advance Command: The Timing Advance Command field indicates the index value TA used to control the amount of timing adjustment that the MAC entity has to apply.

(b) UL Grant: The Uplink Grant field indicates the resources to be used on the uplink.

(c) Temporary C-RNTI: The Temporary C-RNTI field indicates the temporary identity that is used by the MAC entity during Random Access.

(d) FI: The Frame Index field indicates the frame index value corresponding to the system frame where the UE (100) has performed PRACH transmission. This field is not required to be included by the cellular base station (200) and/or decoded by the UE (100) if 'F' field indicates absence of FI field.

Figure 9A:
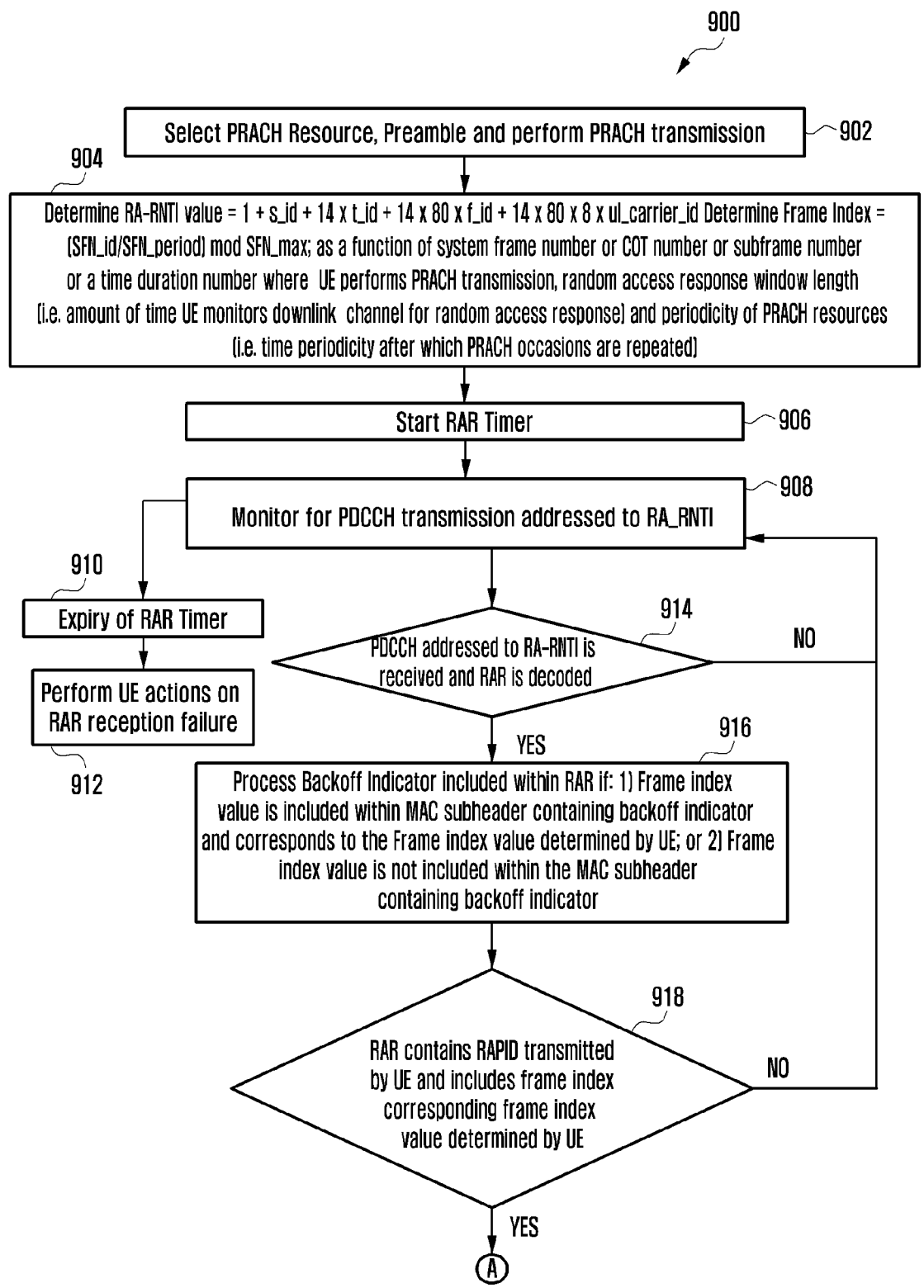
FIG. 9a, FIG. 9b, FIG. 10a and FIG. 10b are flow diagrams illustrating a UE procedure for the RAR reception where a frame index is included within a RAR, according to the embodiments as disclosed herein.
Figure 9B:
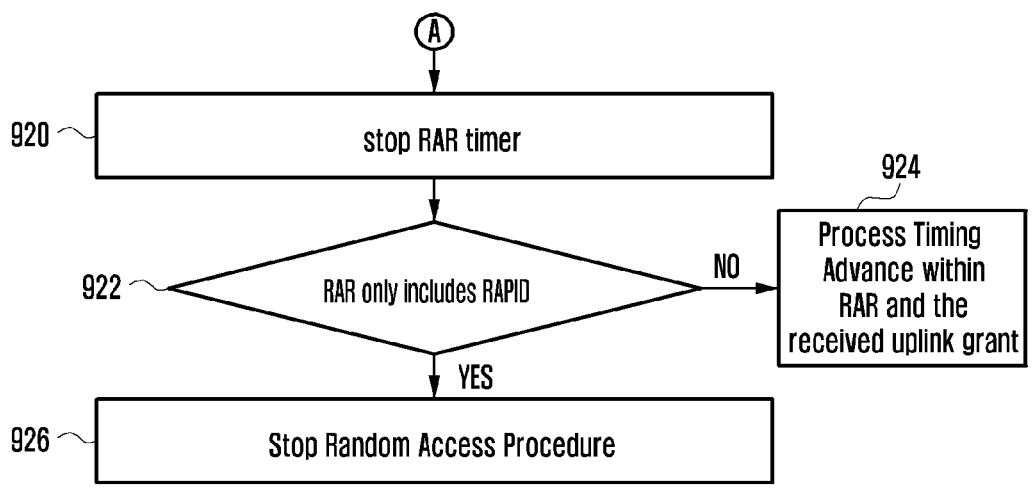

FIG. 9 comprises FIG. 9a, FIG. 9b. FIG. 9 is a flow diagram (900) illustrating the UE procedure for the RAR reception where the frame index is included within the RAR, according to the embodiments as disclosed herein.

At 902, the method includes selecting the PRACH resource and preamble and performing the PRACH transmission. At 904, the method includes determining the RA-RNTI value (i.e., RA-RNTI value=1+s_id+14×t_id+14×80×f_id+14×80×8×ul_carrier_id and determining the Frame Index (i.e., Frame Index=(SFN_id/SFN_period) mod SFN_max; as a function of system frame number or COT number or subframe number or a time duration number where the UE (100) performs the PRACH transmission, random access response window length (i.e. amount of time the UE (100) monitors downlink channel for random access response) and periodicity of PRACH resources (i.e. time periodicity after which PRACH occasions are repeated).

At 906, the method includes starting the RAR timer (140). At 908, the method includes monitoring the PDCCH transmission addressed to RA_RNTI. At 910, the method includes expiring the RAR timer (140). At 912, the method includes performing the UE actions on the RAR reception failure.

At 914, the method includes determining whether the PDCCH addressed to RA-RNTI is received and the RAR is decoded. If the PDCCH addressed to RA-RNTI is not received and the RAR is not decoded then, the method performs the operation of the 908.

At 916, the method includes processing the Backoff indicator included within the RAR if 1) Frame index value is included within MAC subheader containing backoff indicator and corresponds to the Frame index value determined by the UE (100), or 2) the frame index value is not included within the MAC subheader containing the backoff indicator.

At 918, the method includes determining whether the RAR contains the RAPID transmitted by the UE (100) and includes the frame index corresponding frame index value determined by the UE (100). If the RAR does not contain the RAPID transmitted by the UE (100) and does not include the frame index corresponding frame index value determined by the UE (100) then, the method performs the operation of the 908.

If the RAR contains the RAPID transmitted by the UE (100) and includes the frame index corresponding frame index value determined by the UE (100) then, at 920, the method includes stopping the RAR timer (140). At 922, the method includes determining whether the RAR only includes the RAPID. If the RAR does only include the RAPID then, at 924, the method includes processing the timing advance within the RAR and the received uplink grant. If the RAR only includes the RAPID then, at 926, the method includes stopping the random access procedure.

UE Procedure on Receiving RAR: As shown in the FIG. 9, two separate RAR formats (MAC subheader and/or MAC RAR payload) can be used by the cellular base station (200) and the UE (100), RAR native which cannot contain frame index value and RAR_fid which can contain frame index value either in MAC subheader or MAC RAR payload. The UE (100) can be configured to receive RAR native and/or RAR_fid based on one or more of the following:

(1): The UE (100) monitors RAR_fid if the UE (100) is capable of supporting NR/5G unlicensed operation (i.e., the UE (100) also indicates this capability to cellular base station (200) using capability transfer) or the UE (100) supports RAR window size larger than 10 ms.

(2): RRC configuration (e.g. random access configuration of a cell) can also indicate the RAR format to be monitored by the UE (100), i.e. monitoring either RAR native or RAR_fid.

(3): DCI format or DCI content may indicate the format of RAR which is scheduled by the given DCI. For e.g. (a): 1 bit parameter value can be present within the DCI indicating the RAR format i.e. RAR native or RAR_fid, (b): DCI format used to schedule RAR native is different than DCI format used to schedule RAR_fid. After receiving a DCI, the UE (100) determines the format of RAR based on the format of decoded DCI scheduling the RAR.

(4): The UE (100) only monitors for RAR_fid (i.e. RAR native is not monitored) if one or more of the given conditions are true: 1) the UE (100) performs PRACH transmission on the unlicensed carrier, 2) the UE (100) is monitoring RAR on the unlicensed carrier, 3) Random access response window length is greater than 10 ms duration, 4) If SFN_max and/or SFN_period are explicitly configured to the UE (100) using either dedicated configuration or system information, 5) Value of SFN_max determined by the UE (100) or configured by the base station (200) has a value greater than 1. Otherwise, the UE (100) monitors RAR native.

(5): The UE (100) only monitors RAR native if random access preamble is not selected by the MAC entity (i.e. PRACH transmission is on contention free resources or PRACH transmission is for Msg-1 based SI request).

In another embodiment, as shown in the FIG. 9, the UE checks (100) the frame index value for RAR containing only RAPID field (i.e. SI request) and for RAR containing RAPID and RAR payload. If a downlink assignment has been received on the PDCCH for the RA-RNTI and the received TB is successfully decoded:

(1): If the random access response contains the backoff indicator subheader and either frame index value is not included or the frame index value included within the backoff indicator subheader corresponds to the frame index value determined by the UE (100) where the UE (100) has performed PRACH transmission, then the UE (100) applies the backoff value indicated within the BI field of backoff indicator subheader. Else, the UE (100) applies Oms as backoff value.

(2): If the random access response contains the RAPID in the MAC subheader corresponding to the random access preamble transmitted by the UE (100) and either frame index value is not included or the frame index value included within the RAR corresponds to the frame index value determined by the UE (100) corresponding to PRACH occasion where the UE (100) has performed PRACH transmission, then the UE (100) considers the random access response reception successful.

(3): If random access response reception is successful, then (a): the UE (100) may stop RAR window timer (raResponseWindow).

(b): If RAR includes RAPID only, then consider random access procedure successfully completed and indicate acknowledgement for the SI request to upper layers (i.e. UE (100) considers SI reception successful only after checking both RAPID and frame index value included within RAR).

(c): Else, further process the RAR payload, e.g. timing advance command, uplink grant, temporary C-RNTI.

Figure 10A:
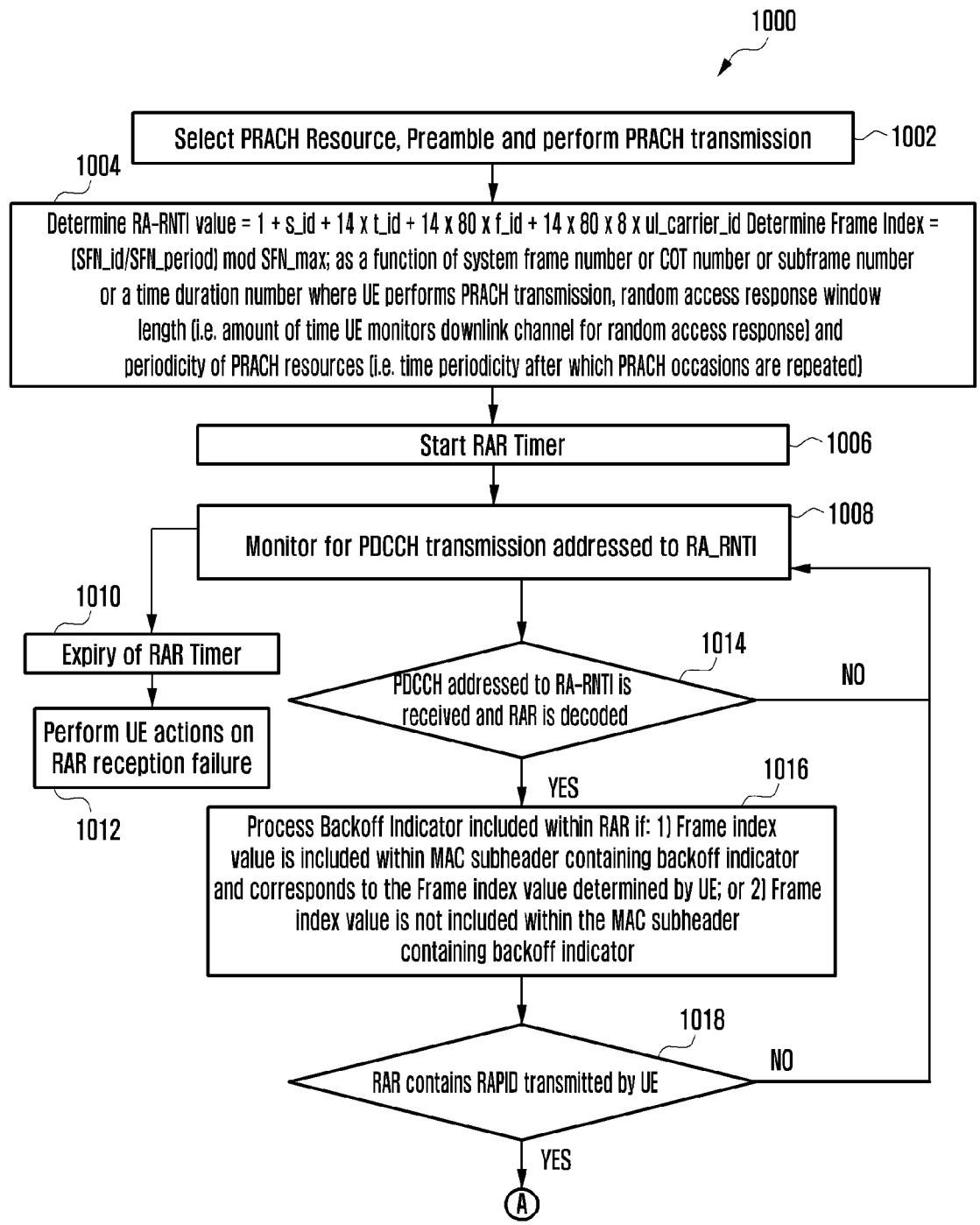
Figure 10B:
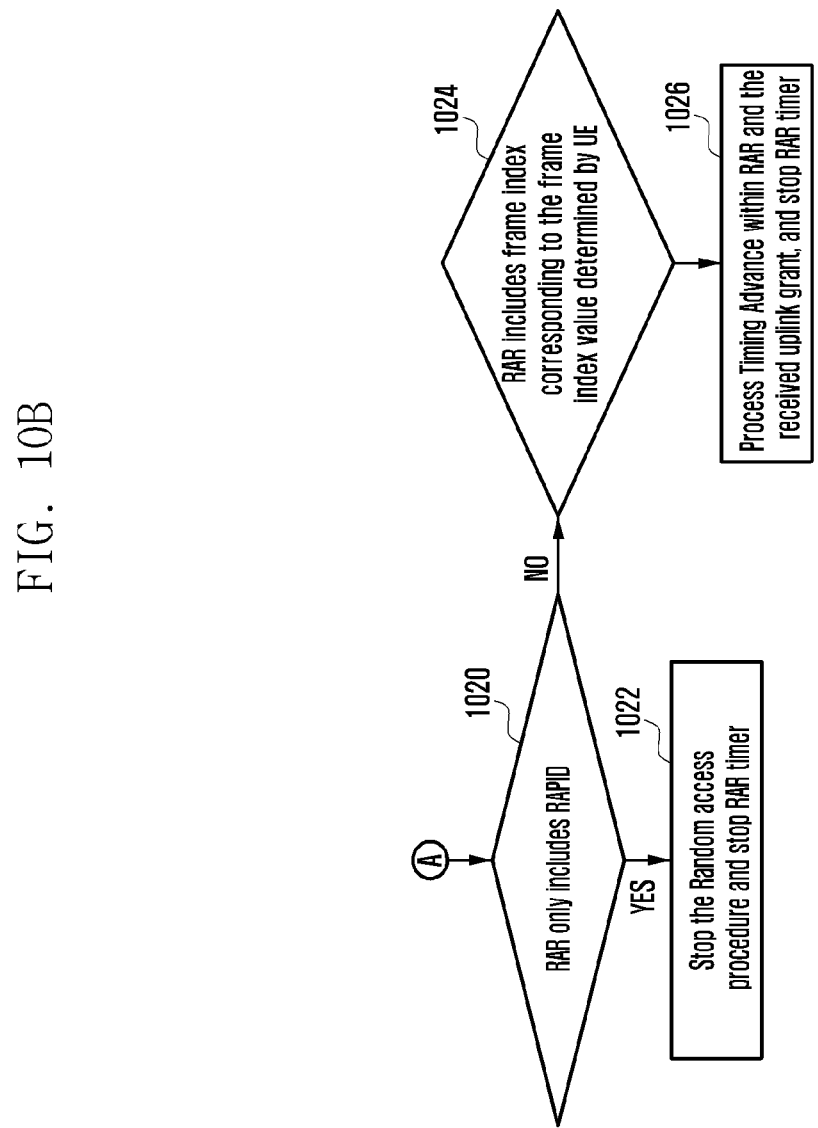

FIG. 10 comprises FIG. 10*a* and FIG. 10*b*. FIG. 10 is a flow diagram (1000) illustrating the UE procedure for RAR reception where the frame index is included within the RAR, according to the embodiments as disclosed herein.

At 1002, the method includes selecting the PRACH resource and preamble and performing the PRACH transmission. At 1004, the method includes determining the RA-RNTI value (i.e., RA-RNTI value=1+s_id+14×t_id+14×80×f_id+14×80×8×ul_carrier_id or determining the Frame Index (i.e., Frame Index=(SFN_id/SFN_period) mod SFN_max; as a function of system frame number or COT number or subframe number or a time duration number where the UE (100) performs the PRACH transmission, random access response window length (i.e. amount of time the UE (100) monitors downlink channel for random access response) and periodicity of PRACH resources (i.e. time periodicity after which PRACH occasions are repeated).

At 1006, the method includes starting the RAR timer (140). At 1008, the method includes Monitor for PDCCH transmission addressed to RA_RNTI At 1010, the method includes expiring of the RAR timer (140). At 1012, the method includes performing the UE actions on the RAR reception failure.

At 1014, the method includes determining whether the PDCCH addressed to RA-RNTI is received and the RAR is decoded. If the PDCCH addressed to RA-RNTI is not received and the RAR is not decoded then, the method performs the operation at 1008.

If the PDCCH addressed to RA-RNTI is received and the RAR is decoded then, at 1016, the method includes processing the Backoff Indicator included within the RAR if the frame index value is included within the MAC subheader containing the backoff indicator and corresponds to the frame index value determined by the UE (100), or the frame index value is not included within the MAC subheader containing the backoff indicator.

At 1018, the method includes determining whether the RAR contains the RAPID transmitted by the UE (100). If the RAR does not contain the RAPID transmitted by the UE (100) then, the method performs the operation at 1008. If the RAR contains the RAPID transmitted by the UE (100) then, the method includes determining whether the RAR only includes the RAPID. If the RAR only includes the RAPID then, at 1022, the method includes stopping the random access procedure and stopping the RAR timer (140). If the RAR does not only include the RAPID then, at 1024, the method includes determining whether the RAR includes frame index corresponding to the frame index value determined by the UE (100). At 1026, the method includes processing the timing advance within the RAR and the received uplink grant, and stopping the RAR timer (140).

In another embodiment, as shown in the FIG. 10, the UE (100) does not checks the frame index value for RAR containing only RAPID field (i.e. SI request) but checks the frame index value for RAR containing both RAPID and RAR payload. If a downlink assignment has been received on the PDCCH for the RA-RNTI and the received TB is successfully decoded:

(1): If the random access response contains the backoff indicator subheader and either frame index value is not included or the frame index value included within the backoff indicator subheader corresponds to the frame index value determined by the UE (100) where the UE (100) has performed PRACH transmission, then the UE (100) applies the backoff value indicated within the BI field of backoff indicator subheader. Else, the UE (100) applies Oms as backoff value.

(2): The UE (100) considers the random access response reception successful if the random access response contains the RAPID in the MAC subheader corresponding to the random access preamble transmitted by the UE (100) and (a): If RAR contains RAPID only; or (b): Frame index value is not included within the RAR; or (c): Frame index value included within the RAR corresponds to the frame index value determined by the UE (100) where the UE (100) has performed PRACH transmission, then the UE (100) considers the random access response reception successful.

(3): If random access response reception is successful, then (a): the UE (100) may stop RAR window timer (raResponseWindow)

(b): If RAR includes RAPID only, then consider random access procedure successfully completed and indicate acknowledgement for the SI request to upper layers (i.e. UE (100) considers SI reception successful by checking the RAPID included within the RAR).

(c): Else, further process the RAR payload, e.g. timing advance command, uplink grant, temporary C-RNTI.

Figure 11:
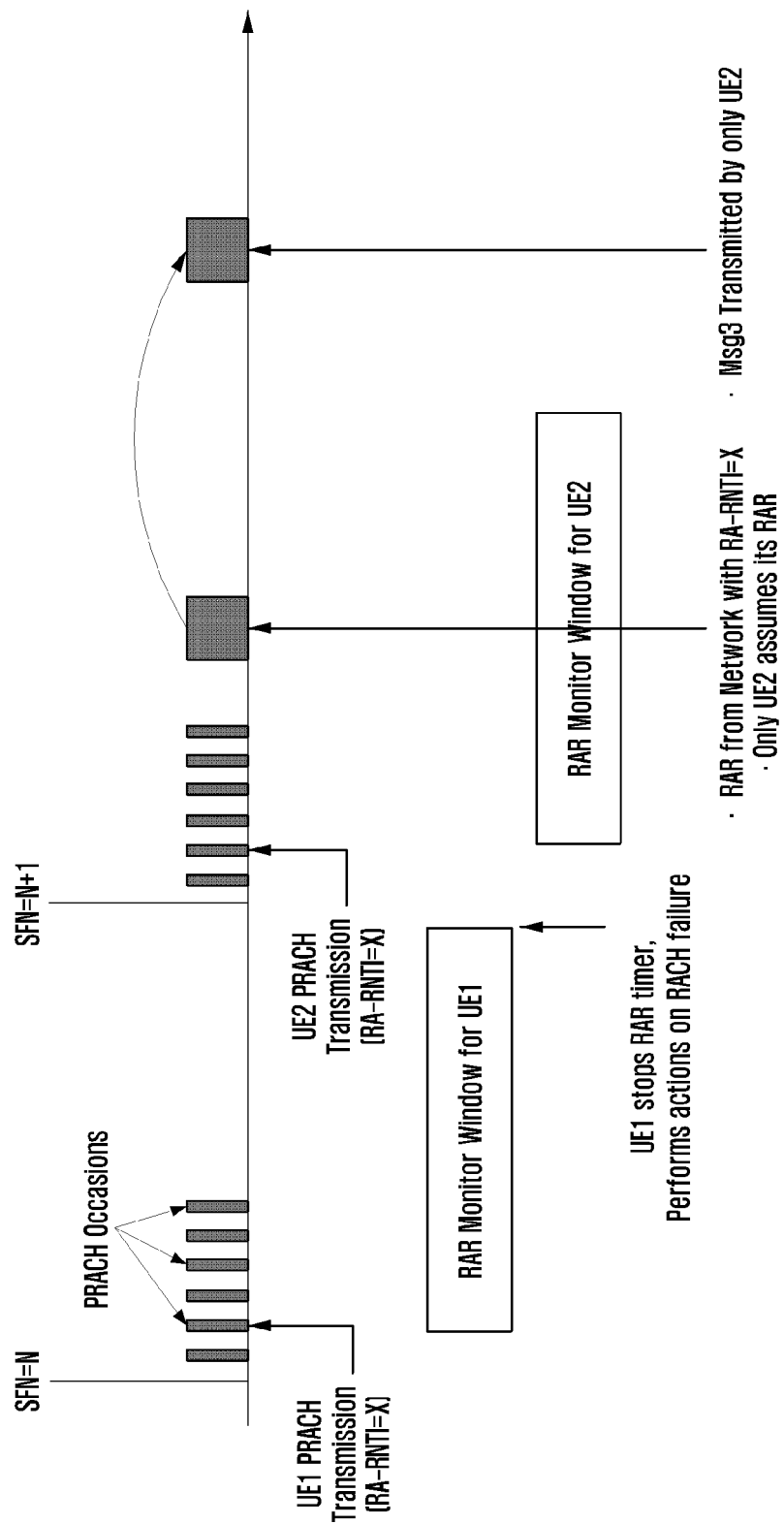
FIG. 11 is another schematic diagram illustrating the RAR reception, according to the embodiments as disclosed herein.

FIG. 11 is another schematic diagram illustrating the random access response reception, according to the embodiments as disclosed herein.

The RACH failure at the end of PRACH period if RAR is not received: In another embodiment, as shown in the FIG. 11 and FIG. 12, the UE (100) starts to monitor downlink channel to receive random access response message from the cellular base station (200). The duration of time UE (100) monitors for random access response is determined by the RAR_window_length. If the random access response monitoring duration exceeds the PRACH period (i.e. number of system frames after which PRACH occasions are repeated) and the UE (100) has not successfully received the random access response identified by the RA-RNTI and including the random access preamble identity used by the UE (100), then the UE (100) stops performing downlink RAR monitoring and performs actions applicable on RACH failure if time elapsed since PRACH transmission becomes equal to or greater than PRACH period. The end of PRACH period can be defined as one or more of the following:

(1): End of system frame before the system frame where PRACH occasions are available, and (2): If the UE (100) transmitted PRACH on slot-X and symbol-Y, then end of PRACH period is at slot-X (and symbol-Y) of the next system frame where PRACH occasions are available.

At the end of PRACH period, if UE (100) doesn't receive RAR addressed to its RA-RNTI and preamble:

(1): Stop RAR window timer if running, and (2): Perform actions as applicable for random access failure.

Figure 12:
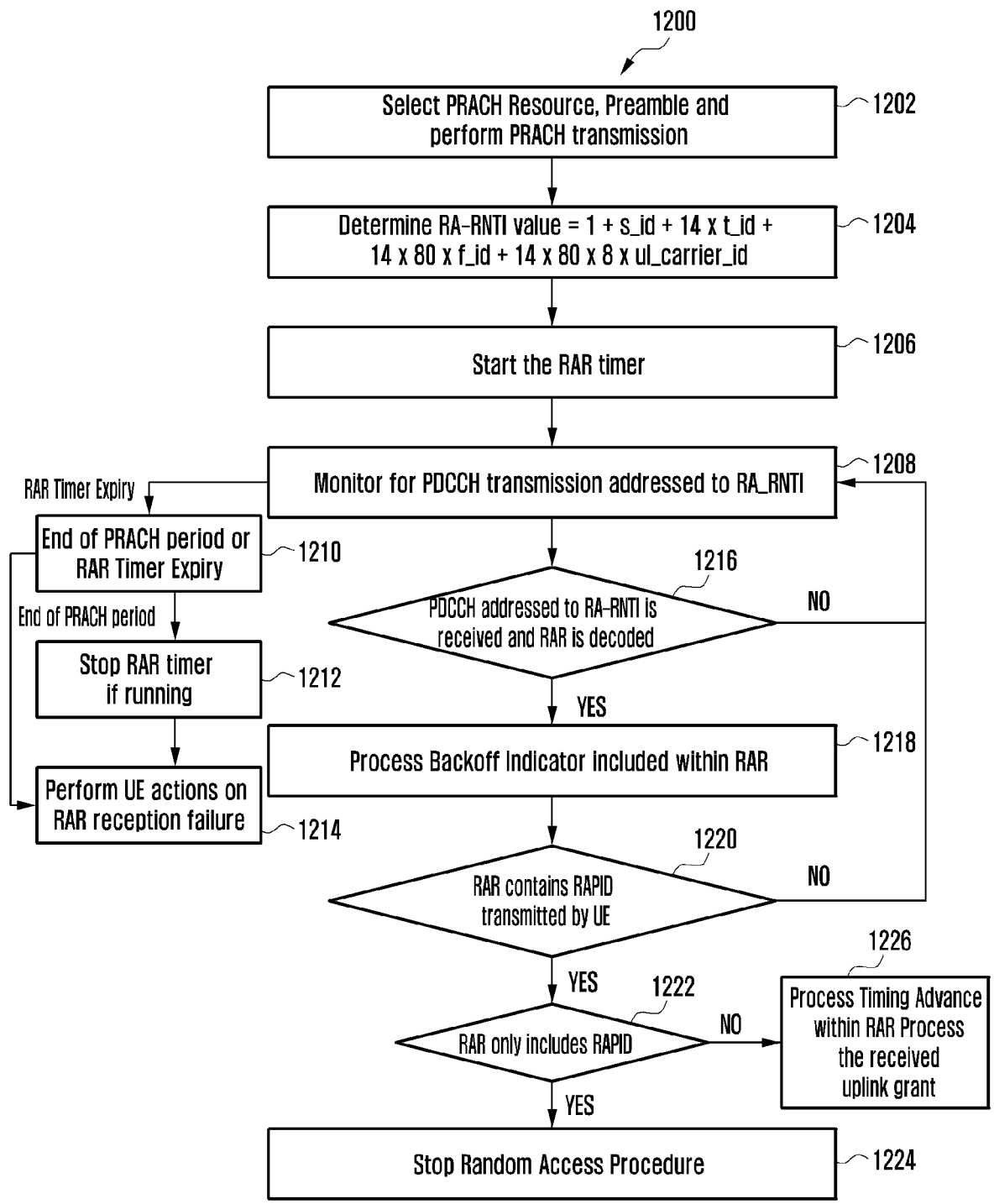
FIG. 12 is a flow diagram illustrating the UE procedure for the RAR reception in case of the RACH failure at the end of PRACH period if RAR is not received, according to the embodiments as disclosed herein.

FIG. 12 is a flow diagram (1200) illustrating the UE procedure for the random access response reception in case of the RACH failure at the end of PRACH period if RAR is not received, according to the embodiments as disclosed herein.

At 1202, the method includes selecting the PRACH Resource and preamble and performing the PRACH transmission. At 1204, the method includes determining the RA-RNTI value (i.e., RA-RNTI value=1+s_id+14×t_id+14×80×f_id+14×80×8×ul_carrier_id). At 1206, the method includes starting the RAR timer (140). At 1208, the method includes monitoring the PDCCH transmission addressed to the RA_RNTI. At 1210, the method includes determining the end of the PRACH period or expiring of the RAR Timer (140). At 1212, the method includes stopping the RAR timer (140) if running. At 1214, the method includes performing the UE actions on the RAR reception failure.

At 1216, the method includes determining whether the PDCCH addressed to RA-RNTI is received and RAR is decoded. If the PDCCH addressed to RA-RNTI is not received and RAR is not decoded then, the method performs the operation at 1208. If the PDCCH addressed to RA-RNTI is received and RAR is decoded then, at 1218, the method includes processing the Backoff Indicator included within the RAR.

At 1220, the method includes determining whether the RAR contains the RAPID transmitted by the UE (100). If the RAR does not contain the RAPID transmitted by the UE (100) then, the method performs the operation at 1208.

If the RAR contains the RAPID transmitted by the UE (100) then, at 1222, the method includes determining whether the RAR only includes the RAPID. If the RAR only includes the RAPID then, at 1224, the method includes stopping the random access procedure. If the RAR does not only include the RAPID then, at 1226, the method includes processing the timing advance within the RAR and the received uplink grant.

Figure 13:
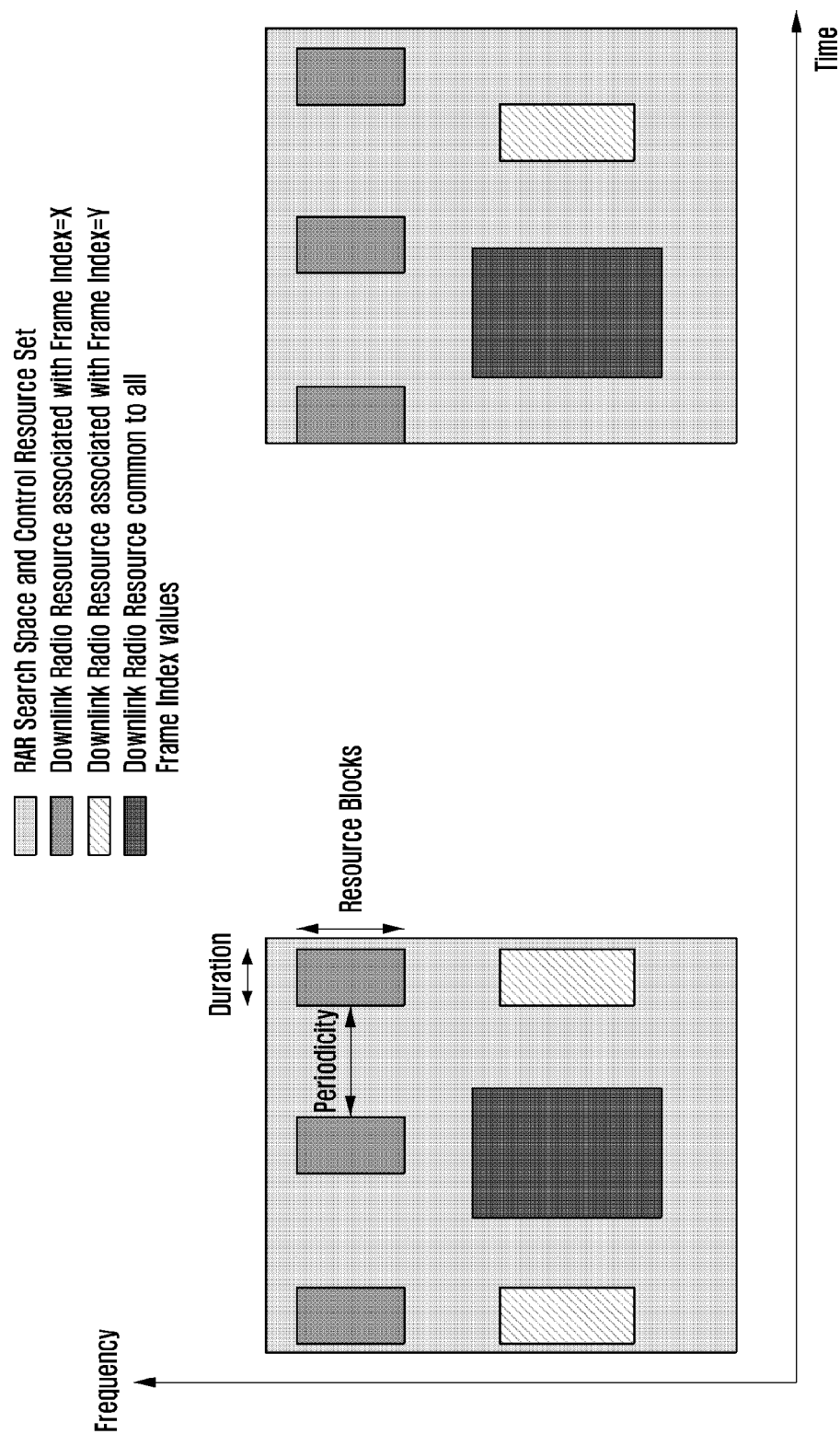
FIG. 13 illustrates a resource configuration for RAR reception where a time/frequency resource restriction for a RAR monitoring, according to the embodiments as disclosed herein.

FIG. 13 illustrates a resource configuration during the time/frequency resource restriction for a RAR monitoring, according to the embodiments as disclosed herein.

Downlink Radio Resource Restriction for RAR Monitoring: In an embodiment, the UE (100) can be configured with multiple downlink radio resources (e.g. CORESETs or time occasions or frequency resources or bandwidth parts) where the RAR can be received. The downlink radio resources are assumed to be mutually orthogonal or non-overlapping with each other. Each such downlink radio resource is associated to the frame index value which is derived based on the system frame index or the COT number or the subframe number or the time duration number over which the UE (100) performs PRACH transmission. After transmission of PRACH, the UE (100) determines the downlink radio resource for the RAR reception based on the frame index value of PRACH transmission.

Frame Index Calculation: The frame index value can be one of the following.

(1) Option-1: Frame Index=(SFN_id/SFN_period) mod SFN_max. Here:

(a): SFN_id is the function of system frame number and/or COT number (i.e. each network COT is identified by the COT number value which can be broadcasted using the DCI or the System Information within the COT by the base station (200) or can be determined by the UE (100) e.g. using the system frame number and/or the subframe number and/or slot number) and/or subframe number and/or a time duration number (e.g. the UE (100) can be configured with time windows such that each time window is identified by the time duration number value. The time window can be characterized by the time offset value for start of time window, time window periodicity value and time window duration value). For instance, SFN_id can be same value as system frame number or SFN_id can be same value as COT number corresponding to the PRACH occasion in which the UE (100) transmits the PRACH preamble SFN_id can be same value as system frame number or SFN_id can be same value as COT number of the system frame or COT in which PRACH occasion corresponding to UE's transmitted PRACH preamble starts.

(b): SFN_max can be defined as one or more of the following:

(i): SFN_max can be a pre-defined value (e.g. value of SFN_max is fixed in specification).

(ii): Configured by the base station (200) (e.g. using system information).

(iii): Determined by the UE (100), for instance value of SFN_max can be defined as RAR_window_length/PRACH_period. Here RAR_window_length is the time the UE (100) monitors for random access response from the base station (200) and PRACH period is the time periodicity after which PRACH occasions are repeated. The unit of RAR_window_length and PRACH period can be same as time unit of SFN_id.

(iv) Determined by the UE (100), for instance value of SFN_max can be defined as RAR_window_length. Here RAR_window_length is the time the UE (100) monitors for random access response from the base station (200).

(v) Determined by the UE (100), for instance value of SFN_max can be defined as RAR_window_length/COT_duration. Here RAR_window_length is the time the UE (100) monitors for random access response from the base station (200). The unit of RAR_window_length and COT_duration can be same as time unit of SFN_id.

(c): SFN_period can be defined as one or more of the following:

(i): SFN_period can be a pre-defined value (e.g. value of SFN_max is fixed in specification).

(ii): Configured by the base station (200) (e.g. using system information).

(iii): Determined by the UE (100), for instance value of SFN_period can be equal to the time periodicity after which PRACH occasions are repeated.

(iv): SFN_period can be equal to one (i.e. one radio frame or system frame).

(v): Determined by the UE (100), for instance value of SFN_period can be equal to the COT_duration.

(2) Option-2: Frame Index=SFN_id mod SFN_max. In other words, Frame index is equal to decimal value of 'X' least significant bits of SFN_id where X=log 2 (SFN_max). Here:

(a): SFN_id is the function of system frame number and/or COT number (i.e. each network COT is identified by the COT number value which can be broadcasted using the DCI or the System Information within the COT by the base station (200) or can be determined by the UE (100) e.g. using system frame number and/or subframe number and/or slot number) and/or subframe number and/or a time duration number (e.g. the UE (100) can be configured with time windows such that each time window is identified by the time duration number value. The time window can be characterized by the time offset value for start of time window, time window periodicity value and time window duration value). For instance, SFN_id can be same value as system frame number or SFN_id can be same value as COT number corresponding to the PRACH occasion in which the UE (100) transmits PRACH preamble SFN_id can be same value as system frame number or SFN_id can be same value as COT number of the system frame or COT in which PRACH occasion corresponding to UE's transmitted PRACH preamble starts.

(b): SFN_max can be defined as one or more of the following:

(i): SFN_max can be a pre-defined value (e.g. value of SFN_max is fixed in specification).

(ii): Configured by the base station (200) (e.g. using system information).

(iii): Determined by the UE (100), for instance value of SFN_max can be defined as a function of RAR_window_length. Here RAR_window_length is the time the UE (100) monitors for random access response from the base station (200). For instance, SFN_max can be equal to RAR_window_length in units of radio frames or system frames) configured by gNB for monitoring RAR. Alternately, SFN_max can be equal to maximum possible RAR_window_length (in units of radio frames or system frames) supported in system for monitoring RAR.

(iv) Determined by the UE (100), for instance value of SFN_max can be defined as a function of RAR_window_length/COT_duration. Here RAR_window_length is the time UE (100) monitors for random access response from the base station (200). RAR_window_length and COT_duration are in units of radio frames. This can be used when SFN_id is the COT number.

Resource Configuration: Time/Frequency Resource Restriction for RAR Monitoring:

In another embodiment, as shown in the FIG. 13, the UE (100) can be configured with different time or frequency domain radio resources for random access response reception such that each time or frequency radio resource is associated to the frame index value. Different time domain and/or frequency domain resources can be indicated to the UE (100) using RRC configuration of the cell which may include one or more of the following:

(1): Different downlink radio resources can be reserved within the PDCCH search space configuration used for transmission of DCI identified by RA-RNTI. For example, each downlink radio resource configuration can contain monitoring slot periodicity and offset parameters along with monitoring symbols within the given slots and frequency location (e.g. set of resource blocks). Each such downlink radio resource configuration may also include either the frame index value or may include the unique identity value which is associated to the frame index value corresponding to PRACH transmission. One downlink radio resource configuration can be configured which is applicable to any value of frame index (i.e. the time and/or frequency downlink resource configuration is common to all frame index values).

(2): Different downlink radio resources can be reserved within the control resource set configuration used for transmission of DCI identified by RA-RNTI. For example, each downlink radio resource configuration can contain the time window (e.g. window duration, periodicity and offset parameters) and/or a set of frequency domain resources (e.g. set of resource blocks or control channel elements or resource element groups or resource element group bundles). Each such downlink radio resource configuration may also include either a frame index value or may include a unique identity value which is associated to a frame index value corresponding to PRACH transmission. One downlink radio resource configuration can be configured which is applicable to any value of frame index (i.e. the time and/or frequency downlink resource configuration is common to all frame index values).

Figure 14:
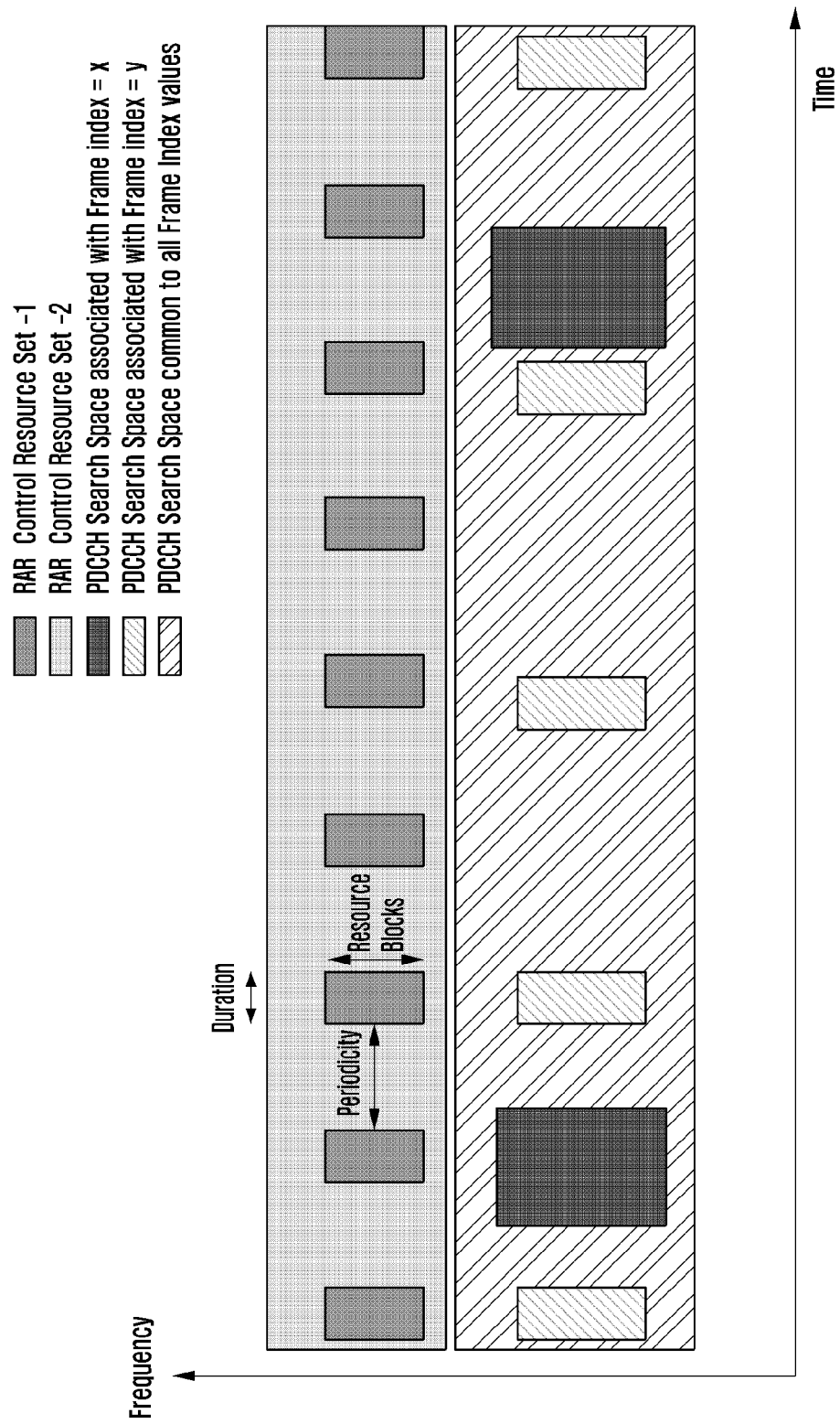
FIG. 14 illustrates the resource configuration for RAR reception where a search space restriction for the RAR monitoring, according to the embodiments as disclosed herein.

FIG. 14 illustrates a resource configuration during a search space restriction for the RAR monitoring, according to the embodiments as disclosed herein.

Search Space Restriction for RAR Monitoring: In another embodiment, as shown in the FIG. 14, the UE (100) can be configured with different PDCCH search spaces for random access response reception such that each PDCCH search space is associated to the frame index value.

Different PDCCH search spaces (associated to same or different control resource sets) can be indicated to the UE (100) using RRC configuration of the cell. Each such PDCCH search space configuration may include either the frame index value or may include the unique identity value which is associated to the frame index value corresponding to PRACH transmission. One PDCCH search space can be configured which is applicable to any value of frame index (i.e. the PDCCH search space configuration is common to all frame index values). In an embodiment, a list of multiple PDCCH search spaces for RAR reception can be configured (via system information or dedicated RRC signaling) wherein ith PDCCH search space in list is mapped to frame index 'i'. Frame index is calculated as explained earlier. In case there is only one PDCCH search space configuration is configured for RAR reception, the UE (100) uses it for PDCCH reception for RAR irrespective of frame index.

Figure 15:
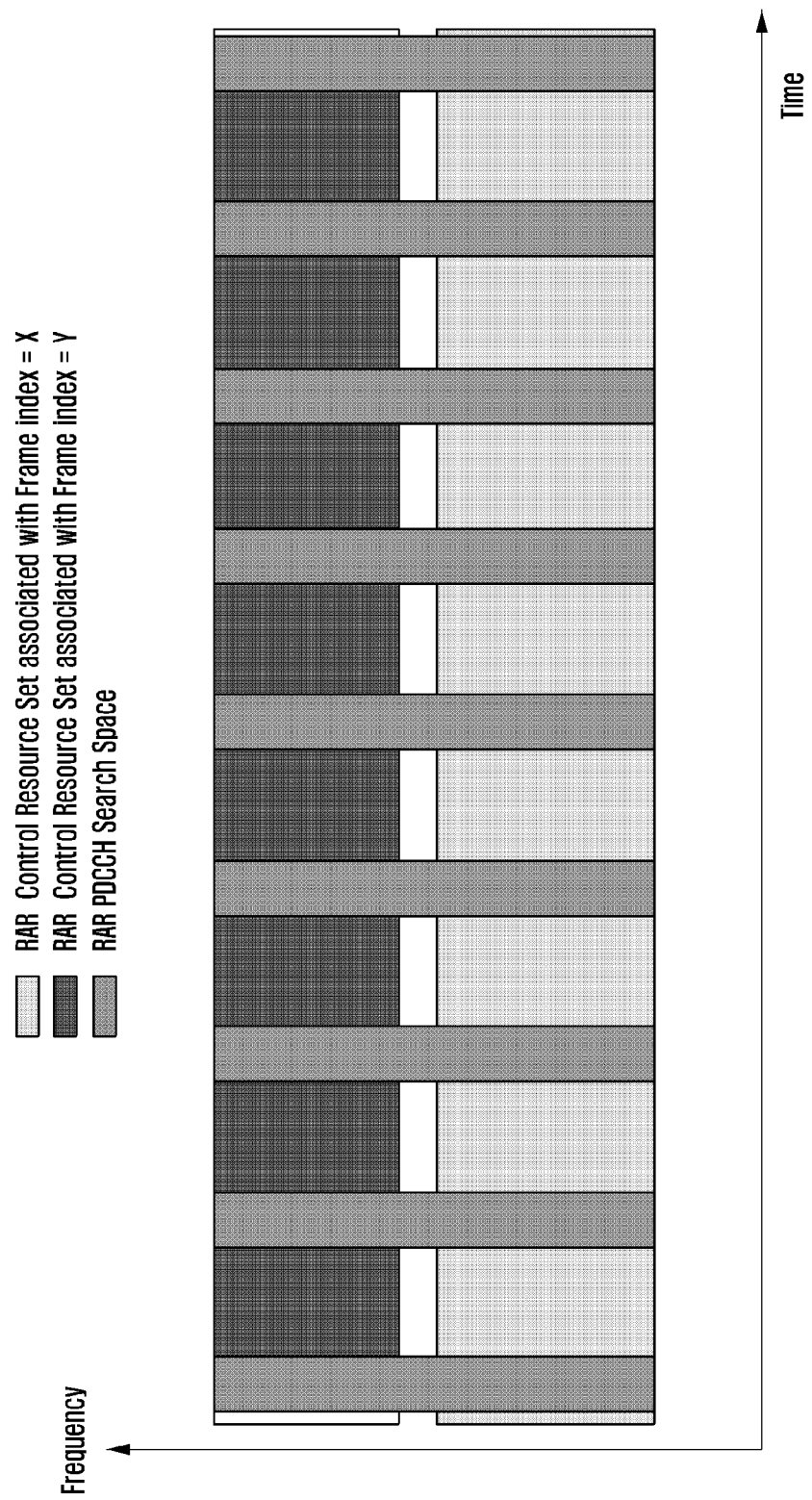
FIG. 15 illustrates the resource configuration for RAR reception where a control resource set restriction for the RAR monitoring, according to the embodiments as disclosed herein.

FIG. 15 illustrates the resource configuration for a control resource set restriction for the RAR monitoring, according to the embodiments as disclosed herein.

Control Resource Set Restriction for RAR Monitoring: In another embodiment, as shown in the FIG. 15, the UE (100) can be configured with different control resource sets for random access response reception such that each control resource set is associated to the frame index value.

Different control resource sets (associated to same or different PDCCH search space for RA-RNTI) can be indicated to the UE (100) using RRC configuration of the cell. Each such control resource set configuration may include either the frame index value or may include the unique identity value which is associated to the frame index value corresponding to PRACH transmission. One control resource set can be configured which is applicable to any value of frame index (i.e. the control resource set configuration is common to all frame index values). In an embodiment, a list of multiple PDCCH coresets for RAR reception can be configured (via system information or dedicated RRC signaling) wherein ith PDCCH coreset in list is mapped to frame index 'i'. Frame index is calculated as explained earlier. In case only one PDCCH coreset configuration is configured for RAR reception, the UE (100) uses it for PDCCH reception for RAR irrespective of frame index.

Figure 16:
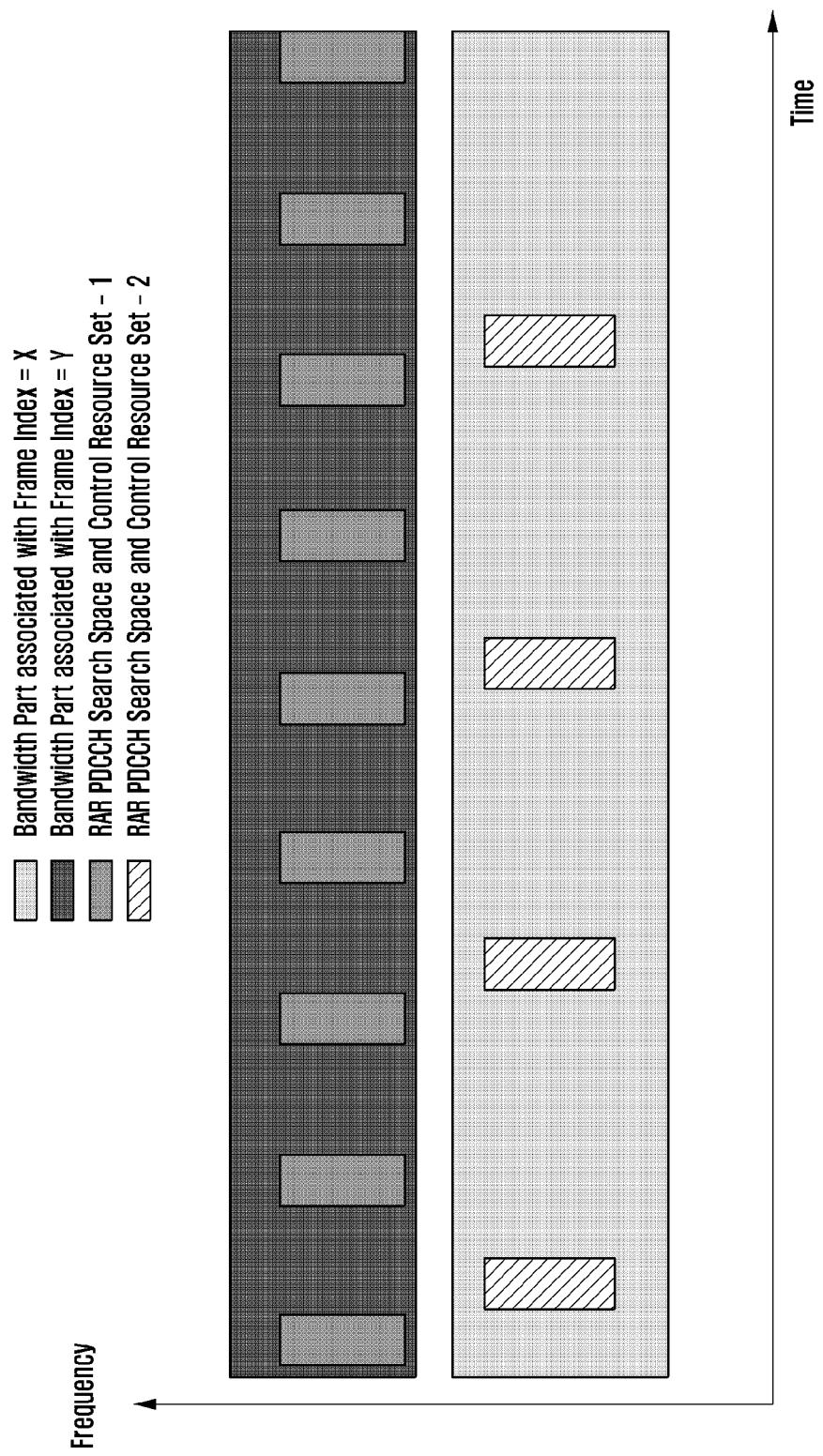
FIG. 16 illustrates the resource configuration for RAR reception where a bandwidth part restriction for the RAR monitoring, according to the embodiments as disclosed herein.

FIG. 16 illustrates the resource configuration for a bandwidth part restriction for the RAR monitoring, according to the embodiments as disclosed herein.

Bandwidth Part Restriction for RAR Monitoring: In another embodiment, as shown in the FIG. 16, the UE (100) can be configured with different downlink bandwidth parts for random access response reception such that each downlink bandwidth part set is associated to the frame index value.

The different downlink bandwidth parts can be indicated to the UE (100) using the RRC configuration of the cell. Each such downlink bandwidth part configuration may include either the frame index value or may include a unique identity value which is associated to the frame index value corresponding to PRACH transmission. One downlink bandwidth part can be configured which is applicable to any value of frame index (i.e. the downlink bandwidth part configuration is common to all frame index values).

Figure 17A:
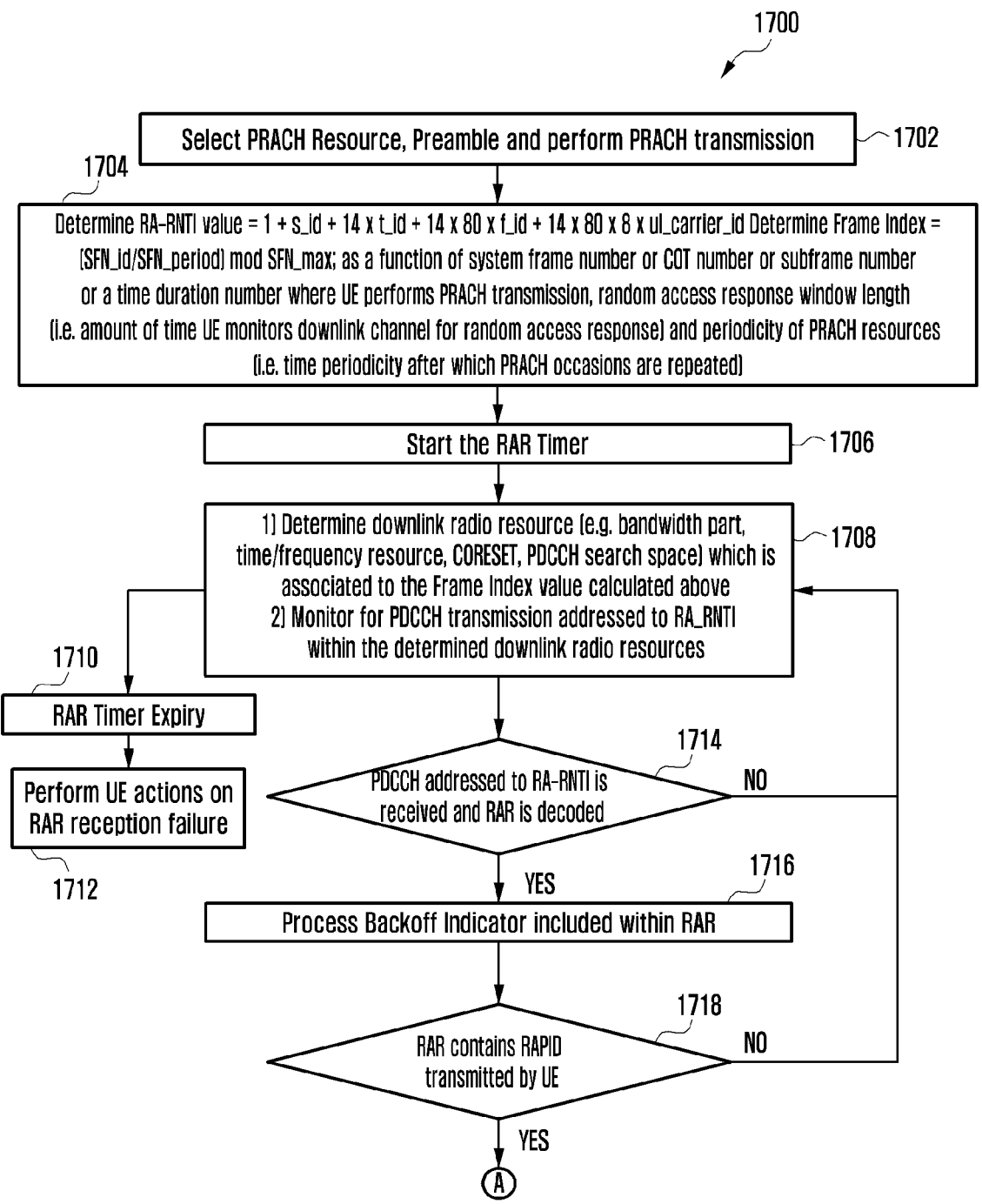
FIG. 17a and FIG. 17b are a flow diagram illustrating a UE procedure for the RAR reception where a UE monitors the frame index specific downlink resources, according to the embodiments as disclosed herein.
Figure 17B:
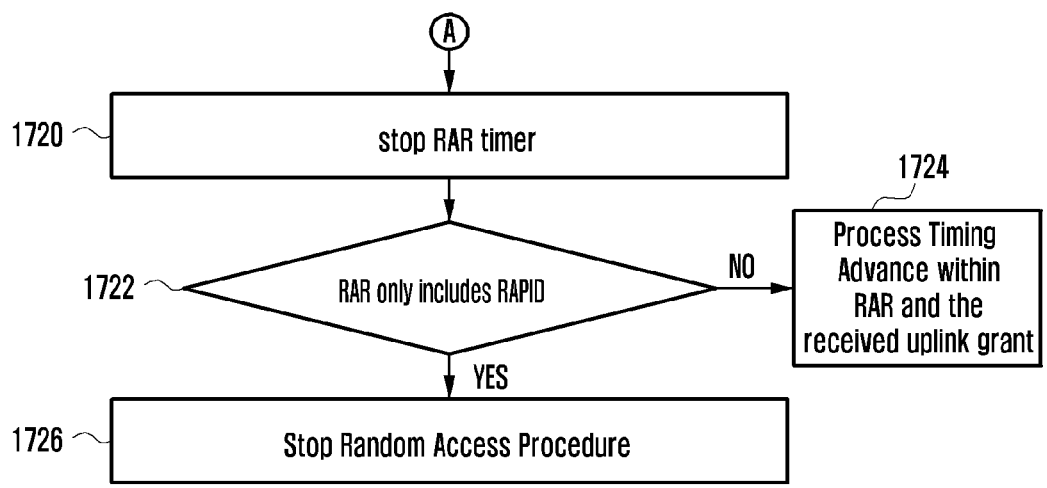

FIG. 17 comprises FIG. 17*a* and FIG. 17*b*. FIG. 17 is a flow diagram (1700) illustrating a UE procedure for the RAR reception in which the UE (100) monitor frame index specific downlink resources, according to the embodiments as disclosed herein.

At 1702, the method includes selecting the PRACH resource and preamble and performing the PRACH transmission. At 1704, the method includes determining the RA-RNTI value (i.e., RA-RNTI value=1+s_id+14×t_id+ 14×80×f_id+14×80×8×ul_carrier_id) or Frame Index (i.e., Frame Index=(SFN_id/SFN_period) mod SFN_max; as a function of system frame number or COT number or subframe number or a time duration number where UE performs PRACH transmission, random access response window length (i.e. amount of time UE monitors downlink channel for random access response) and periodicity of PRACH resources (i.e. time periodicity after which PRACH occasions are repeated))

At 1706, the method includes starting the RAR timer (140). At 1708, the method includes determining the downlink radio resource (e.g. bandwidth part, time/frequency resource, CORESET, PDCCH search space) which is associated to the Frame Index value or monitoring the PDCCH transmission addressed to RA_RNTI within the determined downlink radio resources.

At 1710, the method includes expiring the RAR timer (140). At 1712, the method includes performing the UE actions on the RAR reception failure.

At 1714, the method includes determining whether the PDCCH addressed to RA-RNTI is received and RAR is decoded. If the PDCCH addressed to RA-RNTI is not received and the RAR is not decoded then, the method performs operation at 1708. If the PDCCH addressed to RA-RNTI is received and the RAR is decoded then, at 1716, the method includes processing the Backoff Indicator included within the RAR.

At 1718, the method includes determining whether the RAR contains the RAPID transmitted by the UE (100). If the RAR does not contain the RAPID transmitted by the UE (100) then, the method performs operation at 1708.

If the RAR contains the RAPID transmitted by the UE (100) then, at 1720, the method includes stopping the RAR timer (100). At 1722, the method includes determining whether the RAR only includes RAPID. If the RAR only includes RAPID then, at 1726, the method includes stopping the random access procedure. If the RAR does not only includes the RAPID then, at 1724, the method includes processing the timing advance within RAR and the received uplink grant.

UE Procedure for Monitoring RAR:

UE (100) monitors Frame Index Specific Downlink Resources: In another embodiment, as shown in the FIG. 17, after transmission of PRACH, the UE (100) performs following procedure to monitor for PDCCH identified by the RA-RNTI.

(1): If UE (100) is configured with downlink radio resources specific to each frame index value (for e.g. UE (100) may receive the configuration wither in system information or dedicated configuration)

(a): the UE (100) determines the frame index value corresponding to the system frame or COT or the subframe or the time duration where PRACH was transmitted.

(b): The UE (100) determines the downlink radio resource which is associated to the given frame index value. In an embodiment, if the downlink radio resource configuration contains frame index value parameter, then the UE (100) selects the downlink radio resource configuration which contains the frame index value corresponding to the frame index determined by the UE (100) where the PRACH was transmitted. In an embodiment, if the downlink radio resource configuration contains unique identity value, then the UE (100) determines an identity value as a function of frame index (for e.g. 1) Identity=frame index+offset, where offset value is pre-determined or configured by the base station (200), 2) the base station (200) can configure a mapping rule between frame index and downlink radio resource identity, and the UE (100) selects the downlink radio resource whose identity matches the identity value as determined by the UE (100).

(c): The UE (100) starts to monitor for PDCCH identified by RA-RNTI in the downlink radio resources calculated in the previous step (i.e. the UE (100) does not monitor for PDCCH RAR-RNTI in any other downlink radio resource)

(d): If the UE (100) receives the PDCCH identified by RA-RNTI in the downlink radio resources corresponding to frame index value where PRACH was transmitted, the UE (100) tries to decode the RAR based on the scheduling information within the given PDCCH and perform further processing of RAR.

(2): If the UE (100) is not configured with downlink radio resources specific to frame index value:

(a): the UE (100) starts to monitor for PDCCH identified by RA-RNTI in the all the downlink radio resources which are associated with the search space for receiving RAR.

(b): If the UE (100) receives the PDCCH identified by RA-RNTI in the downlink radio resources corresponding to frame index value where PRACH was transmitted, the UE (100) tries to decode the RAR based on the scheduling information within the given PDCCH and perform further processing of RAR.

Figure 18A:
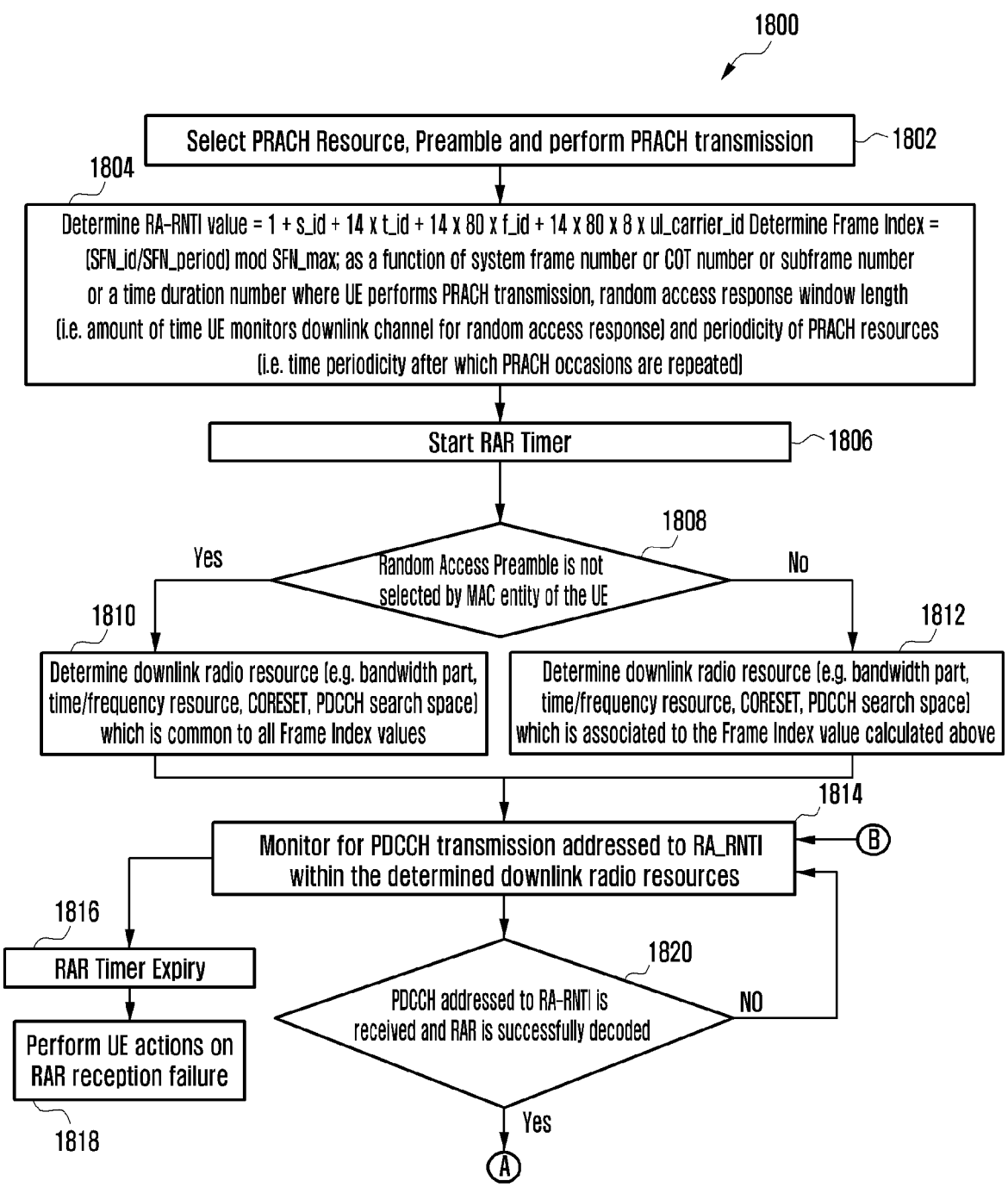
FIG. 18a and FIG. 18b are a flow diagram illustrating a UE procedure for the RAR reception where the UE monitors common resources if a contention free RACH is performed, according to the embodiments as disclosed herein.
Figure 18B:
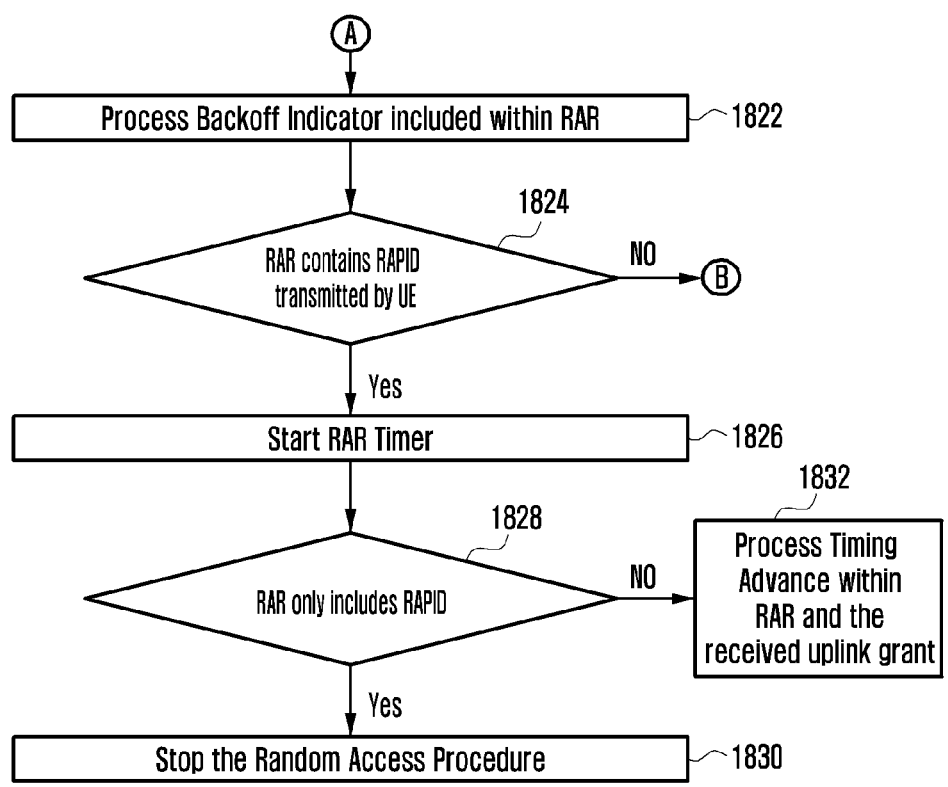

FIG. 18 comprises FIG. 18*a* and FIG. 18*b*. FIG. 18 is a flow diagram (1800) illustrating the UE procedure for the RAR reception where the UE (100) monitors the common resources if the contention free RACH is performed, according to the embodiments as disclosed herein.

At 1802, the method includes selecting the PRACH resource and preamble and performing the PRACH transmission. At 1804, the method includes determining the RA-RNTI value (i.e., RA-RNTI value=1+s_id+14×t_id+ 14×80×f_id+14×80×ul_carrier_id) and Frame Index (i.e., Frame Index=(SFN_id/SFN_period) mod SFN_max; as a function of system frame number or COT number or subframe number or a time duration number where the UE (100)

performs PRACH transmission, random access response window length (i.e. amount of time the UE (100) monitors downlink channel for random access response) and periodicity of PRACH resources (i.e. time periodicity after which PRACH occasions are repeated))

At 1806, the method includes starting the RAR timer (140). At 1808, the method includes determining whether the Random Access Preamble is not selected by the MAC entity of the UE (100). If the Random Access Preamble is not selected by the MAC entity of the UE (100) then, at 1810, the method includes determining the downlink radio resource (e.g. bandwidth part, time/frequency resource, CORESET, PDCCH search space) which is common to all Frame Index values.

If the Random Access Preamble is selected by the MAC entity of the UE (100) then, at 1812, the method includes determining the downlink radio resource (e.g. bandwidth part, time/frequency resource, CORESET, PDCCH search space) which is associated to the Frame Index value.

At 1814, the method includes monitoring the PDCCH transmission addressed to RA_RNTI within the determined downlink radio resources. At 1816, the method includes expiring the RAR Timer (140). At 1818, the method includes performing the UE actions on the RAR reception failure.

At 1820, the method includes determining whether the PDCCH addressed to RA-RNTI is received and RAR is successfully decoded. If the PDCCH addressed to RA-RNTI is not received and the RAR is not successfully decoded then, the method performs operation at 1814.

If the PDCCH addressed to RA-RNTI is received and the RAR is successfully decoded then, at 1822, the method includes processing the Backoff Indicator included within the RAR.

At 1824, the method includes determining whether the RAR contains RAPID transmitted by the UE (100). If the RAR does not contain the RAPID transmitted by the UE (100) then the method performs operation at 1814.

If the RAR contains RAPID transmitted by the UE (100) then, at 1826, the method includes stopping the RAR timer (140). At 1828, the method includes determining whether the RAR only includes the RAPID. If the RAR only includes the RAPID then, at 1830, the method includes stopping the random access procedure. If the RAR does not only include the RAPID then, at 1832, the method includes processing the timing advance within RAR and the received uplink grant.

UE Monitors Common Resources if Contention Free RACH Performed: In another embodiment, as shown in the FIG. 18, after transmission of PRACH, the UE (100) performs following procedure to monitor for PDCCH identified by RA-RNTI.

(1): If UE is configured with downlink radio resources specific to each frame index value (for e.g. UE may receive the configuration wither in system information or dedicated configuration)

(a): If random access preamble is not selected by the MAC entity (i.e. PRACH transmission is on contention free resources or PRACH transmission is for Msg-1 based SI request).

(i): The UE (100) determines the downlink radio resource which is common to all the frame index values.

(ii): The UE (100) starts to monitor for PDCCH identified by RA-RNTI in the downlink radio resources calculated in the previous step (i.e. the UE (100) does not monitor for PDCCH RAR-RNTI in any other downlink radio resource).

(iii): If the UE (100) receives the PDCCH identified by RA-RNTI in the downlink radio resources corresponding to frame index value where PRACH was transmitted, the UE (100) tries to decode the RAR based on the scheduling information within the given PDCCH and perform further processing of RAR.

(b): Else, (i): the UE (100) determines the frame index value corresponding to the system frame or the COT or subframe or the time duration where PRACH was transmitted.

(ii): In an embodiment, if downlink radio resource configuration contains frame index value parameter, then the UE (100) selects the downlink radio resource configuration which contains the frame index value corresponding to the frame index value determined by the UE (100) where PRACH was transmitted. In an embodiment, if the downlink radio resource configuration contains unique identity value, then the UE (100) determines an identity value as a function of frame index (for e.g. 1) Identity=frame index+offset, where offset value is pre-determined or configured by the base station (200), 2) the base station (200) can configure a mapping rule between frame index and downlink radio resource identity), and the UE (100) selects the downlink radio resource whose identity matches the identity value as determined by the UE (100).

(iii): The UE (100) starts to monitor for PDCCH identified by RA-RNTI in the downlink radio resources calculated in the previous step (i.e. the UE (100) does not monitor for PDCCH RAR-RNTI in any other downlink radio resource).

(iv): If the UE (100) receives the PDCCH identified by RA-RNTI in the downlink radio resources corresponding to frame index value where PRACH was transmitted, the UE (100) tries to decode the RAR based on the scheduling information within the given PDCCH and perform further processing of RAR.

(2): If the UE (100) is not configured with the downlink radio resources specific to the frame index value in the following condition:

(a): the UE (100) starts to monitor for PDCCH identified by RA-RNTI in the all the downlink radio resources which are associated with the search space for receiving RAR.

(b): If the UE (100) receives the PDCCH identified by RA-RNTI in the downlink radio resources corresponding to frame index value where PRACH was transmitted, the UE (100) tries to decode the RAR based on the scheduling information within the given PDCCH and perform further processing of RAR.

Figure 19A:
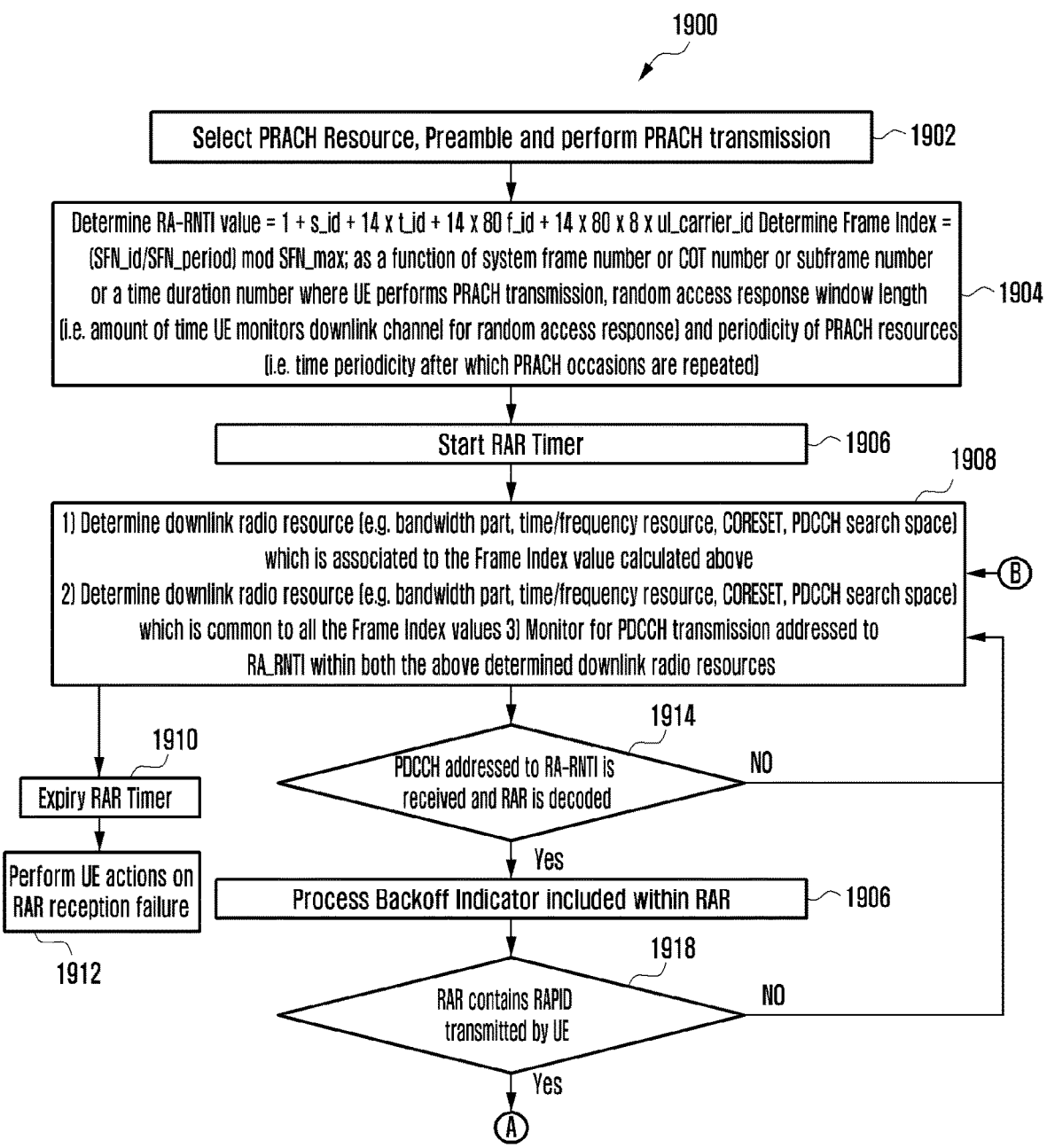
FIG. 19a and FIG. 19b are a flow diagram illustrating a UE procedure for the RAR reception where the UE monitors both frame index specific resources and common resources, according to the embodiments as disclosed herein.
Figure 19B:
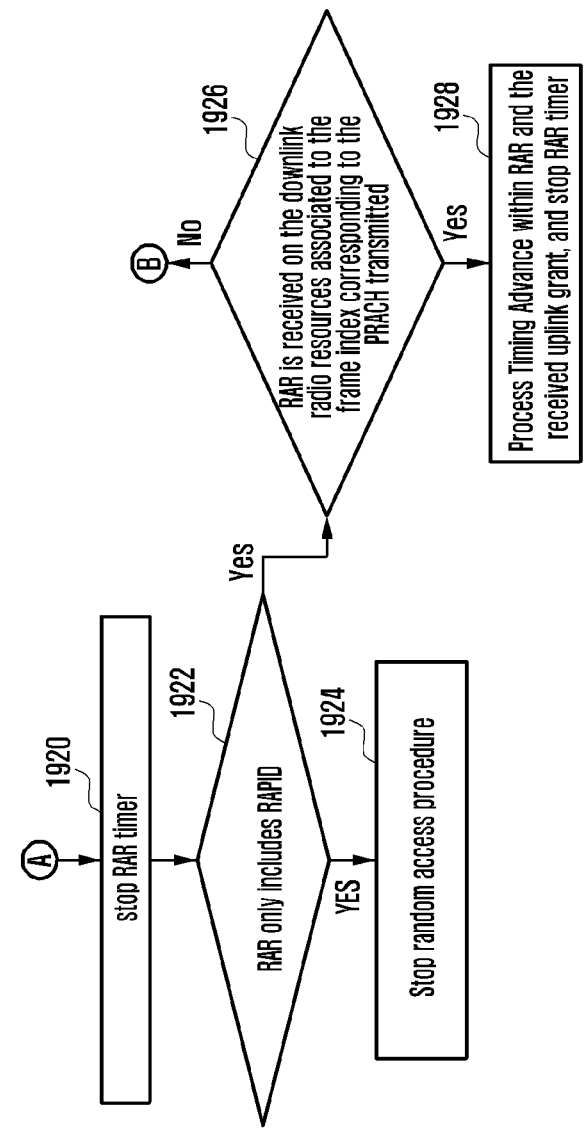

FIG. 19 comprises FIG. 19*a* and FIG. 19*b*. FIG. 19 is a flow diagram (1900) illustrating the UE procedure for the RAR reception in which the UE (100) monitor both frame index specific resources and common resources, according to the embodiments as disclosed herein.

At 1902, the method includes select the PRACH resource and preamble and performing the PRACH transmission. At 1904, the method includes determine the RA-RNTI value (i.e., RA-RNTI value=1+s_id+14×t_id+14×80×f_id+14× 80×8×ul_carrier_id) of the Frame Index (i.e., Frame Index= (SFN_id/SFN_period) mod SFN_max; as a function of system frame number or COT number or subframe number or a time duration number where the UE (100) performs the PRACH transmission, random access response window length (i.e. amount of time the UE (100) monitors downlink channel for random access response) and periodicity of PRACH resources (i.e. time periodicity after which PRACH occasions are repeated)).

At 1906, the method includes starting the RAR timer (140). At 1908, the method includes determining the downlink radio resource (e.g. bandwidth part, time/frequency resource, CORESET, PDCCH search space) which is associated to the Frame Index value or determining the downlink radio resource (e.g. bandwidth part, time/frequency resource, CORESET, PDCCH search space) which is common to all the Frame Index values or monitoring the for PDCCH transmission addressed to RA_RNTI within both the above determined downlink radio resources At 1910, the method includes expiring the RAR timer (140). At 1912, the method includes performing the UE actions on the RAR reception failure.

At 1914, the method includes determining whether the PDCCH addressed to RA-RNTI is received and RAR is decoded. If the PDCCH addressed to RA-RNTI is not received and the RAR is not decoded then, the method performs operation at 1908.

If the PDCCH addressed to RA-RNTI is received and RAR is decoded then, at 1916, the method includes processing the Backoff Indicator included within the RAR.

At 1918, the method includes determining whether the RAR contains the RAPID transmitted by the UE (100). If the RAR does not contain the RAPID transmitted by the UE (100) then, the method performs operation at 1908.

If the RAR contains the RAPID transmitted by the UE (100) then, at 1920, the method includes stopping the RAR timer (140).

At 1922, the method includes determining whether RAR only includes the RAPID. If the RAR only includes the RAPID then, at 1924, the method includes stopping the random access procedure.

If the RAR does bot only include the RAPID then, at 1926, the method includes determining whether the RAR is received on the downlink radio resources associated to the frame index corresponding to the PRACH transmitted. If the RAR is not received on the downlink radio resources associated to the frame index corresponding to the PRACH transmitted then, the method performs operation at 1908.

If the RAR is received on the downlink radio resources associated to the frame index corresponding to the PRACH transmitted then, at 1928, the method includes processing the timing advance within RAR and the received uplink grant, and stopping the RAR timer (140).

The UE (100) monitors both Frame Index Specific Resources and Common Resources: In another embodiment, as shown in the FIG. 19, after transmission of PRACH, the UE (100) performs following procedure to monitor for PDCCH identified by RA-RNTI.

(1): If the UE (100) is configured with downlink radio resources specific to each frame index value (for e.g. UE (100) may receive the configuration wither in system information or dedicated configuration)

(a): the UE (100) determines the frame index value corresponding to the system frame or COT or the subframe or the time duration where PRACH was transmitted.

(b): In an embodiment, if the downlink radio resource configuration contains frame index value parameter, then the UE (100) selects the downlink radio resource configuration which contains the frame index value corresponding to the frame index value determined by the UE (100) where the PRACH was transmitted. In another embodiment, if the downlink radio resource configuration contains unique identity value, then the UE (100) determines an identity value as a function of frame index (for e.g. 1) Identity=frame index+ offset, where offset value is pre-determined or configured by the base station (200), 2) the base station (200) can configure a mapping rule between frame index and downlink radio resource identity), and the UE (100) selects the downlink radio resource whose identity matches the identity value as determined by the UE (100).

(c): The UE (100) starts to monitor for PDCCH identified by RA-RNTI in the downlink radio resources calculated in the previous step (i.e. the UE (100) does not monitor for PDCCH RAR-RNTI in any other downlink radio resource) as well as the downlink radio resources which are common to all the frame index values.

(d): If the UE (100) receives the PDCCH identified by RA-RNTI in the downlink radio resources corresponding to frame index value where PRACH was transmitted, the UE (100) tries to decode the RAR based on the scheduling information within the given PDCCH and (i): If random access preamble is not selected by the MAC entity (i.e. PRACH transmission is on contention free resources or PRACH transmission is for Msg-1 based SI request), then UE performs further processing of RAR including back off indicator, time alignment and UL grant reception for Msg3 transmission.

(ii): Else, if the UE (100) has received the PDCCH identified by RA-RNTI in one of the downlink radio resource which is common to all the frame index values, then the UE (100) only applies backoff indicator within the RAR.

(iii): Else, if the UE (100) has received the PDCCH identified by RA-RNTI in one of the downlink radio resource which is associated to the frame index value corresponding to the frame where the UE (100) has performed PRACH transmission, then the UE (100) performs further processing of RAR including back off indicator, time alignment and UL grant reception for Msg3 transmission.

(2): If the UE (100) is not configured with downlink radio resources specific to frame index value:

(a): The UE (100) starts to monitor for PDCCH identified by RA-RNTI in the all the downlink radio resources which are associated with the search space for receiving RAR.

(b): If the UE (100) receives the PDCCH identified by RA-RNTI in the downlink radio resources corresponding to frame index value where PRACH was transmitted, the UE (100) tries to decode the RAR based on the scheduling information within the given PDCCH and perform further processing of RAR.

Figure 20A:
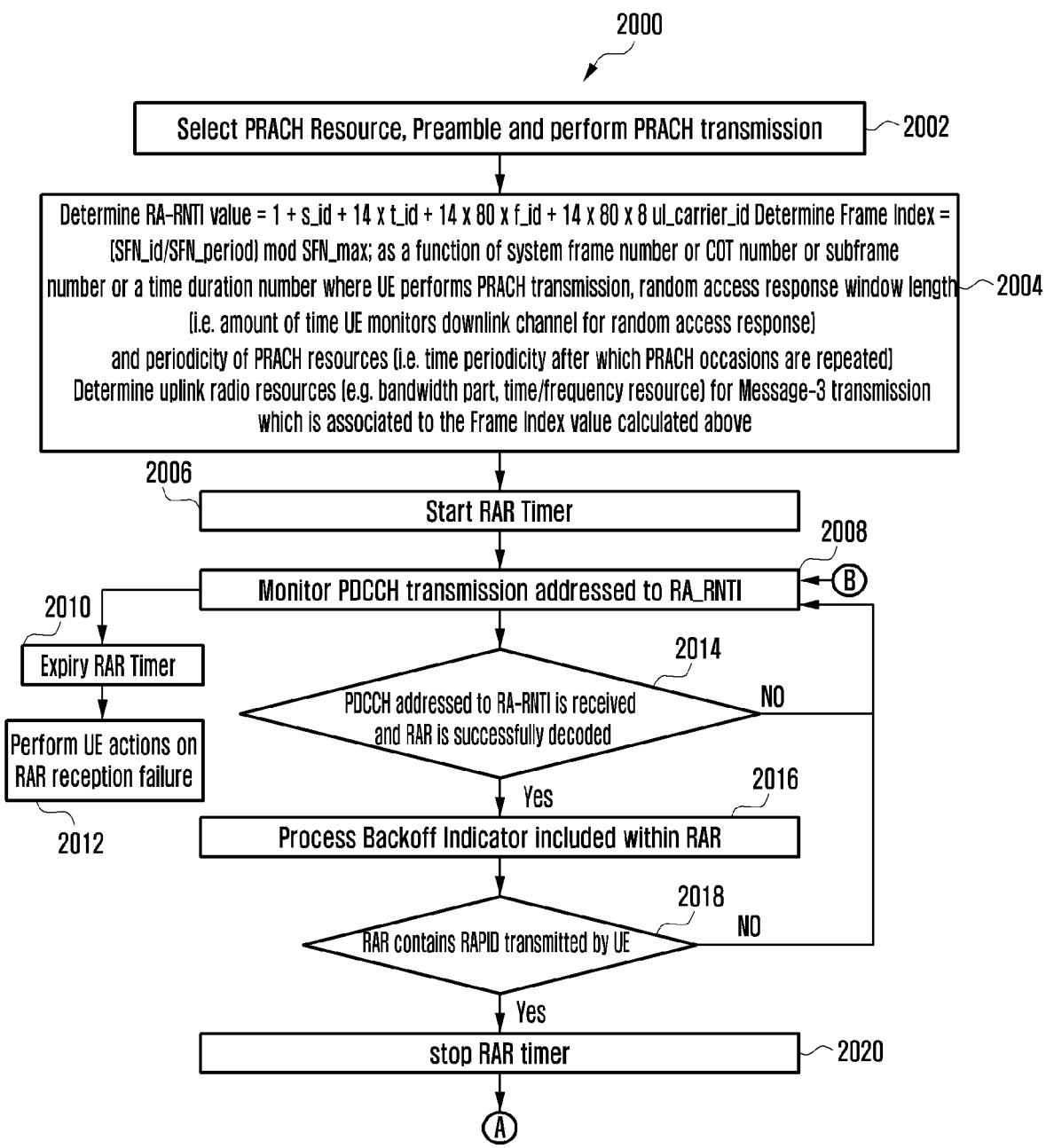
FIG. 20a and FIG. 20b are is a flow diagram illustrating a UE procedure for the RAR reception during the Uplink Radio Resource Selection for Msg3 Transmission, according to the embodiments as disclosed herein.
Figure 20B:
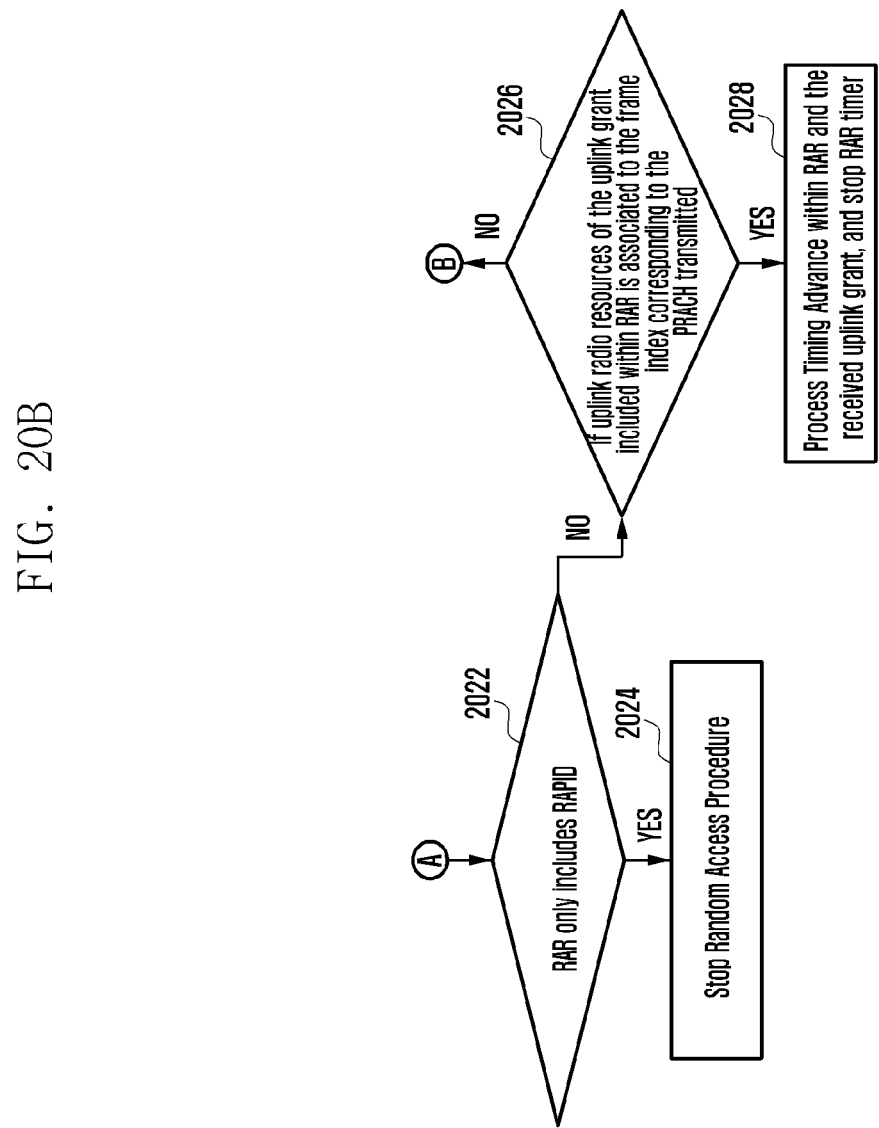

FIG. 20 comprises FIG. 20*a* and FIG. 20*b*. FIG. 20 is a flow diagram (2000) illustrating the UE procedure for the RAR reception during the Uplink Radio Resource Selection for Msg3 transmission, according to the embodiments as disclosed herein.

At 2002, the method includes selecting the PRACH Resource and preamble and performing the PRACH transmission.

At 2004, the method includes determining the RA-RNTI value (i.e., RA-RNTI value=1+s_id+14×t_id+14×80×f_id+ 14×80×8×ul_carrier_id) or the Frame Index (i.e., Frame Index=(SFN_id/SFN_period) mod SFN_max; as a function of system frame number or COT number or subframe number or a time duration number where the UE (100) performs the PRACH transmission, random access response window length (i.e. amount of time the UE (100) monitors downlink channel for random access response) and periodicity of PRACH resources (i.e. time periodicity after which PRACH occasions are repeated) Determine uplink radio resources (e.g. bandwidth part, time/frequency resource) for Message-3 transmission which is associated to the Frame Index value calculated above))

At 2006, the method includes starting the RAR Timer (140). At 2008, the method includes monitoring the PDCCH transmission addressed to RA_RNTI. At 2010, the method includes expiring the RAR timer (140). At 2012, the method includes performing the UE actions on the RAR reception failure.

At 2014, the method includes determining whether the PDCCH addressed to RA-RNTI is received and RAR is successfully decoded. If the PDCCH addressed to RA-RNTI is not received and RAR is not successfully decoded then, the method performs operation at 2008.

If the PDCCH addressed to RA-RNTI is received and the RAR is successfully decoded then, at 2016, the method includes processing the Backoff Indicator included within the RAR.

At 2018, the method includes determining whether the RAR contains the RAPID transmitted by the UE (100). If the RAR does not contain the RAPID transmitted by the UE (100) then, the method performs operation at 2008.

If he RAR contains the RAPID transmitted by the UE (100) then, at 2020, the method includes stopping the RAR timer (140).

At 2022, the method includes determining whether the RAR only includes RAPID. If the RAR only includes RAPID then, at 2024, the method includes stopping the random access procedure. If the RAR does not only includes the RAPID then, at 2026, the method includes determining whether the uplink radio resources of the uplink grant included within RAR is associated to the frame index corresponding to the PRACH transmitted. If the uplink radio resources of the uplink grant included within RAR is associated to the frame index corresponding to the PRACH transmitted then, the method includes at 2028, the method includes processing the timing advance within RAR and the received uplink grant and stopping the RAR time (140). If the uplink radio resources of the uplink grant included within RAR is not associated to the frame index corresponding to the PRACH transmitted then the method performs operation at 2008.

Uplink Radio Resource Selection for Msg3 Transmission: In one embodiment, as shown in the FIG. 20, the UE (100) can be configured or provided with multiple uplink radio resources (e.g. time occasions or frequency resources or bandwidth parts) for Message-3 transmission. The uplink radio resources are assumed to be mutually orthogonal or non-overlapping with each other. Each such uplink radio resource is associated to a frame index value which is derived based on system frame number or COT number or subframe number or a time duration number over which the UE (100) performs PRACH transmission. If the uplink radio resource for the received uplink grant within the decoded RAR is associated to the frame index value over which the UE (100) has performed PRACH transmission, then the UE (100) processes the RAR and use the indicated uplink grant. Otherwise, UE discards the RAR.

Frame Index Calculation: The frame index value can be one of the following:

(1) Option-1: Frame Index=(SFN_id/SFN_period) mod SFN_max. Here:

(a): SFN_id is a function of system frame number and/or COT number (i.e. each network COT is identified by a COT number value which can be broadcasted using DCI or System Information within the COT by the base station (200) or can be determined by the UE (100) e.g. using system frame number and/or subframe number and/or slot number) and/or subframe number and/or a time duration number (e.g. the UE (100) can be configured with time windows such that each time window is identified by a time duration number value. The time window can be characterized by a time offset value for start of time window, time window periodicity value and time window duration value). For instance, SFN_id can be same value as system frame number or SFN_id can be same value as COT number corresponding to the PRACH occasion in which the UE (100) transmits PRACH preamble SFN_id can be same value as system frame number or SFN_id can be same value as COT number of the system frame or COT in which PRACH occasion corresponding to UE's transmitted PRACH preamble starts.

(b): SFN_max can be defined as one or more of the following:

(i): SFN_max can be a pre-defined value (e.g. value of SFN_max is fixed in specification), (ii): Configured by the base station (200) (e.g. using system information), (iii): Determined by the UE (100), for instance value of SFN_max can be defined as RAR_window_length/PRACH_period. Here RAR_window_length is the time the UE (100) monitors for random access response from the base station (200) and PRACH_period is the time periodicity after which PRACH occasions are repeated. The unit of RAR_window_length and PRACH_period can be same as time unit of SFN_id, (iv) Determined by UE, for instance value of SFN_max can be defined as RAR_window_length. Here RAR_window_length is the time the UE (100) monitors for random access response from the base station (200), and (v) Determined by the UE (100), for instance value of SFN_max can be defined as RAR_window_length/COT_duration. Here RAR_window_length is the time the UE (100) monitors for random access response from the base station (200). The unit of RAR_window_length and COT_duration can be same as time unit of SFN_id.

(c): SFN_period can be defined as one or more of the following:

(i): SFN_max can be a pre-defined value (e.g. value of SFN_max is fixed in specification), (ii): Configured by the base station (200) (e.g. using system information), (iii): Determined by the UE (100), for instance value of SFN_max can be equal to the time periodicity (in system frames) after which PRACH occasions are repeated, (iv): SFN_period can be equal to one (i.e. one radio frame or system frame), and (v) Determined by the UE (100), for instance value of SFN_period can be equal to the COT_duration.

(2) Option-2: Frame Index=SFN_id mod SFN_max. In other words, Frame index is equal to decimal value of 'X' least significant bits of SFN_id where X=$\log_2$(SFN_max). Here:

(a): SFN_id is a function of system frame number and/or COT number (i.e. each network COT is identified by a COT number value which can be broadcasted using DCI or System Information within the COT by the base station (200) or can be determined by the UE (100) e.g. using system frame number and/or subframe number and/or slot number) and/or subframe number and/or a time duration number (e.g. the UE (100) can be configured with time windows such that each time window is identified by a time duration number value. The time window can be characterized by a time offset value for start of time window, time window periodicity value and time window duration value). For instance, SFN_id can be same value as system frame number or SFN_id can be same value as COT number corresponding to the PRACH occasion in which the UE (100) transmits PRACH preamble SFN_id can be same value as system frame number or SFN_id can be same value as COT number of the system frame or COT in which PRACH occasion corresponding to UE's transmitted PRACH preamble starts.

(b): SFN_max can be defined as one or more of the following:

(i): SFN_max can be a pre-defined value (e.g. value of SFN_max is fixed in specification), (ii): Configured by the base station (200) (e.g. using system information)

(iii): Determined by the UE (100), for instance value of SFN_max can be defined as a function of RAR_window_length. Here RAR_window_length is the time the UE (100) monitors for random access response from the base station (200). For instance, SFN_max can be equal to RAR_window_length in units of radio frames or system frames) configured by gNB for monitoring RAR. Alternately, SFN_max can be equal to maximum possible RAR_window_length (in units of radio frames or system frames) supported in system for monitoring RAR, and (iv) Determined by UE, for instance value of SFN_max can be defined as a function of RAR_window_length/COT_duration. Here RAR_window_length is the time the UE (100) monitors for random access response from the base station (200). RAR_window_length and COT_duration are in units of radio frames. This can be used when SFN_id is the COT number.

Resource Configuration: Time/Frequency Resource Selection for Message-3 Transmission. In another embodiment, the UE (100) can be configured or provided with different time or frequency domain radio resources for Message-3 transmission such that each time or frequency radio resource is associated to a frame index value.

Different uplink radio resources can be reserved within the system information or dedicated RRC configuration. For example, each uplink radio resource configuration can contain time and/or frequency window which may include time window periodicity, time window offset value (e.g. first slot/symbol from SFN=0), time window duration (e.g. number of slots/symbols) and frequency location (e.g. set of resource blocks). Each such uplink radio resource configuration may also include either a frame index value or may include a unique identity value which is associated to a frame index value corresponding to PRACH transmission.

Bandwidth Part Selection for Message-3 Transmission: In another embodiment, the UE (100) can be configured with different uplink bandwidth parts for Message-3 transmission such that each uplink bandwidth part is associated to a frame index value.

Different uplink bandwidth parts can be indicated to the UE (100) using system information or dedicated RRC configuration of the cell. Each such uplink bandwidth part configuration may include either a frame index value or may include a unique identity value which is associated to a frame index value corresponding to PRACH transmission.

UE Procedure on Receiving RAR: If a downlink assignment has been received on the PDCCH for the RA-RNTI and the received TB is successfully decoded:

(1): the UE (100) determines the frame index value corresponding to the system frame or COT or subframe or a time duration where PRACH was transmitted.

(2): the UE (100) monitors downlink channel for PDCCH identified by RA-RNTI and if it receives PDCCH identified by RA-RNTI, then the UE (100) tries to decode RAR scheduled by the given PDCCH.

(3): If the random access response contains the backoff indicator subheader, then the UE (100) applies the backoff value indicated within the BI field of backoff indicator subheader. Else, the UE (100) applies 0ms as backoff value.

(4): the UE (100) considers the random access response reception successful if the random access response contains a RAPID in a MAC subheader corresponding to the random access preamble transmitted by the UE (100).

(5): If random access response reception is successful, then (a): if the Random Access Response includes RAPID only, then the UE (100) considers this Random Access procedure successfully completed and indicates the reception of an acknowledgement for the SI request to upper layers (b): Else, if the uplink radio resource for the received uplink grant within the decoded RAR is associated to the frame index value over which the UE (100) has performed PRACH transmission:

(i): the UE (100) may stop RAR window timer (ra-ResponseWindow), (ii): Process the received timing advance command, (iii): Indicate the preambleReceivedTargetPower and the amount of power ramping applied to the latest Random Access Preamble transmission to lower layers, (iv): Process the uplink grant included within the RAR (v): If the Random Access Preamble was not selected by the MAC entity among the contention-based Random Access Preamble, then the UE (100) considers the Random Access procedure successfully completed, and (vi): Else, process the TEMPORARY C-RNTI to the value received in the Random Access Response and perform Message-3 transmission.

The various actions, acts, blocks, steps, or the like in the flow diagrams 300, 400, 600, 800-1000, 1200, 1700-2000 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a terminal in a wireless communication system, the method comprising:
   transmitting a random access (RA) preamble;
   monitoring physical downlink control channel (PDCCH) including downlink control information (DCI) with cyclic redundancy check (CRC) scrambled by a RA-radio network temporary identifier (RNTI) (RA-RNTI);

identifying information for a frame index included in the DCI with CRC scrambled by the RA-RNTI; and receiving a random access response (RAR) in a RAR window based on the information for the frame index included in DCI.

2. The method of claim 1, further comprising:

identifying whether the information for the frame index included in the DCI with CRC scrambled by the RA-RNTI corresponds to a frame index value for the transmitted RA preamble;

determining whether to decode the RAR in case that the information for the frame index included in the DCI with CRC scrambled by the RA-RNTI corresponds to the frame index value for the transmitted RA preamble; and decoding the RAR based on the determination.

3. The method of claim 2, further comprising:

identifying that the RAR includes a backoff indicator in case that the RAR is decoded;

determining whether the RAR only includes RAPID transmitted from the terminal; and determining that an RA procedure is completed in case that the RAR only includes the RAPID transmitted from the terminal.

4. The method of claim 3, further comprising:

processing a timing advance within the RAR in case that the RAR does not only include the RAPID transmitted from the terminal.

5. The method of claim 1, further comprising:

identifying a frame index value for the transmitted RA preamble;

determining whether the information for the frame index included in the DCI with CRC scrambled by the RA-RNTI corresponds to the frame index value for the transmitted RA preamble;

receiving a transport block (TB) including the RAR; and processing the RAR.

6. The method of claim 1, wherein the information for the frame index included in the DCI with CRC scrambled by the RA-RNTI corresponds to 2 bits least significant bit (LSB) of system frame number (SFN).

7. The method of claim 1, wherein the information for the frame index included in the DCI with CRC scrambled by the RA-RNTI is identified, in case that RAR is monitored on an unlicensed carrier and a length of the RAR window is larger than 10 ms.

8. A terminal in a wireless communication system, the terminal comprising:

a transceiver; and at least one processor configured to:

transmit, via the transceiver, a random access (RA) preamble, monitor physical downlink control channel (PDCCH) including downlink control information (DCI) with cyclic redundancy check (CRC) scrambled by a RA-radio network temporary identifier (RNTI) (RA-RNTI), identify information for a frame index included in the DCI with CRC scrambled by the RA-RNTI, and receive, via the transceiver, a random access response (RAR) in a RAR window based on the information for the frame index included in DCI.

9. The terminal of claim 8, wherein the at least one processor is further configured to:

determine whether the information for the frame index included in the DCI with CRC scrambled by the RA-RNTI corresponds to an identified frame index value for the transmitted RA preamble, determine whether to decode the RAR in case that the information for the frame index included in the DCI with CRC scrambled by the RA-RNTI corresponds to the frame index value for the transmitted RA preamble, and decode the RAR based on the determination.

10. The terminal of claim 9, wherein the at least one processor is further configured to:

identify that the RAR includes a backoff indicator in case that the RAR is decoded, determine whether the RAR only includes RAPID transmitted from the terminal, and determine that an RA procedure is completed in case that the RAR only includes the RAPID transmitted from the terminal.

11. The terminal of claim 10, wherein the at least one processor is further configured to:

process a timing advance within the RAR in case that the RAR does not only include the RAPID transmitted from the terminal.

12. The terminal of claim 8, wherein the at least one processor is further configured to:

identify a frame index value for the transmitted RA preamble, determine whether the information for the frame index included in the DCI with CRC scrambled by the RA-RNTI corresponds to the frame index value for the transmitted RA preamble, receive, via the transceiver, a transport block (TB) including the RAR, and process the RAR.

13. The terminal of claim 8, wherein the information for the frame index included in the DCI with CRC scrambled by the RA-RNTI corresponds to 2 bits least significant bit (LSB) of system frame number (SFN).

14. The terminal of claim 8, wherein the information for the frame index included in the DCI with CRC scrambled by the RA-RNTI is identified, in case that RAR is monitored on an unlicensed carrier and a length of the RAR window is larger than 10 ms.

* * * * *